(12) United States Patent
Behnke et al.

(10) Patent No.: US 10,907,806 B2
(45) Date of Patent: *Feb. 2, 2021

(54) LIGHTING FIXTURE WITH MULTIPLE CONFIGURATIONS FOR DIFFERENT JUNCTION BOX CONFIGURATIONS

(71) Applicants: Jaclyn Behnke, Highland, NY (US); Frank Cogliano, Pomona, NY (US)

(72) Inventors: Jaclyn Behnke, Highland, NY (US); Frank Cogliano, Pomona, NY (US)

(73) Assignee: USAI, LLC, New Windsor, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,442

(22) Filed: Feb. 10, 2020

(65) Prior Publication Data

US 2020/0191363 A1    Jun. 18, 2020

Related U.S. Application Data

(63) Continuation of application No. 16/545,683, filed on Aug. 20, 2019, now Pat. No. 10,557,619, which is a
(Continued)

(51) Int. Cl.
*F21V 21/02* (2006.01)
*F21S 8/00* (2006.01)
(Continued)

(52) U.S. Cl.
CPC ............... *F21V 21/02* (2013.01); *F21S 8/03* (2013.01); *F21S 8/033* (2013.01); *F21S 8/04* (2013.01);
(Continued)

(58) Field of Classification Search
CPC ...... F21V 21/04; F21V 21/041; F21V 21/047; F21V 21/048; F21V 21/049; F21V 21/02;
(Continued)

(56) References Cited

U.S. PATENT DOCUMENTS 4,295,575 A * 10/1981 Flachbarth ............... H02G 3/10
220/3.8
4,303,968 A    12/1981 Goralnik
(Continued)

FOREIGN PATENT DOCUMENTS

WO    WO-2017204713 A1 * 11/2017 ............. F21V 17/12

*Primary Examiner* — Rajarshi Chakraborty
*Assistant Examiner* — Michael Chiang
(74) *Attorney, Agent, or Firm* — St. Onge Steward Johnston & Reens LLC

(57) ABSTRACT

A light fixture having an upper and lower housing, and a mounting bracket adapted to mount to a junction box. The light fixture has a relatively short mounting bracket for surface mount configurations, and a relatively long mounting bracket for recess mount configurations, and a difference in the height of the long and short mounting brackets is equal to the height of the junction box. In the surface-mount and recess-mount configurations a circumferential edge of the upper housing abuts the mounting surface so the lighting fixture has the same external appearance and size in both configurations. The light fixture also has a pendant mode wherein the upper housing is suspended from the junction box by an elongated support. An enclosure for the junction box has a plurality of cut-outs and covers to accommodate various configurations of surface mounted conduit.

17 Claims, 84 Drawing Sheets

3. Make wire connection with wire-nuts (by others).
Push wire-nuts into junction box.

Related U.S. Application Data continuation of application No. 15/972,881, filed on May 7, 2018, now Pat. No. 10,443,822.

(60) Provisional application No. 62/502,398, filed on May 5, 2017.

(51) Int. Cl.
| | | |
|---|---|---|
| *F21S 8/04* | (2006.01) | |
| *F21S 8/06* | (2006.01) | |
| *F21V 17/00* | (2006.01) | |
| *H02G 3/20* | (2006.01) | |
| *F21Y 115/10* | (2016.01) | |
| *F21V 7/04* | (2006.01) | |
| *F21W 131/40* | (2006.01) | |

(52) U.S. Cl.
CPC ............... *F21S 8/06* (2013.01); *F21S 8/063* (2013.01); *F21V 17/002* (2013.01); *H02G 3/20* (2013.01); *F21V 7/04* (2013.01); *F21W 2131/40* (2013.01); *F21Y 2115/10* (2016.08)

(58) Field of Classification Search
CPC .... F21V 21/03; F21V 7/04; F21S 8/03; F21Y 2115/10; H02B 3/20
USPC ............................................ 174/58; 248/906
See application file for complete search history.

(56) References Cited

U.S. PATENT DOCUMENTS

| | | | | |
|---|---|---|---|---|
| 6,831,227 | B2* | 12/2004 | Weise | H02G 3/086 |
| | | | | 174/135 |
| 7,626,118 | B1* | 12/2009 | Capozzi | H02G 3/088 |
| | | | | 174/50 |
| 8,867,235 | B2* | 10/2014 | Veillette | H02G 3/086 |
| | | | | 174/559 |
| 9,312,670 | B1* | 4/2016 | Baldwin | H02G 3/105 |
| 9,435,353 | B1 | 9/2016 | Gretz | |
| 9,466,962 | B1* | 10/2016 | Gretz | H02G 3/20 |
| 10,122,140 | B1* | 11/2018 | Vega-Perez | F21V 23/06 |
| 2007/0256851 | A1* | 11/2007 | Kennedy | H02G 3/0425 |
| | | | | 174/68.3 |
| 2015/0338071 | A1 | 11/2015 | Feit et al. | |
| 2016/0319988 | A1* | 11/2016 | Mathews | F16M 13/027 |
| 2017/0009962 | A1 | 1/2017 | Feit et al. | |
| 2017/0268736 | A1 | 9/2017 | Harpenau et al. | |
| 2017/0363263 | A1* | 12/2017 | Ticktin | F21K 9/238 |
| 2018/0119934 | A1* | 5/2018 | Schneider | F21V 21/008 |

\* cited by examiner

SJ - Surface mount to surface mounted 4" octagonal j-box
RB - Surface mount to recessed mounted 4" octagonal j-box 1. Attach mounting bracket to junction box (by others) by aligning key slots to junction box screws and rotating clockwise. Tighten junction box screws.

SJ mounting (continued)

3. Make wire connection with wire-nuts (by others). Push wire nuts into junction box.

3. Make wire connection with wire-nuts (by others). Push wire nuts into junction box.

5. Attach optical reflector over LED and secure by rotating clockwise into place.

6. Snap lower housing into upper housing.

3. Make wire connection with wire-nuts (by others).
   Push wire-nuts into junction box.

7. Assembled BLOCK for Conduit Cutout should look like the above

FIG. 23A
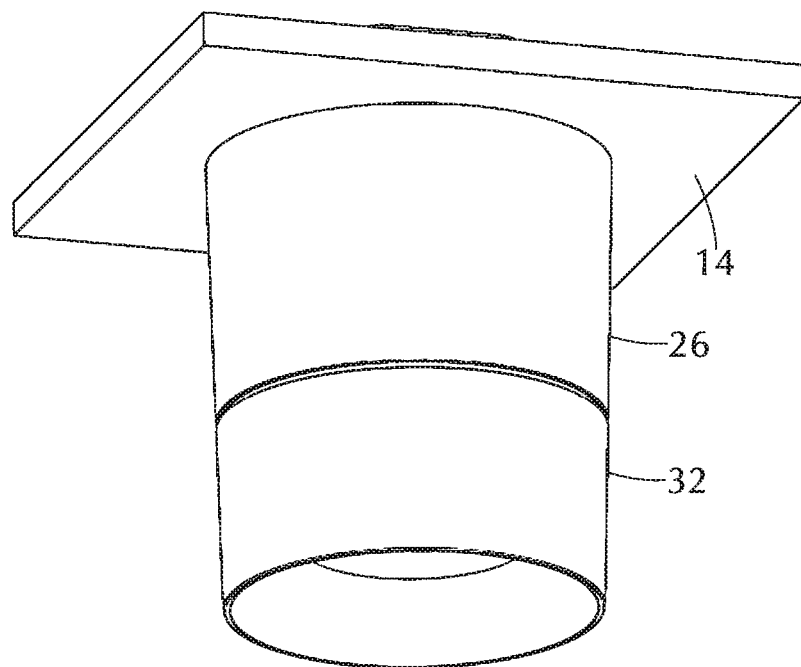
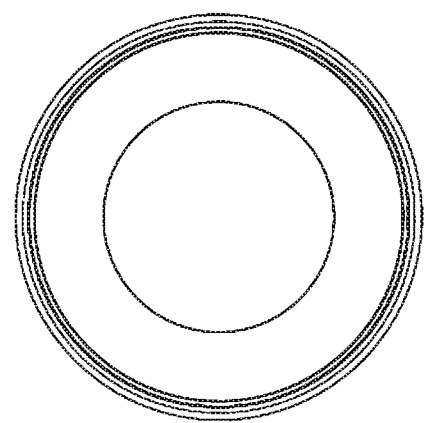

FIG. 27B
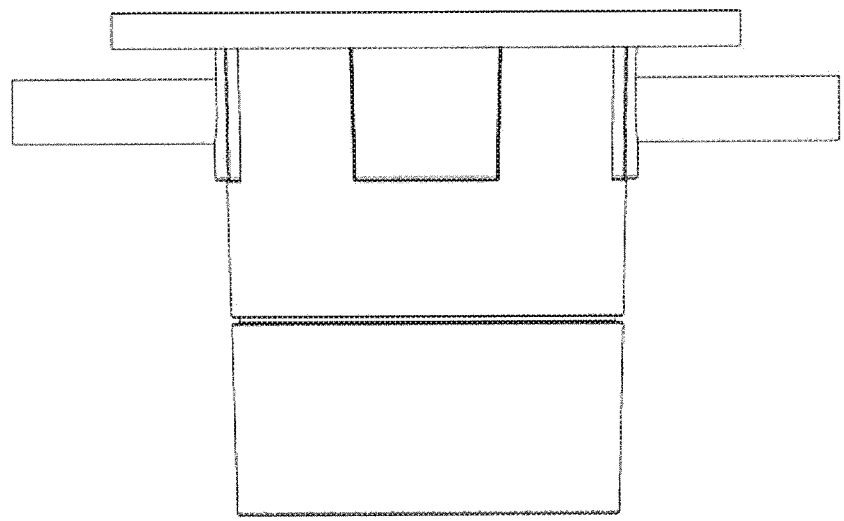
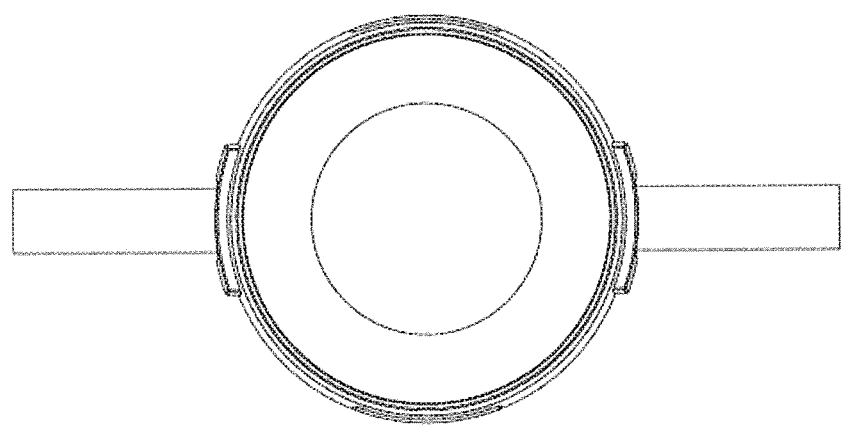

LIGHTING FIXTURE WITH MULTIPLE CONFIGURATIONS FOR DIFFERENT JUNCTION BOX CONFIGURATIONS

FIELD OF THE INVENTION

The invention pertains to the field of lighting fixtures and in particular to ceiling mounted lighting fixtures.

BACKGROUND OF THE INVENTION

Lighting fixtures are often mounted to ceilings or wall, or other mounting surface. Where possible and desirable, the lighting fixtures (and the junction boxes and wiring therefore) can be recessed within the mounting surface. However, where recessed lighting and recessed junction boxes are not possible or practical, the light fixtures may be mounted to the mounting surface. In such cases, the wiring and conduits therefore may also be mounted to the mounting surface. Therefore, what is desired is a lighting fixture that can accommodate these various configurations.

SUMMARY OF THE INVENTION

The ceiling mounted lighting fixture disclosed herein is particularly suitable for use with surface-mounted conduit and surface-mounted junction boxes in exposed or industrial ceilings (such as exposed concrete ceilings) where recessed lighting and recessed junction boxes are not possible or practical, for example lofts, offices, and open architectural spaces. In addition, the lighting fixture is also suitable for use with recessed conduit and recessed junction boxes, and in either configuration, the lighting fixture presents the same size and appearance.

In a surface mount configuration, the junction box is mounted to the ceiling (or other mounting surface, such as a wall) with the base of the junction box abutting a room-facing lower surface of the ceiling (or wall). In a recess mount configuration, the junction box is mounted within a recess or hole in the ceiling (or wall) with the circumferential edge of the side wall of the junction box flush or co-planar with the lower (room-facing) surface of the ceiling (or wall).

An embodiment of the light fixture includes a mounting bracket which mounts to and depends downwardly from the junction box, an upper housing which mounts to and surrounds and conceals the mounting bracket and junction box, a lighting element (such as an LED lighting element) mounted to a lower (i.e., room-facing) portion of the upper housing, an optical reflector which mounts to and depends downwardly from the lower portion of the upper housing, and a lower housing which mounts to and depends downwardly from the upper housing.

The circumferential edge of the upper housing is flush/co-planar with (i.e., abuts) the lower surface of the ceiling in either the surface-mount or recess-mount configuration, so the lighting fixture has the same external appearance and size in both the surface mount and recess mount configurations.

For the surface mount configuration, the light fixture has a relatively short mounting bracket, and for a recess mount configuration, the light fixture has a relatively long mounting bracket. The long and short mounting brackets each have a planar base which is adapted to abut the circumferential edge of the junction box and to connect to the junction box via fasteners directed through the base and into the mounting locations of the junction box.

To accommodate the different positions of the circumferential edge of the junction box as between the surface mount and recess mount configurations, the legs of the long mounting bracket are longer than the legs of the short mounting bracket, and the difference in the length is equal to the height of the junction box (e.g., 1.5 inches).

A lateral width (or diameter) of the base of the mounting bracket is preferably wider than a lateral width (or diameter) of the junction box such that the base extends laterally outwardly from the junction box on all sides (or at least two opposed sides). Thus, in the event that a recessed junction box is recessed too deeply (i.e., the circumferential edge of the junction box is not flush the mounting surface with but is itself recessed somewhat within the ceiling), the base of the lateral sides of the base of the mounting bracket will contact (and be properly positioned by) the mounting surface.

In other embodiments, the light fixture can be in the form of a pendant, having a lighting element suspended from the junction box by an elongated support such as a rigid or flexible, solid or hollow, stem or wire/cord, or another suitable elongated support.

The light fixture can include a housing with a plurality of cut outs (e.g., 4 cut outs) in the circumferential side wall to accommodate various configurations of surface mounted conduits extending into a surface mounted junction box, which cutouts can be aligned to correspond to the locations of conduit knock-outs in the junction box.

The light fixture can be provided with a plurality of cover keys and conduit keys and each cut-out can be adapted to selectively receive any one of the conduit keys and cover keys, such that the housing and light fixture can be configured to accommodate various patterns of surface mounted conduit connected to the junction box. The cover keys are adapted to fill and close the cut-outs where no conduit is present. The conduit keys have an opening adapted to receive an electrical conduit therethrough and can be placed in the cutout where a conduit is present. The keys can be secured in the cutouts by a removable fastener such as a screw.

BRIEF DESCRIPTION OF THE DRAWINGS

FIG. 23A is a perspective view and a bottom view of a second embodiment of the light fixture fully assembled.

FIG. 27B is a perspective view and a bottom view thereof;

DETAILED DESCRIPTION OF THE INVENTION

Figure 1:
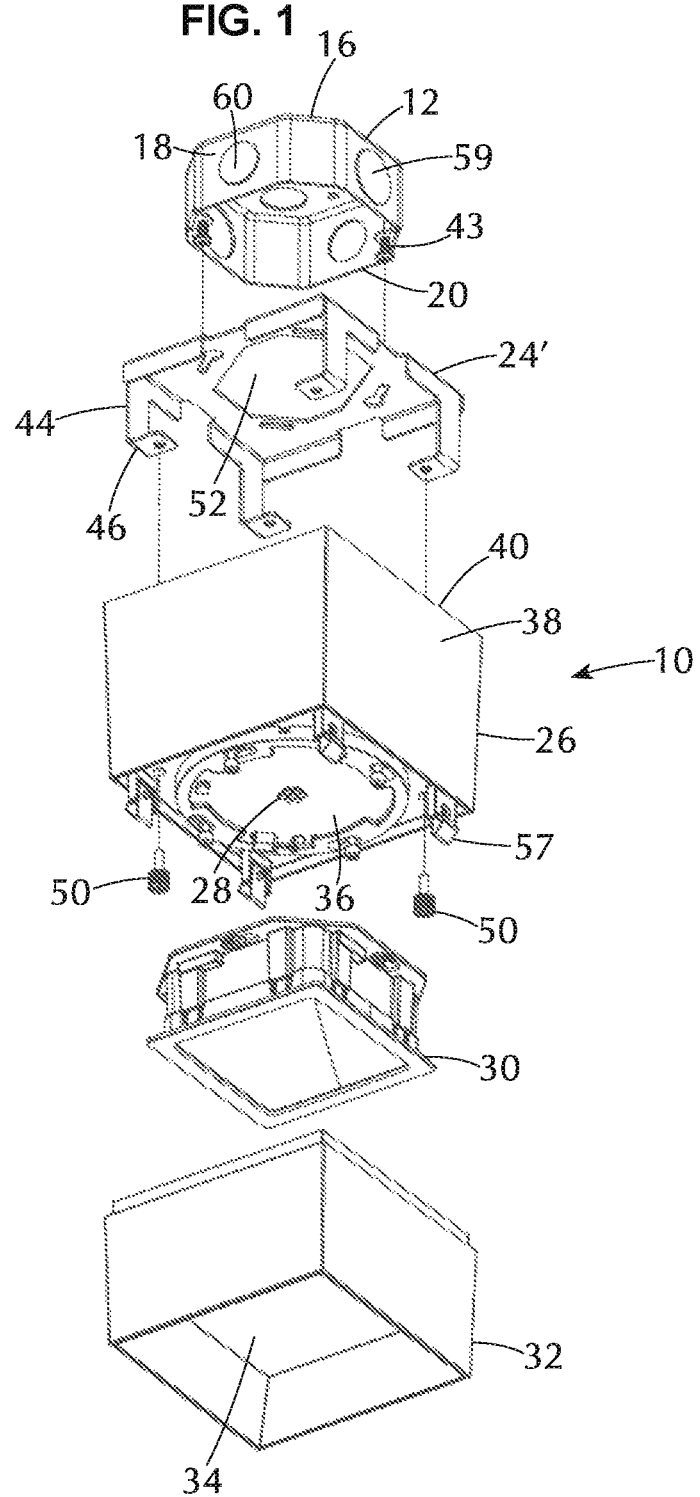
FIG. 1 is an assembly view of a first embodiment of the light fixture.
Figure 2:
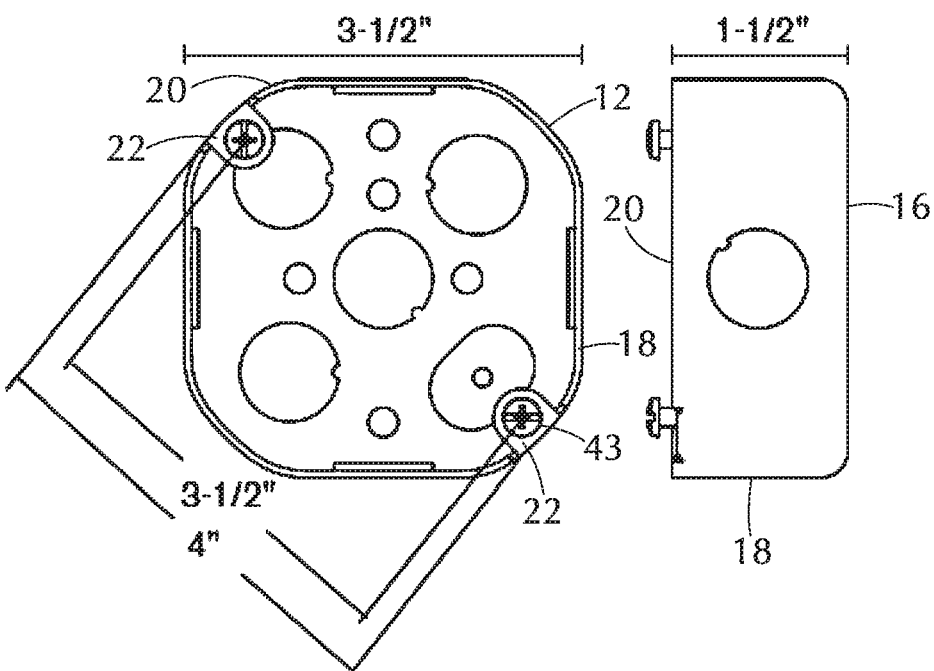
FIG. 2 is a top view and side view of a standard octagonal junction box.
Figure 3:
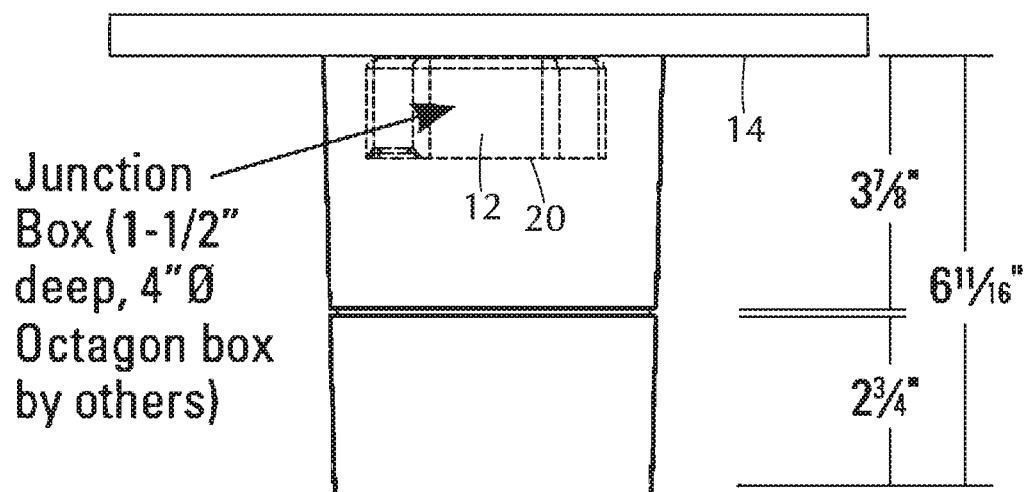
FIG. 3 is a side elevation view of the light fixture in a surface mount configuration.

Referring to FIGS. 1-3 the light fixture 10 is particularly suitable for use with a standard "octagonal" electrical junction box 12 (e.g., 4 inch diameter). Such junction boxes typically have a substantially planar base 16 or bottom which forms a closed end and is adapted to contact and mount to a planar mounting surface 14, such as a ceiling or a wall. An integral circumferential side wall 18 extends from the base and has a circumferential edge 20 lying on a plane defining an open top, where the base and the side wall form a partial enclosure. The junction box 12 can have mounting locations 22 (e.g., threaded openings) on opposing sides of the side wall 18 adapted to receive fasteners. The junction box 12 has a predetermined height (or depth) as measured from an outside surface of the base 16 (i.e., the mounting-surface-contacting-side of the base) to the circumferential edge 20 which can be for example 1.5 inches. Thus, when the base 16 of the junction box is mounted to the mounting surface 14, the circumferential edge 20 will be spaced from the mounting surface 14 a distance equal to the height of the junction box 12.

In embodiments of the light fixture shown and described, the light fixture and junction box are mounted to a ceiling structure and therefore the junction box is in an inverted orientation with the side wall projecting downwardly from the base. However, it can be appreciated that other orientations of the light fixture are within the scope of the invention.

Figure 4:
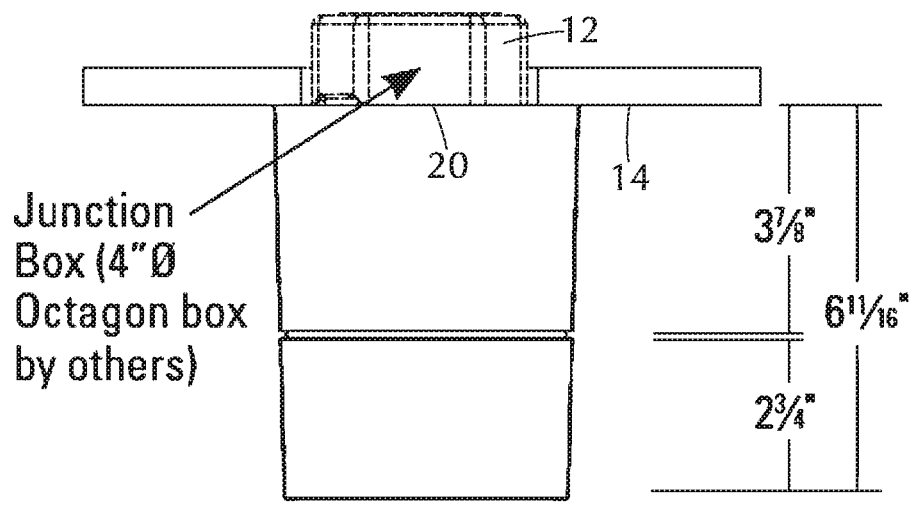
FIG. 4 is a side elevation view of the light fixture in a recess mount configuration.
Figure 5:
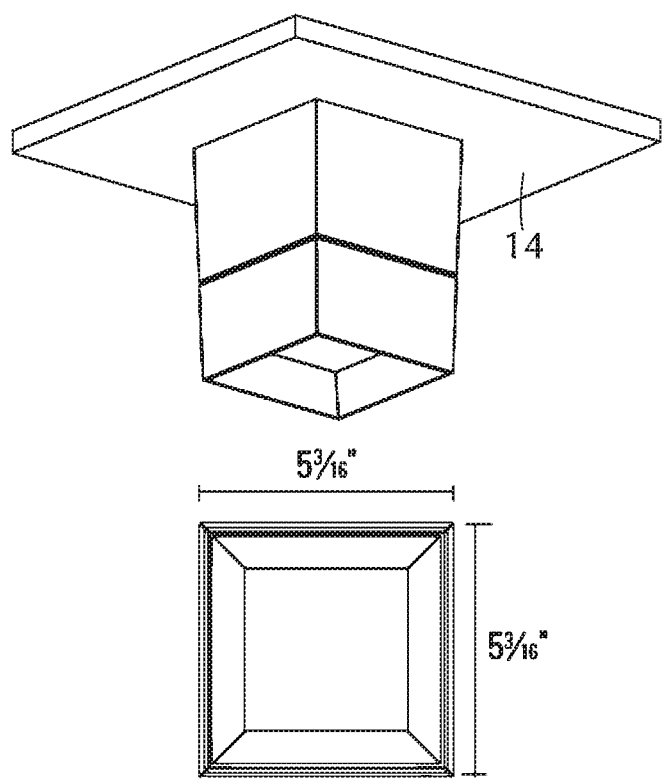
FIG. 5 is perspective view and a bottom view of the light fixture fully assembled.
Figure 6:
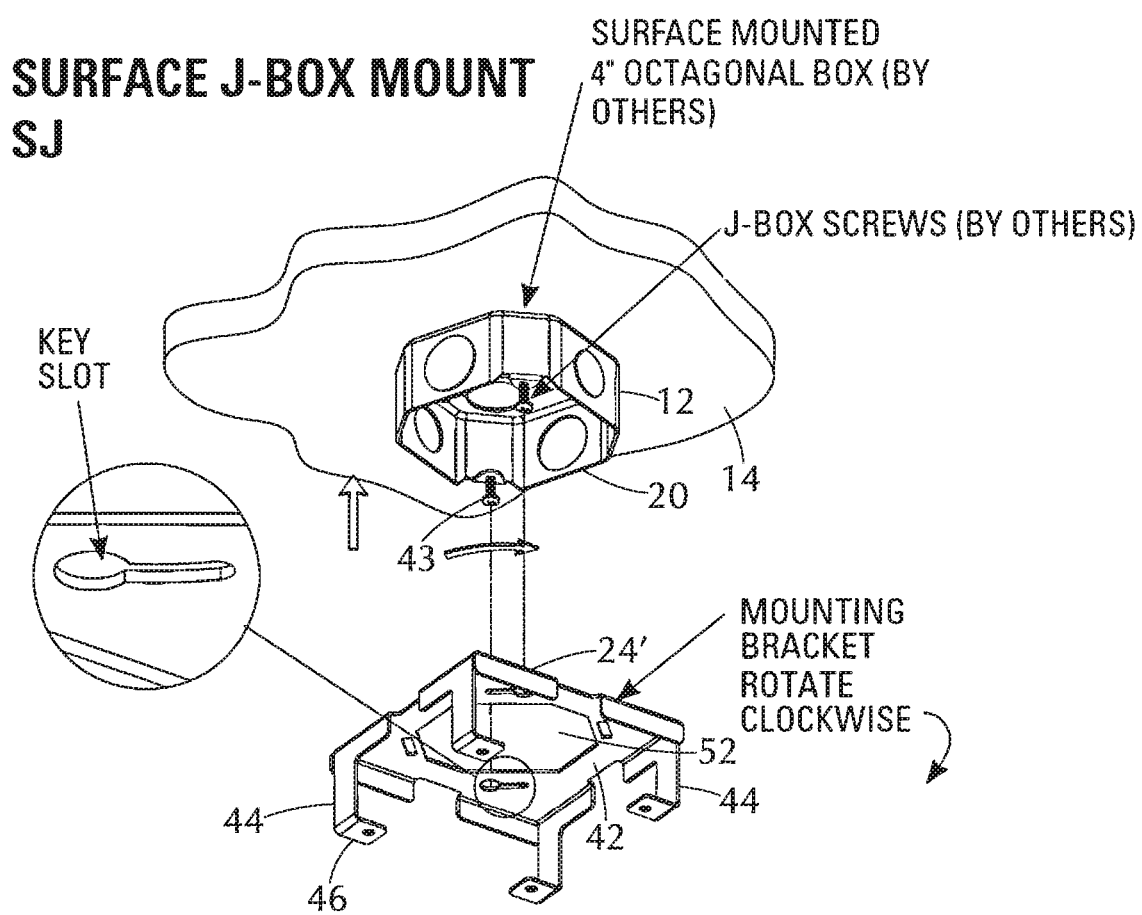
FIG. 6 is an assembly view of a surface mounted junction box and a short mounting bracket.
Figure 7:
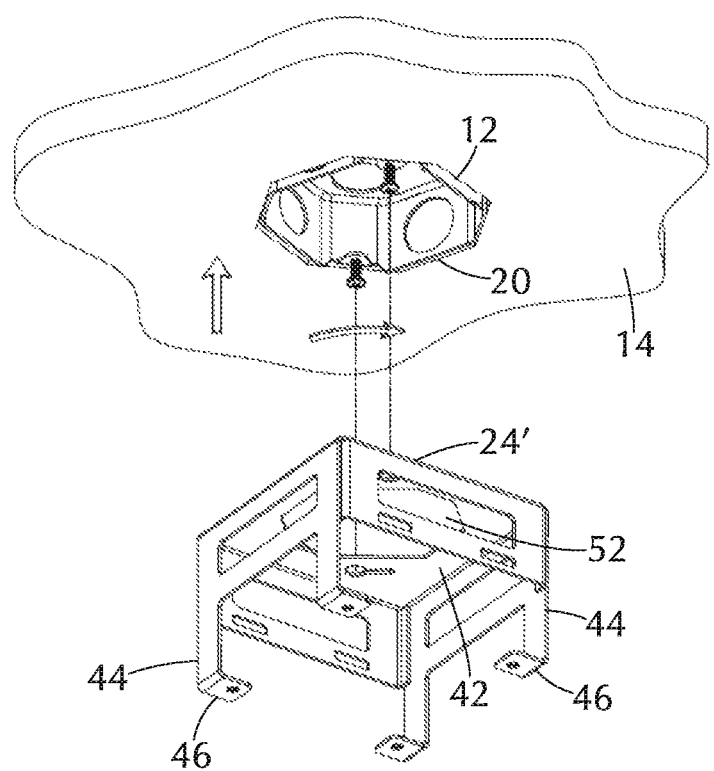
FIG. 7 is an assembly view of a recess mounted junction box and a long mounting bracket.
Figure 8:
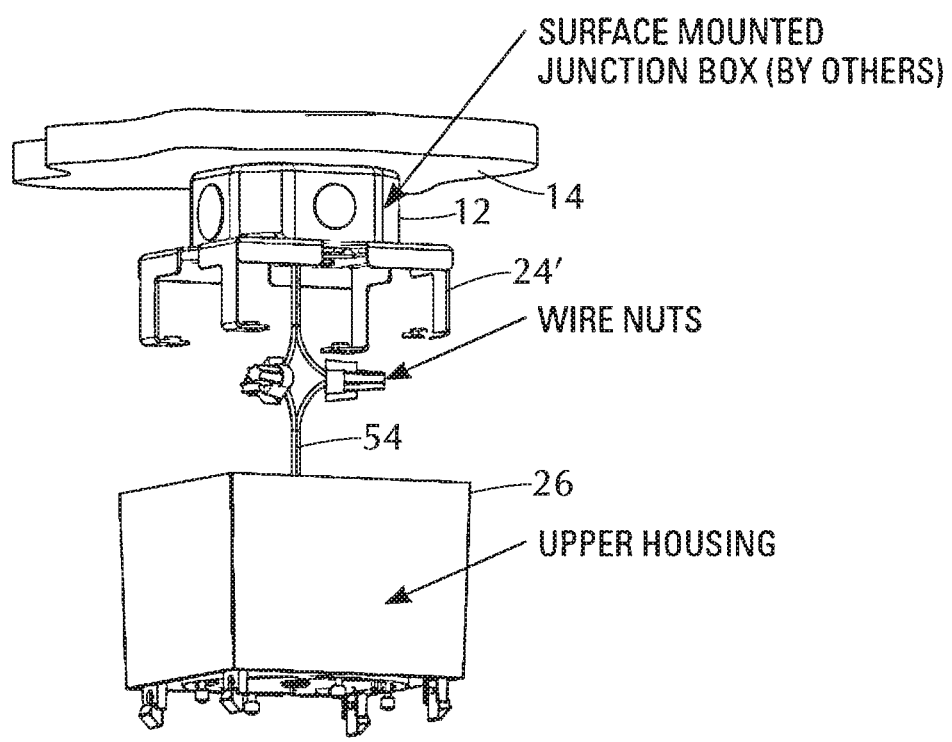
FIG. 8 is an assembly view of a surface mounted junction box, a short mounting bracket, and upper housing.
Figure 9:
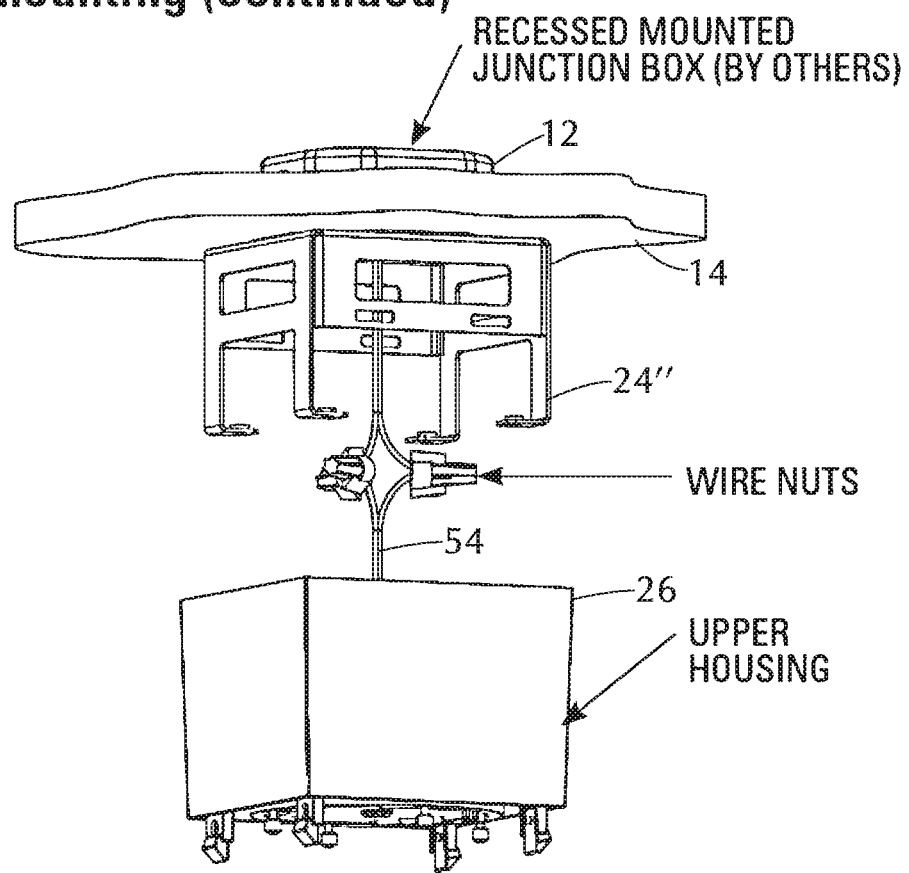
FIG. 9 is an assembly view of a recess mounted junction box, a long mounting bracket, and upper housing.
Figure 10:
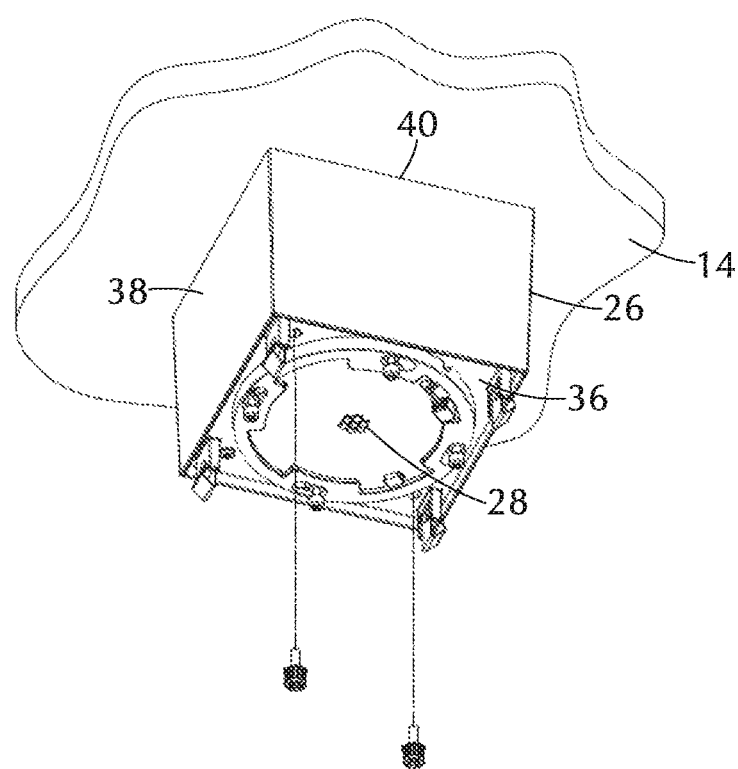
FIG. 10 is a perspective view of the upper housing affixed to a mounting bracket.

Referring to FIGS. 3-5, in a surface mount configuration (FIG. 3), the junction box 12 is mounted to the mounting surface 14 with the base 16 of the junction box mounted to and flush or substantially co-planar with (i.e., abutting) a room-facing lower surface of the mounting surface. In a recess mount configuration (FIG. 4), the junction box 12 is mounted within a recess or hole in the mounting surface 14 with the circumferential edge 20 of the side wall 18 of the junction box 12 flush or co-planar with the lower (room-facing) surface of mounting surface 14, or substantially so. Typically, in a recess mount configuration, the opening in the mounting surface 14 is sized and shaped to closely surround the side wall 18 of the recessed junction box 12 (See FIG. 7).

Referring to FIGS. 6-14C, an embodiment of the light fixture includes a mounting bracket 24', 24" which mounts to and depends downwardly from the junction box 12, an upper housing 26 (or "canopy") which mounts to and surrounds and conceals the mounting bracket 24', 24" and junction box 12, a lighting element 28 (such as an LED lighting element) mounted to a bottom wall 36 (i.e., room-facing portion) of the upper housing 26, an optical reflector 30 which mounts to and depends downwardly from the bottom wall 36 of the upper housing, and a lower housing 32 which mounts to and depends downwardly from the upper housing 26.

The optical reflector 30 is adapted to reflect light generated by the lighting element 28 and redirect such light toward the room. The lower housing 32 surrounds the optical reflector 30 and has an opening forming an aperture 34 through which light can pass into the room.

The upper housing 26 has a bottom wall 36 and a circumferential side wall 38 having a circumferential edge 40 lying on a plane wherein the bottom wall 36 and side wall 38 form a partial enclosure with an open end defined by the circumferential edge 40.

In either the surface-mount or recess-mount configuration (FIG. 5), the circumferential edge 40 of the upper housing 26 is flush/co-planar with (i.e., abuts) the mounting surface 14 so the lighting fixture has the same external appearance and size in both the surface mount and recess mount configurations.

For the surface mount configuration (FIG. 6), the light fixture has a relatively short mounting bracket 24', and for a recess mount configuration (FIG. 7) the light fixture has a relatively long mounting bracket 24". The long and short mounting brackets each have a planar base 42 which is adapted to abut the circumferential edge 20 of the junction box 12 and to connect to the junction box via fasteners 43 directed through the base 42 and into the mounting locations 22 of the junction box 12. A lateral width (or diameter) of the base 42 of the mounting bracket 24', 24" is preferably wider than a lateral width (or diameter) of the junction box 12 such that the base 42 extends laterally outwardly from the junction box 12 on all sides (or at least two opposed sides). Thus, in the event that a recessed junction box is recessed too deeply (i.e., the circumferential edge of the junction box is itself recessed within the ceiling), the base of the mounting bracket will contact (and be properly positioned by) the mounting surface.

The mounting bracket 24', 24" can have a set of preferably equal length, parallel legs 44 (e.g., 4 legs) extending from the base 42 (e.g., depending vertically downwardly, perpendicular to the base). Free ends of the legs 44 have engagement portions 46 (which can be aligned horizontally or parallel to the base of the mounting bracket) and which are each adapted to contact and/or closely abut (e.g., spaced about 0.00-0.16 inches from) an associated contact surface 48 within the interior of the upper housing 26 and to engagingly receive a fastener 50 (e.g., screw) directed through the bottom wall 36 and the associated contact surface 48, from the room-facing side of the upper housing 26, to affix the upper housing 26 to the mounting bracket 24', 24" (See FIG. 10).

A spacing between the contact surfaces 48 and the circumferential edge 40 of the upper housing 26 (herein defined as the "contact spacing") is preferably fixed and is preferably equal for all (e.g., all 4) contact surfaces 48. Preferably, the contact spacing is greater than the height of the junction box 12 (as defined above) and less than a height (or depth) of the upper housing 26 (as measured between the bottom wall 36 and the circumferential edge 40 of the upper housing 26). For example, the contact spacing can be 3.45 inches. A height of the mounting brackets 24', 24" (or the length of the legs of the mounting brackets), as measured from the base 42 to the engagement portions 46, is sized such that the engagement portions 46 of the legs contact or closely abut the contact surfaces 48 of the upper housing 26 when mounting bracket 24', 24" is mounted to the junction box 12 and the circumferential edge 40 of the upper housing is flush with (i.e., abuts) the mounting surface 14.

To accommodate the different positions of the circumferential edge 20 of the junction box 12 as between the surface mount and recess mount configurations, the legs 44 of the long mounting bracket 24" are longer than the legs of the short mounting bracket 24', and the difference in the length is equal to the height of the junction box (e.g., 1.5 inches), as measured from the mounting-surface-contacting-side of the base 16 of the junction box 12 to the circumferential edge 20 thereof. In this manner, with the properly selected mounting bracket, the engagement portions 46 of the legs will be spaced from mounting surface 14 the same distance in both the surface mount and recess mount configurations, for proper positioning and mounting of the upper housing 26. Thus, when the long mounting bracket 24" is connected to the upper housing 26, the base 42 of the mounting bracket 24" is substantially aligned with or co-planar with the circumferential edge 40 of the upper housing 26, and is properly positioned to engage the circumferential edge 20 of the junction box which is co-planar with the mounting surface. When the short mounting bracket 24' is connected to the upper housing 26, the base 42 of the mounting bracket is recessed within the upper housing from the circumferential edge 40 of the upper housing a distance corresponding to the height of the junction box 12, and is properly positioned to engage the circumferential edge 20 of the junction box 12 spaced from the mounting surface.

Thus, the height of the mounting bracket is substantially equal to (e.g., equal to or slightly less than, such as 0.00-0.16 inches less than) the contact spacing less a distance between the circumferential edge 20 of the junction box 12 (as mounted) and the mounting surface 14 (e.g., ceiling). Therefore, the long mounting bracket 24", for use in the recess mount configuration, has a height substantially equal to (or slightly less than) the contact spacing because the circumferential edge 20 of the junction box is aligned with (i.e., co-planar) with the mounting surface 14 (ceiling). Whereas the height of the short mounting bracket 24', for use in the surface mount configuration, is less than that of the long mounting bracket by a distance equal to the height of the junction box 12. For example, the height of the long mounting bracket 24" can be about 3.29 inches and the height of the short mounting bracket 24' can be about 1.79 inches.

Prior to mounting the upper housing 26 to the appropriate mounting bracket 24', 24", wiring connections can be made between wiring in the junction box and wiring leading to the lighting element 28 and/or lighting driver within the upper housing 26. The wiring in the junction box can be connected to a power source and/or controls, for example, via wiring within the ceiling. The base 42 of the mounting bracket 24', 24" can include a hole 52 for passage of the wiring 54.

To mount the upper housing 26 to the mounting bracket 24', 24", fasteners 50 are directed through the bottom wall 36 of the upper housing 26, from the room-facing side thereof, through the associated contact surfaces 48 and into the engagement portion 46 of the associated leg 44 of the mounting bracket 24', 24". (See FIGS. 10, 13B/C and 14B/C).

Figure 11:
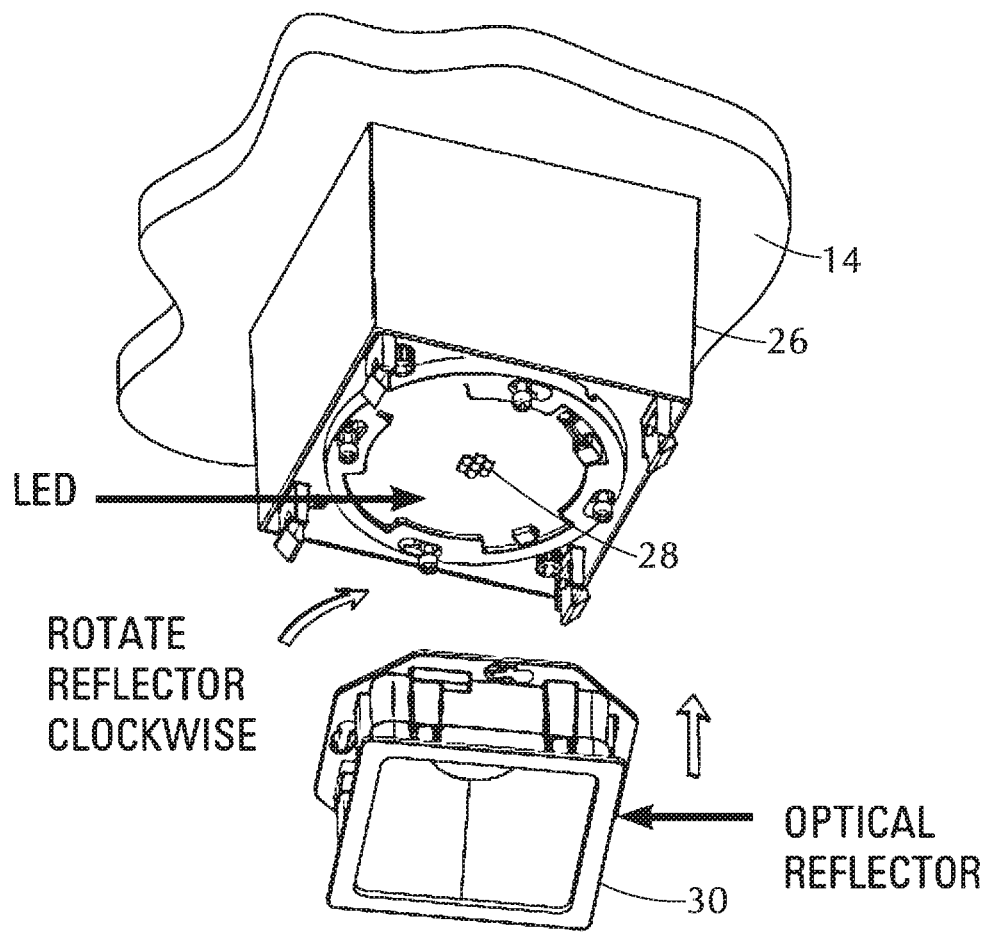
FIG. 11 is an assembly view of the optical reflector and the upper housing.
Figure 12:
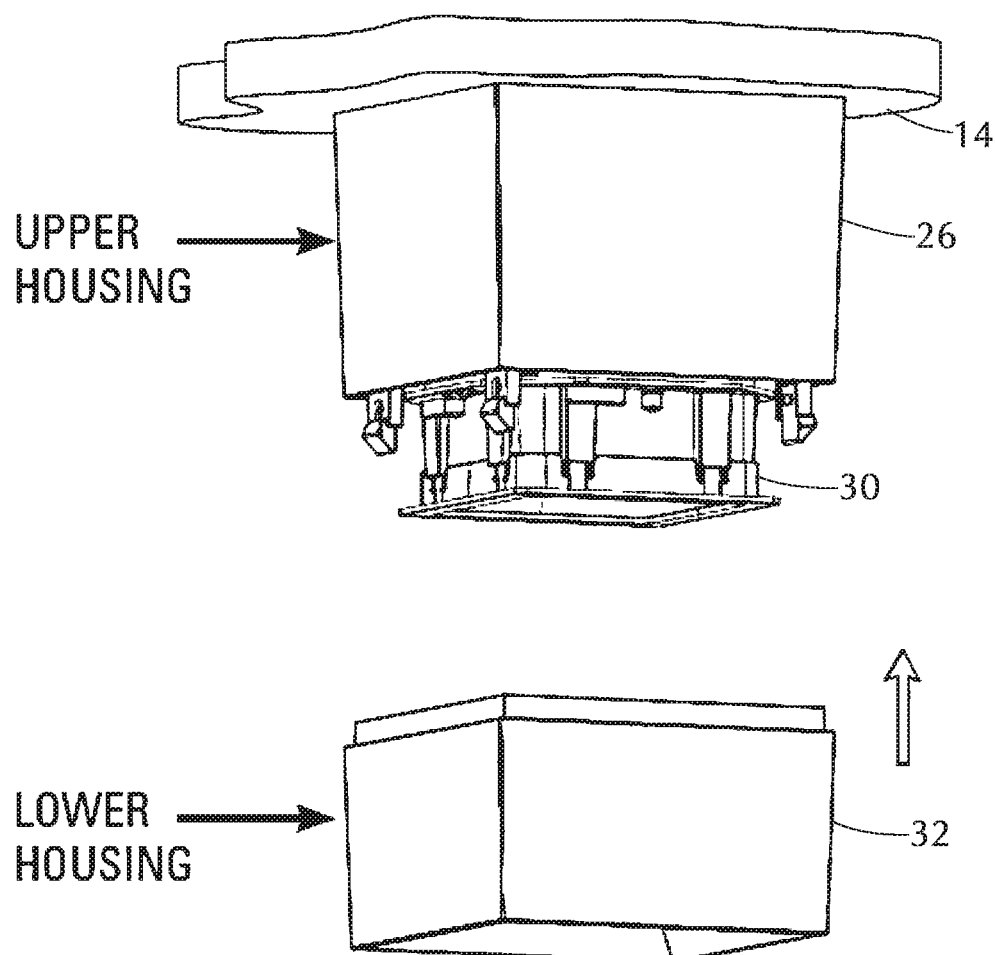
FIG. 12 is an assembly view of the upper housing and lower housing.

After affixing the upper housing 26 to the mounting bracket 24', 24", the optical reflector 30 can be mounted to the bottom wall 36 of the upper housing 26 (FIG. 11). Thereafter, the lower housing 32 can be mounted to the upper housing 26 (FIG. 12) As shown, the bottom wall 36 of the upper housing 26 can include downwardly depending resilient mounting tabs 57 which engage and removably mount the lower housing 32. While this is the preferred assembly sequence all other sequences are also contemplated.

In both the surface-mount and recess-mount configurations, the mounting bracket 24', 24" is within an interior of the upper housing 26 such that the upper housing 26 surrounds and encloses the mounting bracket 24', 24". In the surface mounted configuration, the junction box 12 is below the mounting surface 14 and is within the interior of the upper housing 26 and the upper housing therefore also surrounds and encloses the junction box 12. The circumferential edge 40 of the upper housing 26 lies on (or substantially on) a plane such that when the upper housing 26 is mounted against the mounting surface 14 the edge 40 abuts mounting surface. Thus, in both the surface mount and recess mount configuration, the upper housing 26 and mounting surface 14 enclose and conceal the mounting bracket 24', 24", junction box 12 and wiring 54 connections.

As depicted the upper housing 26 may be in the form of a five-sided enclosure, having a substantially horizontal bottom wall 36 (supporting the lighting element 28, e.g., LEDs) which is (preferably integrally) connected to four substantially vertical orthogonal side walls, with the upper edges of the side walls forming a rectilinear (e.g., substantially square) circumferential upper edge 40. The entire circumferential edge 40, (or a majority thereof) lies on a common plane such that the upper housing 26 will be properly aligned when disposed against the planar mounting surface 14, such as the lower surface of the ceiling.

Figure 13A:
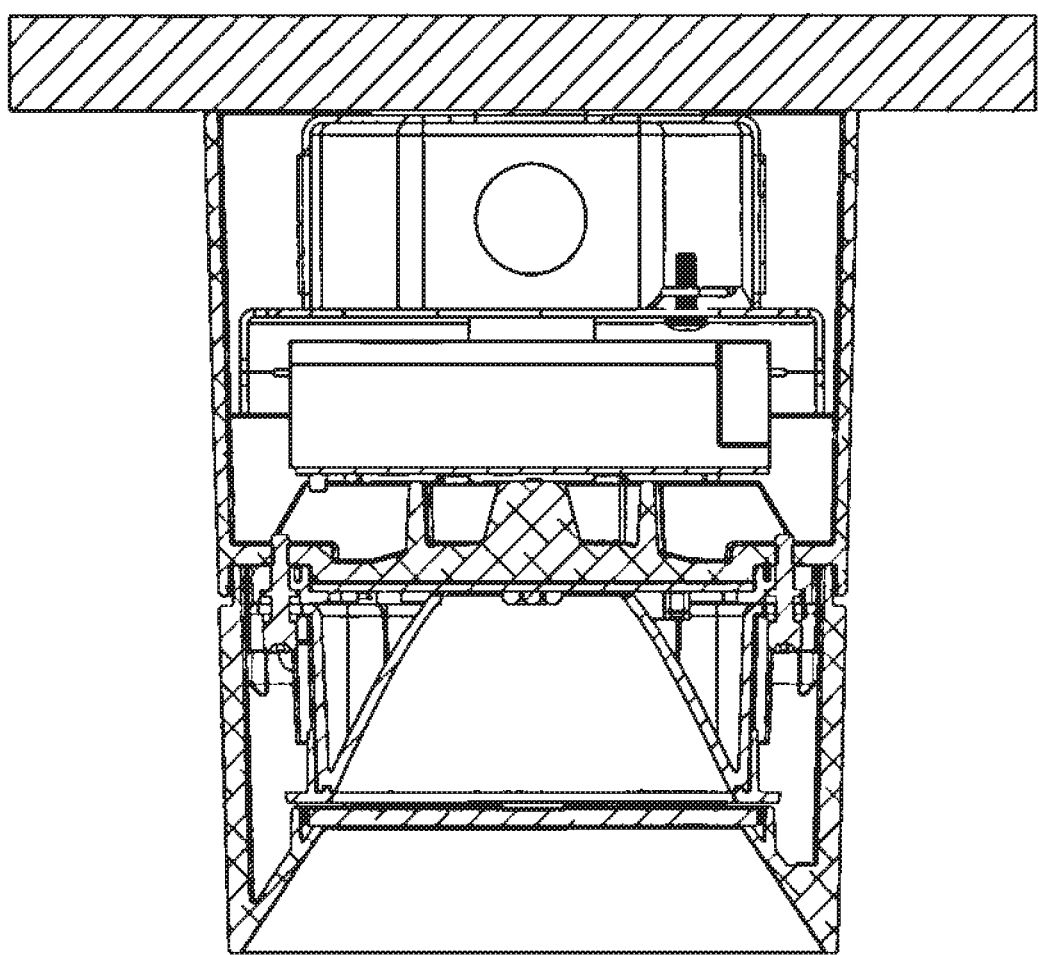
FIG. 13A-13C are cross section views of the light fixture in a surface mount configuration.
Figure 13B:
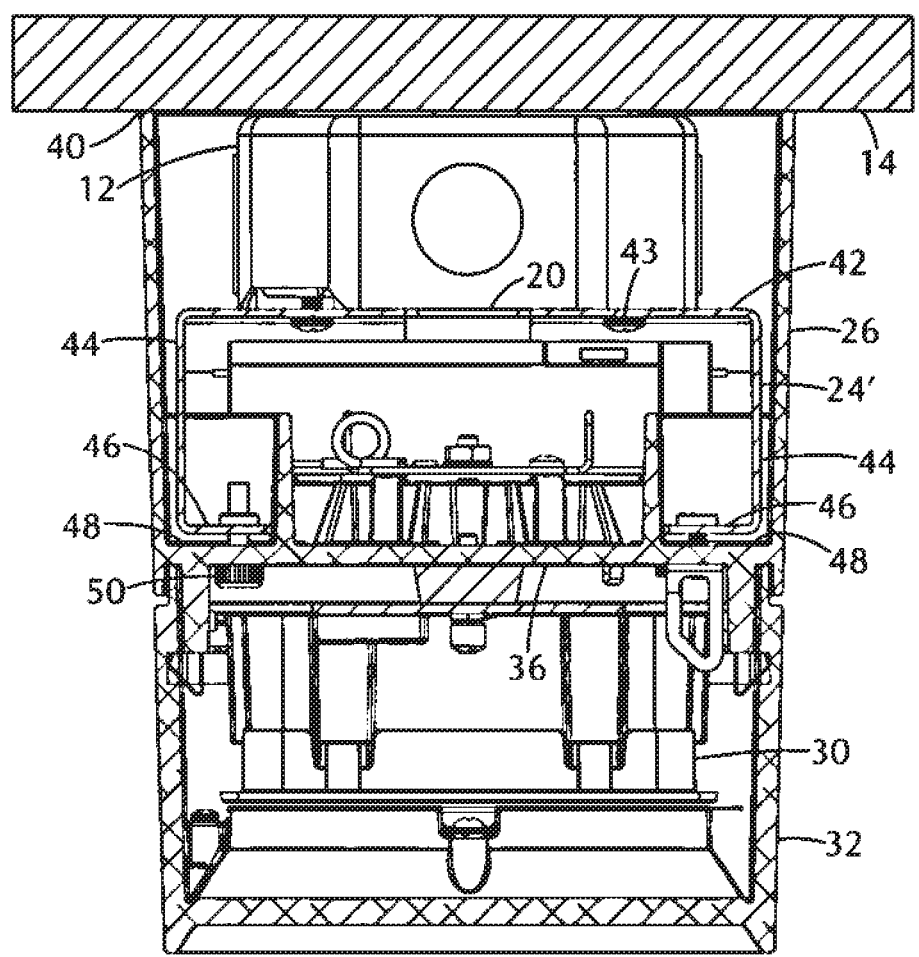
Figure 13C:
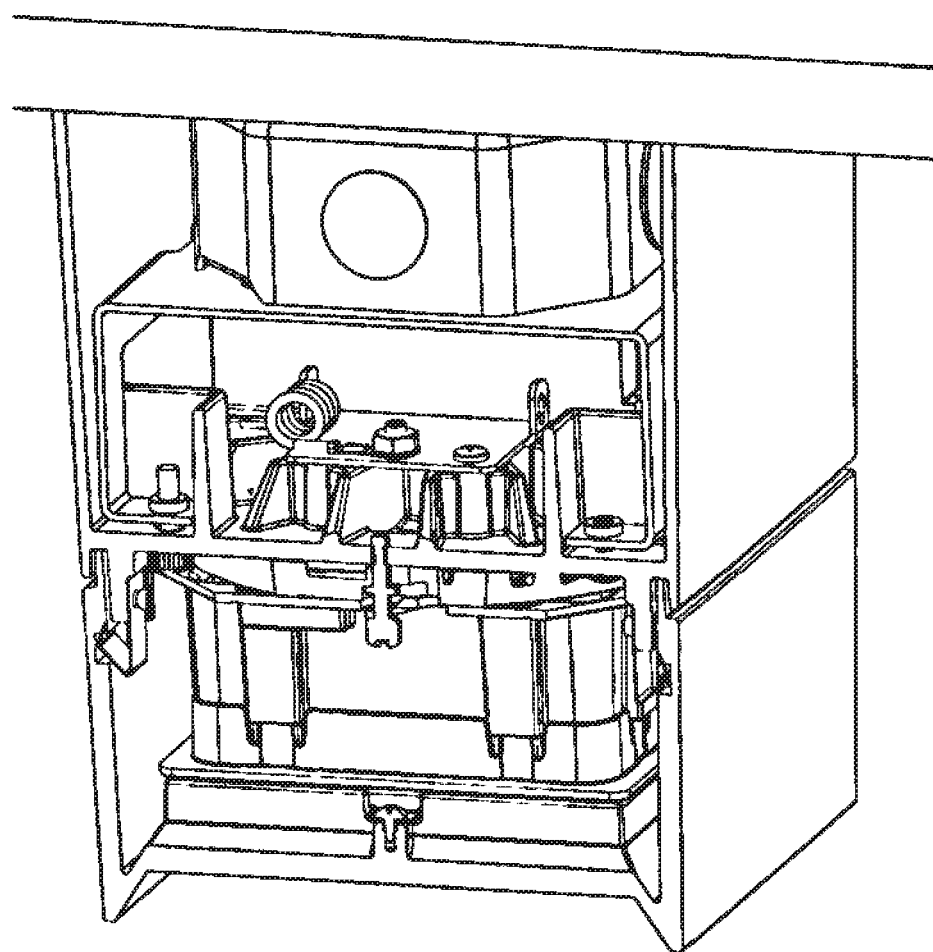

Referring to FIGS. 13A-13C, cross sections of the surface mount configuration is shown, including the short mounting bracket 24'.

Figure 14A:
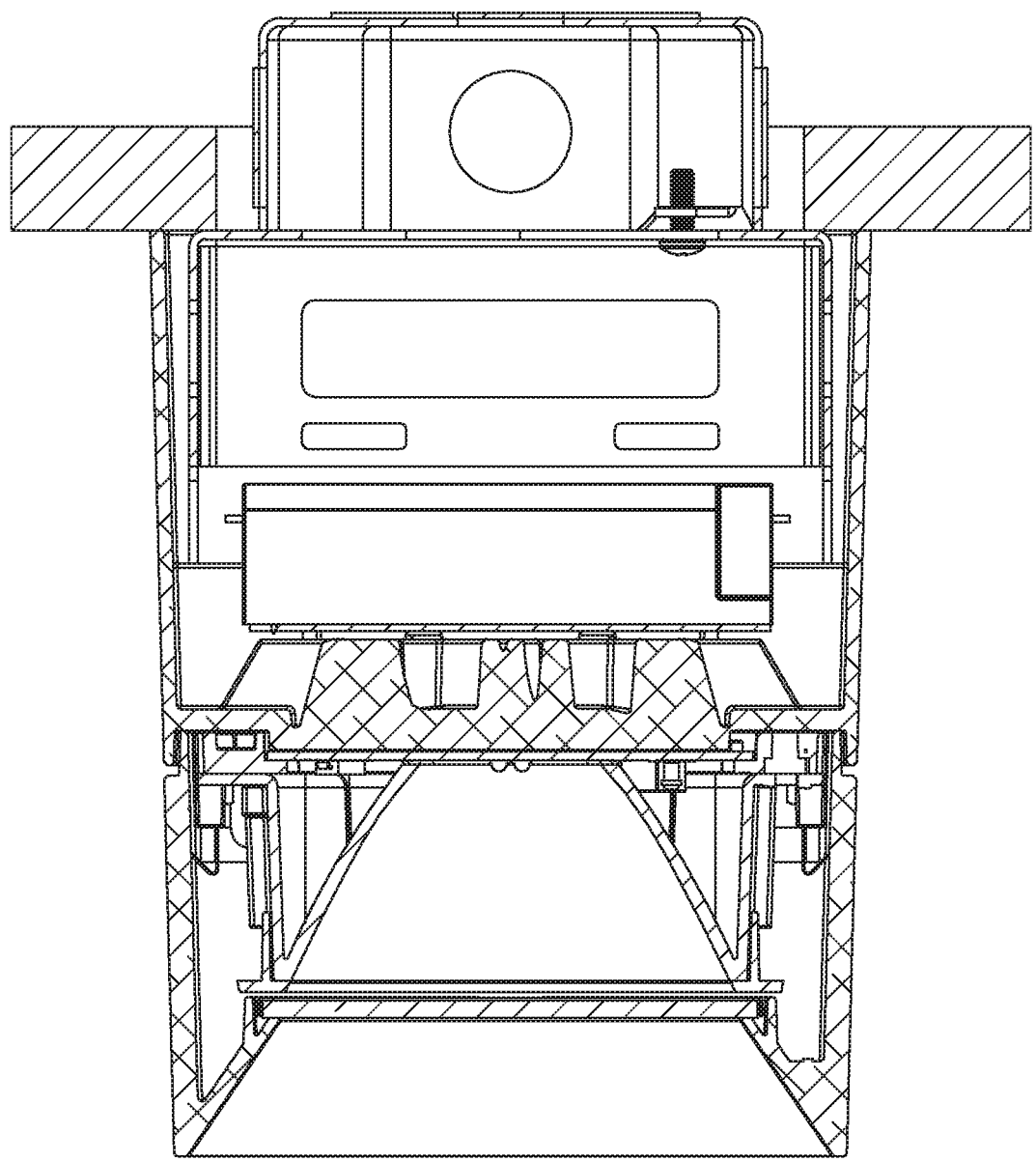
FIG. 14A-14C are cross section views of the light fixture in a recess mount configuration.
Figure 14B:
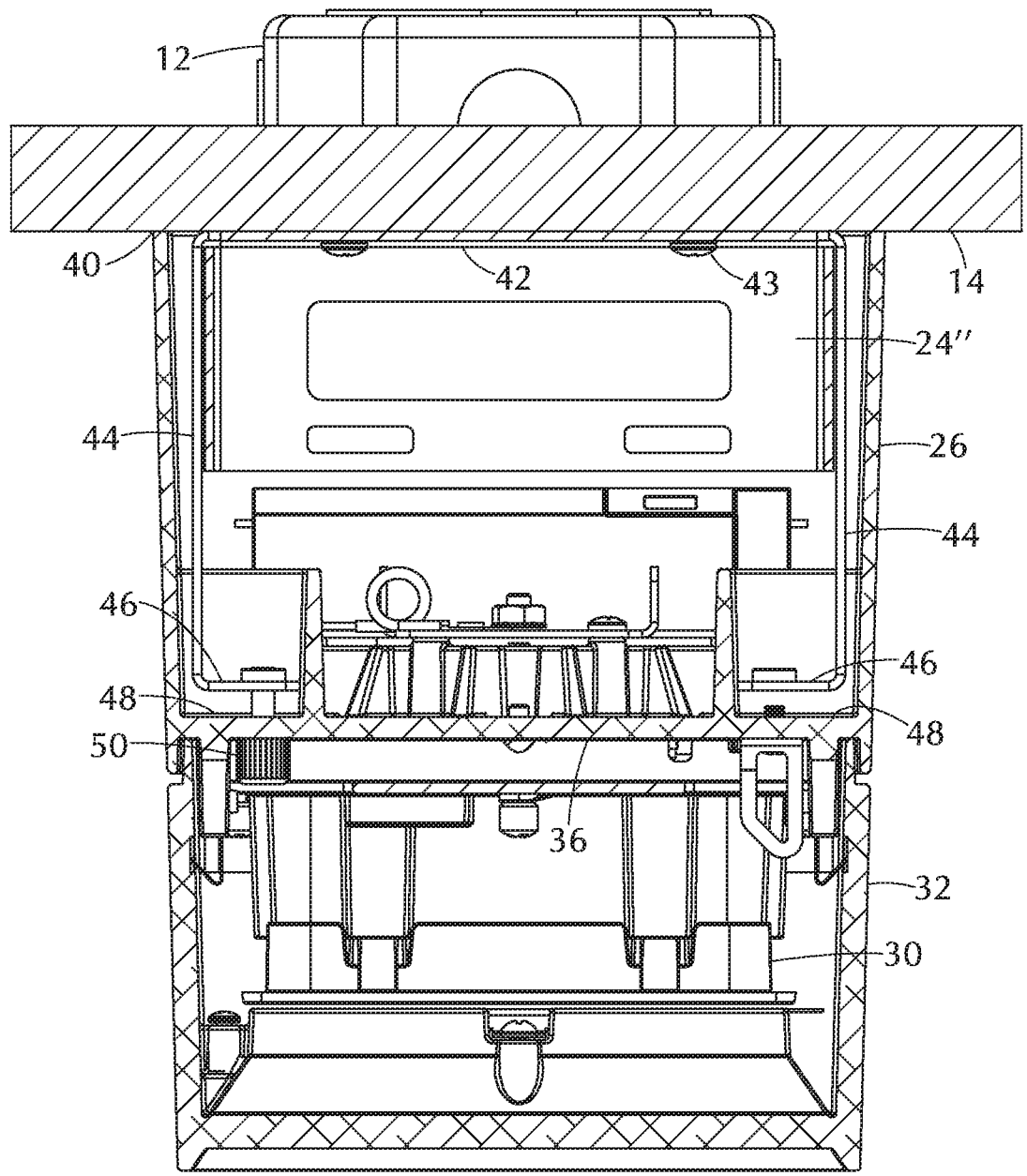
Figure 14C:
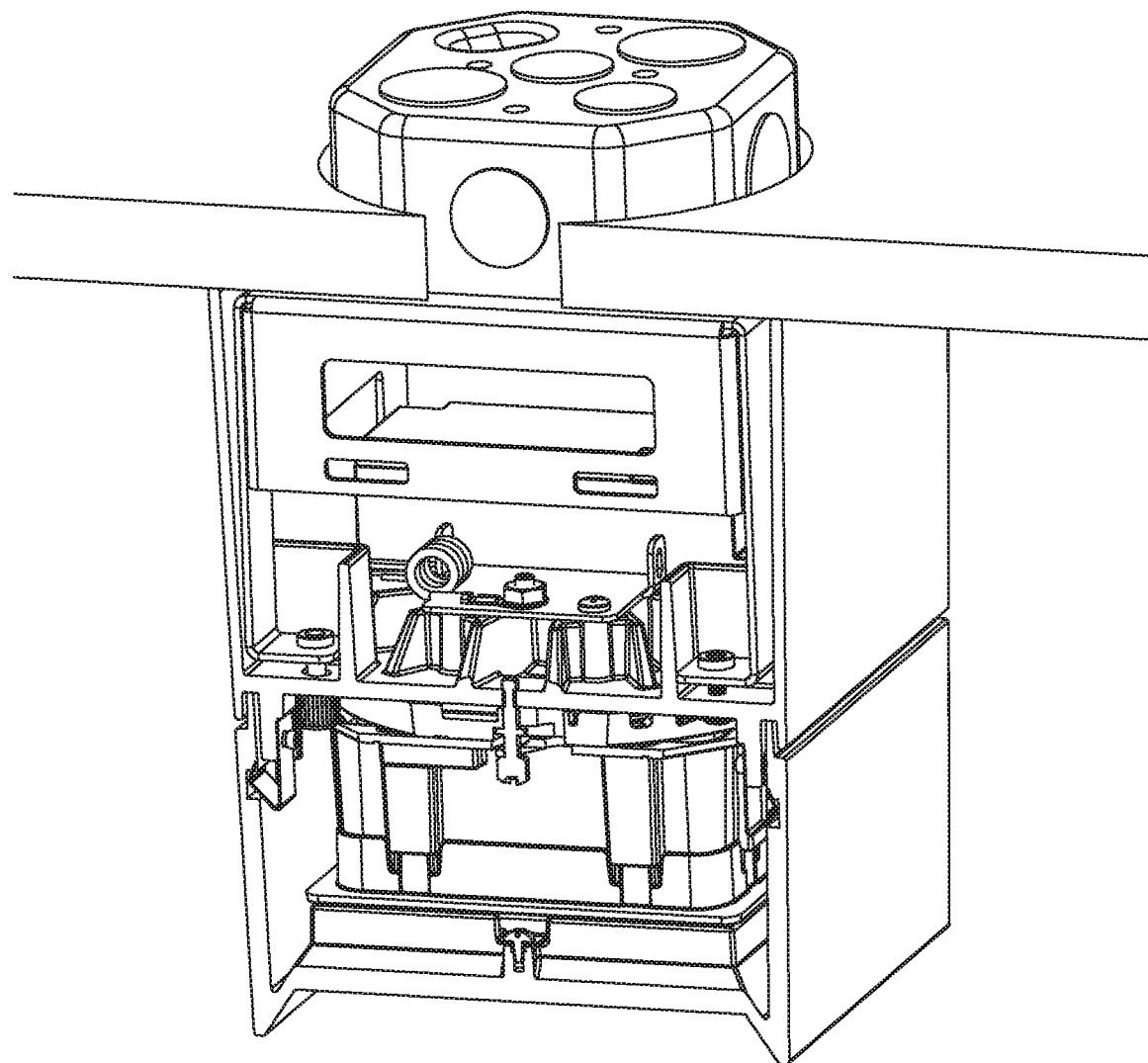

Referring to FIGS. 14A-14C, cross sections of the recess mount configuration is shown, including the long mounting bracket 24".

Figure 15:
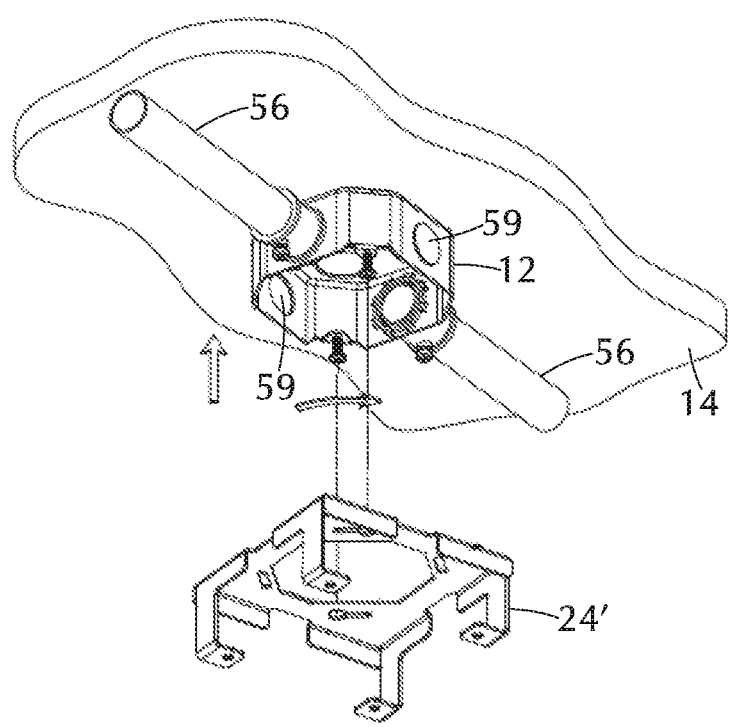
FIG. 15 is an assembly view of surface mounted conduit, a surface mounted junction box and a short mounting bracket.
Figure 16:
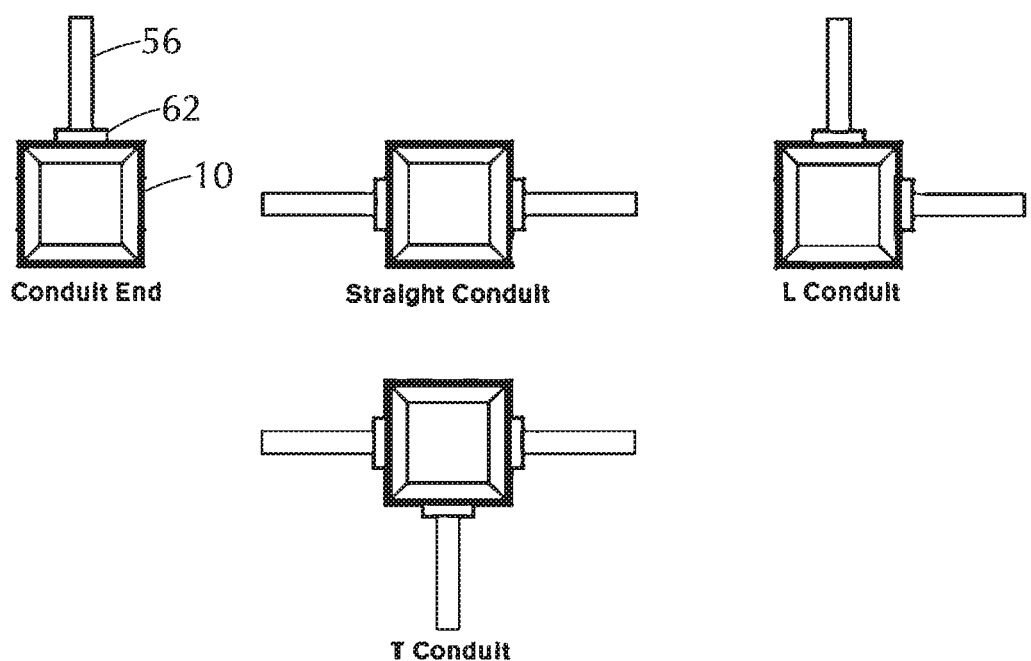
FIG. 16 is a view of various configurations of surface mounted conduit.

Referring to FIG. 15-16, the light fixture is suitable for use with a junction box 12 having surface mounted electrical conduit 56 connected thereto. This configuration is similar to the surface mount configuration discussed above however, surface mount conduit 56 is disposed along (e.g., substantially flush with) the mounting surface 14 and extends into the surface mounted junction box 12. As shown in FIG. 16, the light fixture can accommodate various configurations of surface mount conduits, including 1 (end), 2 (straight, or L), 3 (T), and 4 conduits (not shown), and other configurations.

Figure 17:
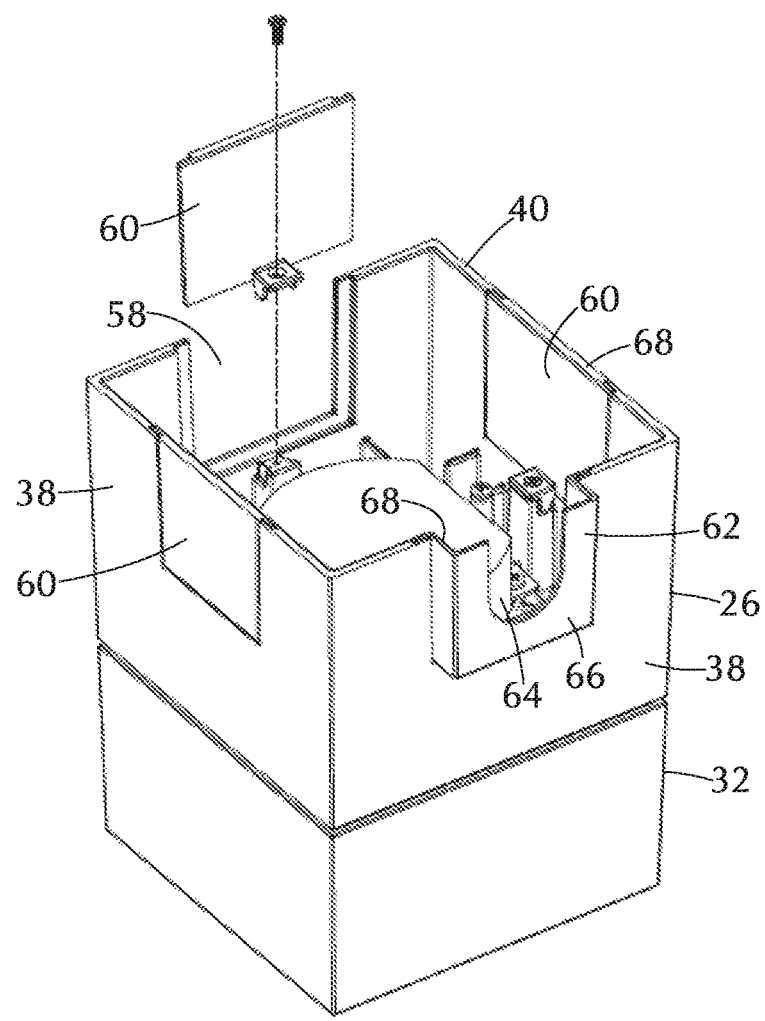
FIGS. 17 and 18 are assembly views of the upper and lower housings showing the cutouts and cutout keys.
Figure 18:
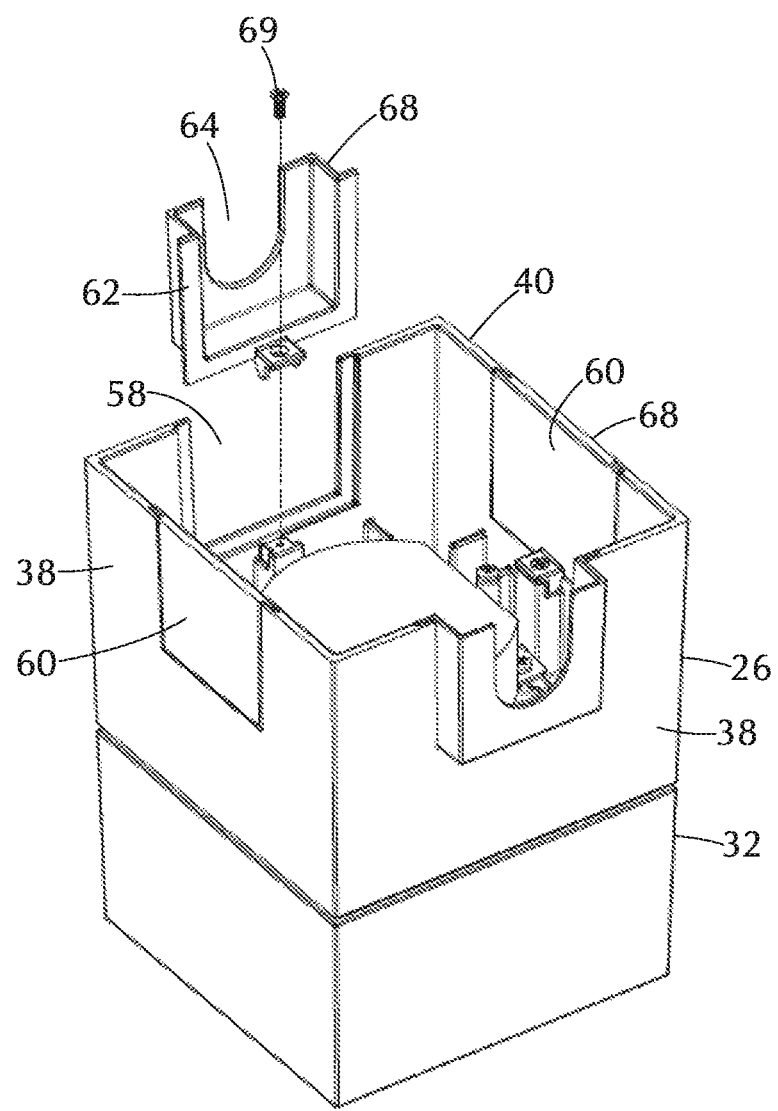
Figure 19:
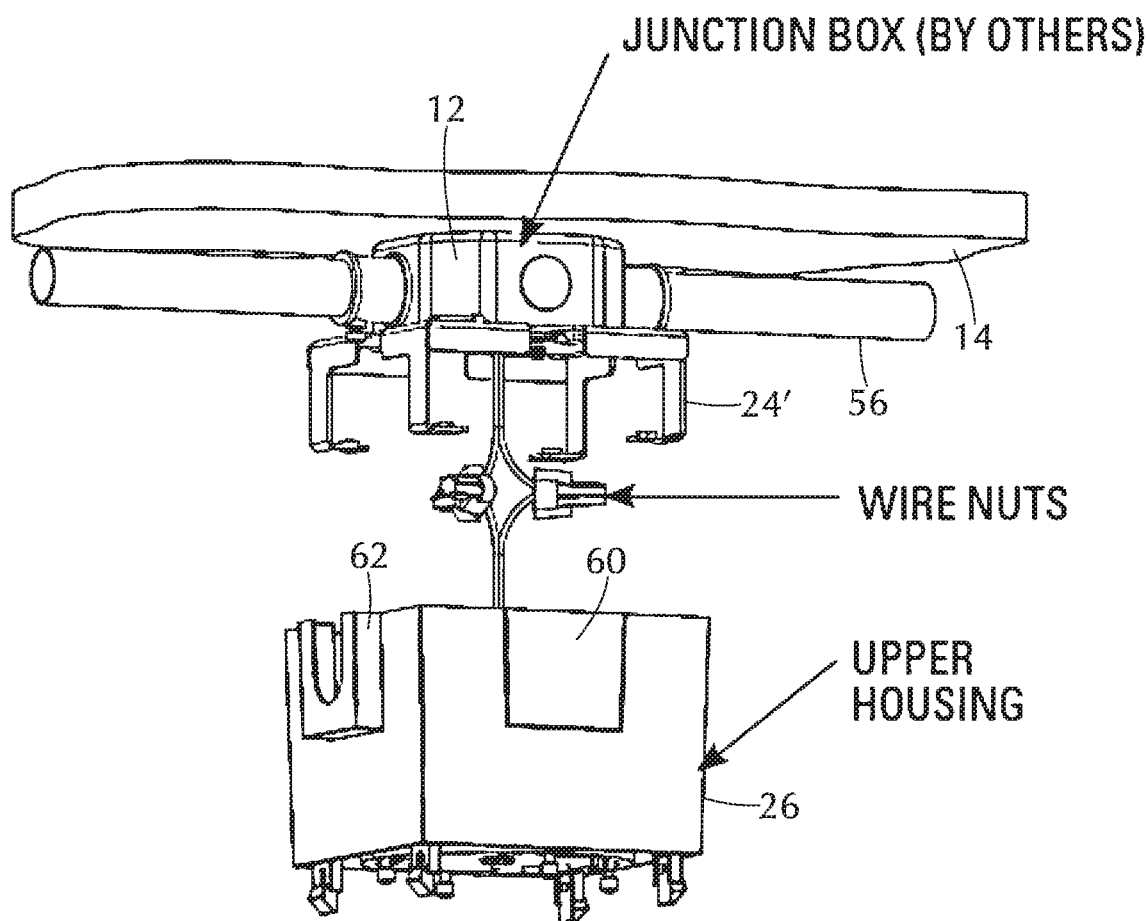
FIG. 19 is an assembly view of a surface mounted junction box, surface mounted conduit, a short mounting bracket, and upper housing with cutouts and cutout keys.
Figure 20:
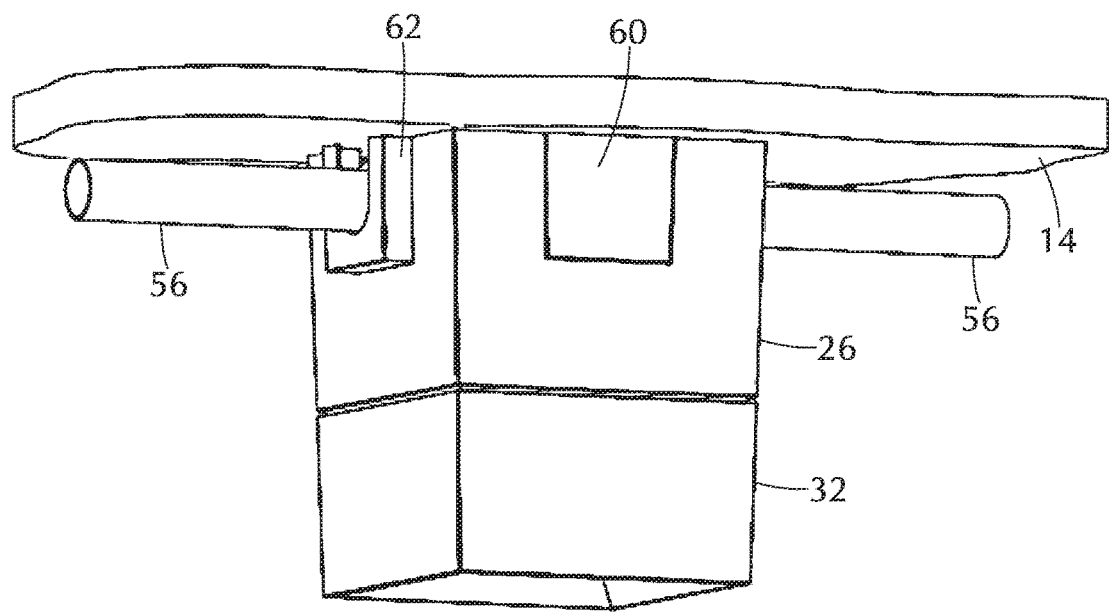
FIG. 20 is a perspective view of an assembled light fixture in the surface mount conduit configuration.
Figure 21:
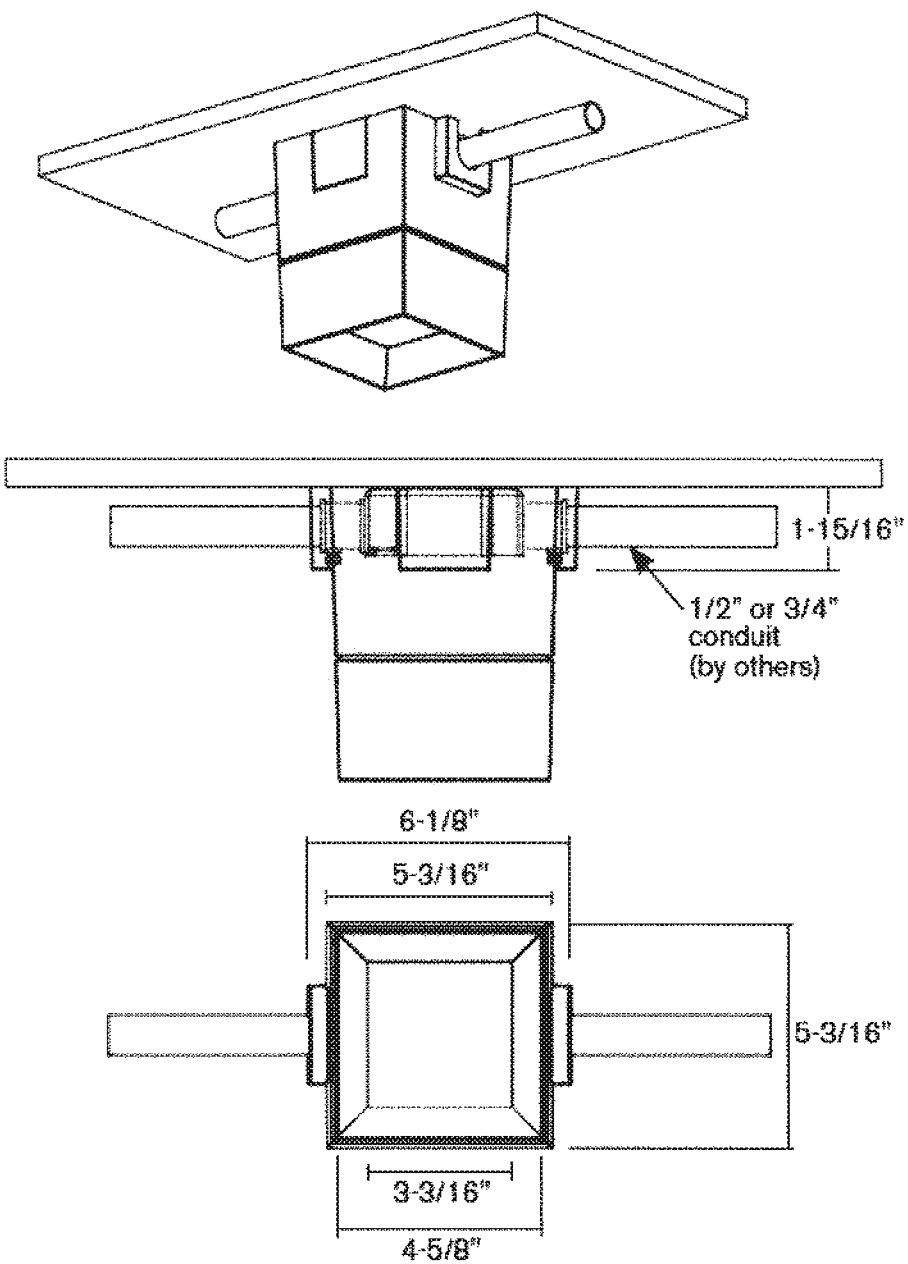
FIG. 21 are perspective, side and bottom views of an assembled light fixture in the surface mount conduit configuration.
Figure 22:
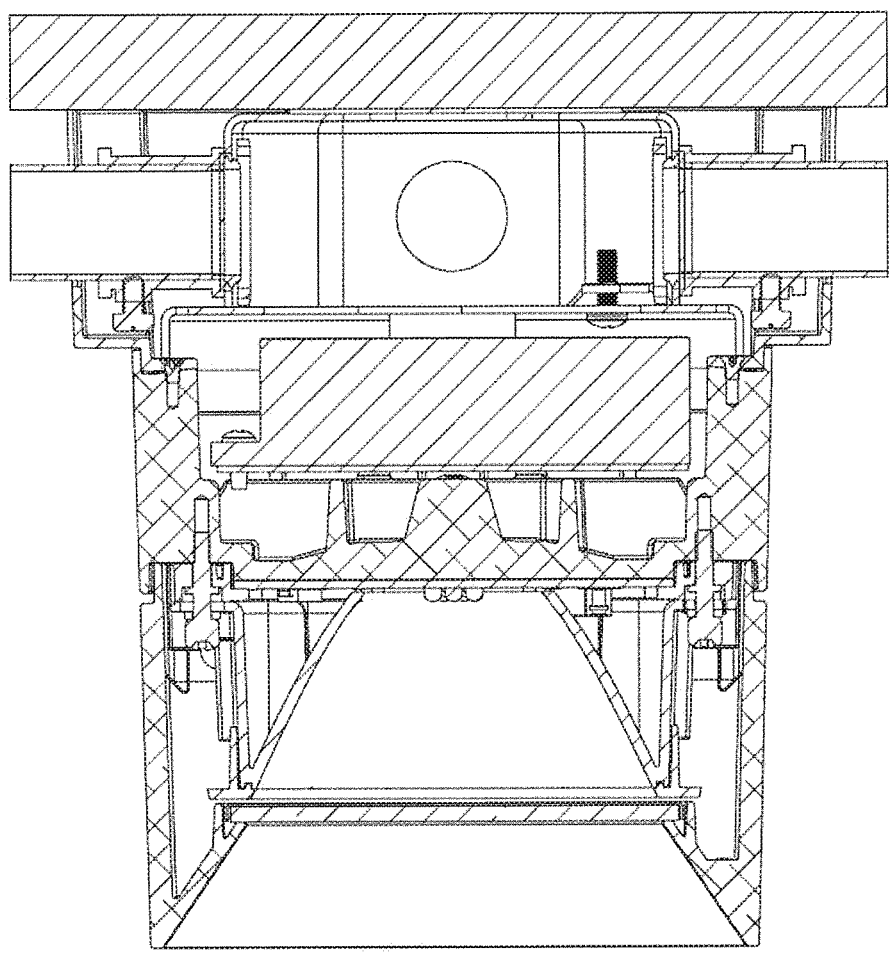
FIG. 22 is a cross section view a light fixture in the surface mount conduit configuration.
Figure 23B:
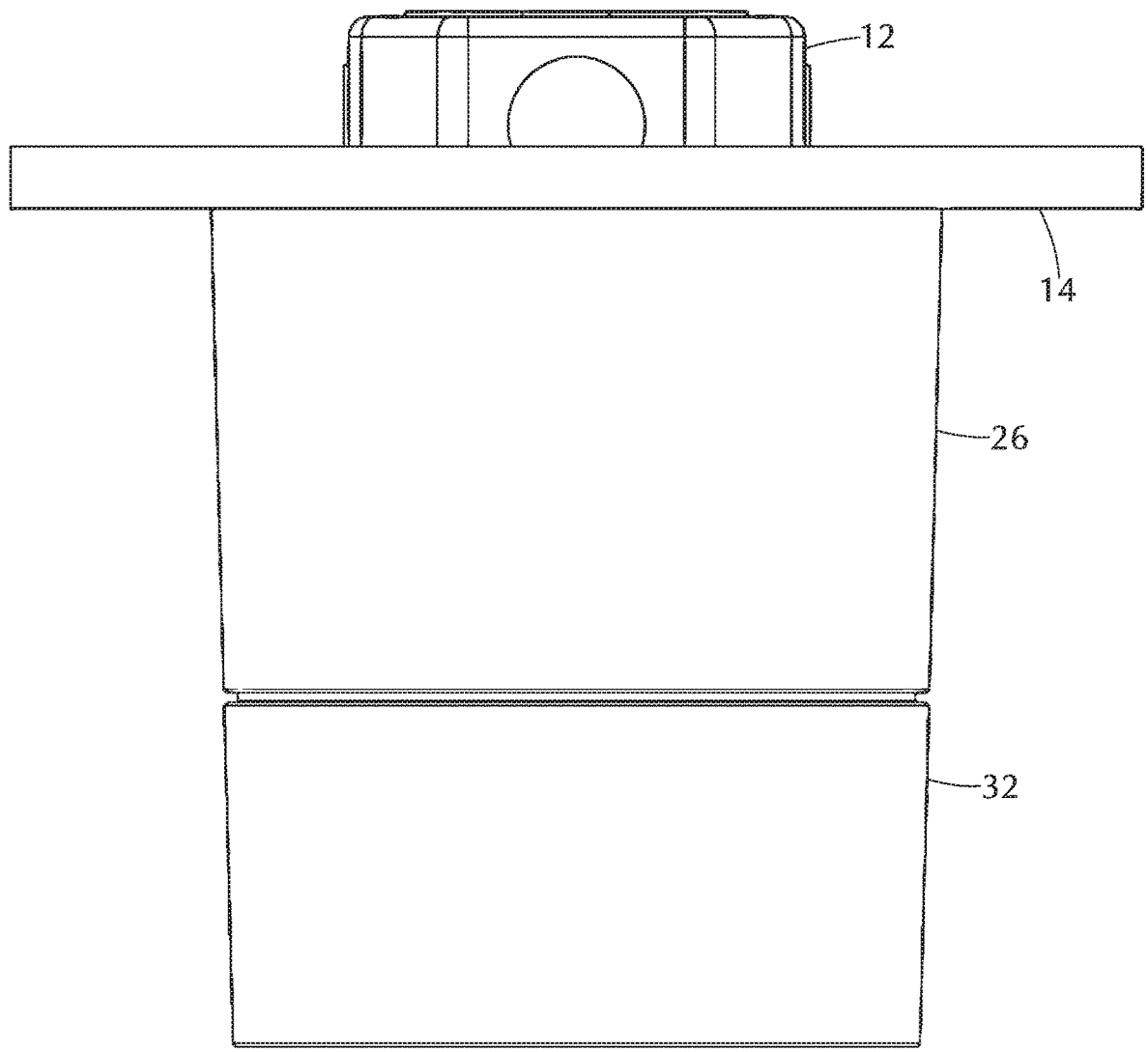
FIG. 23B is a side view thereof.
Figure 24:
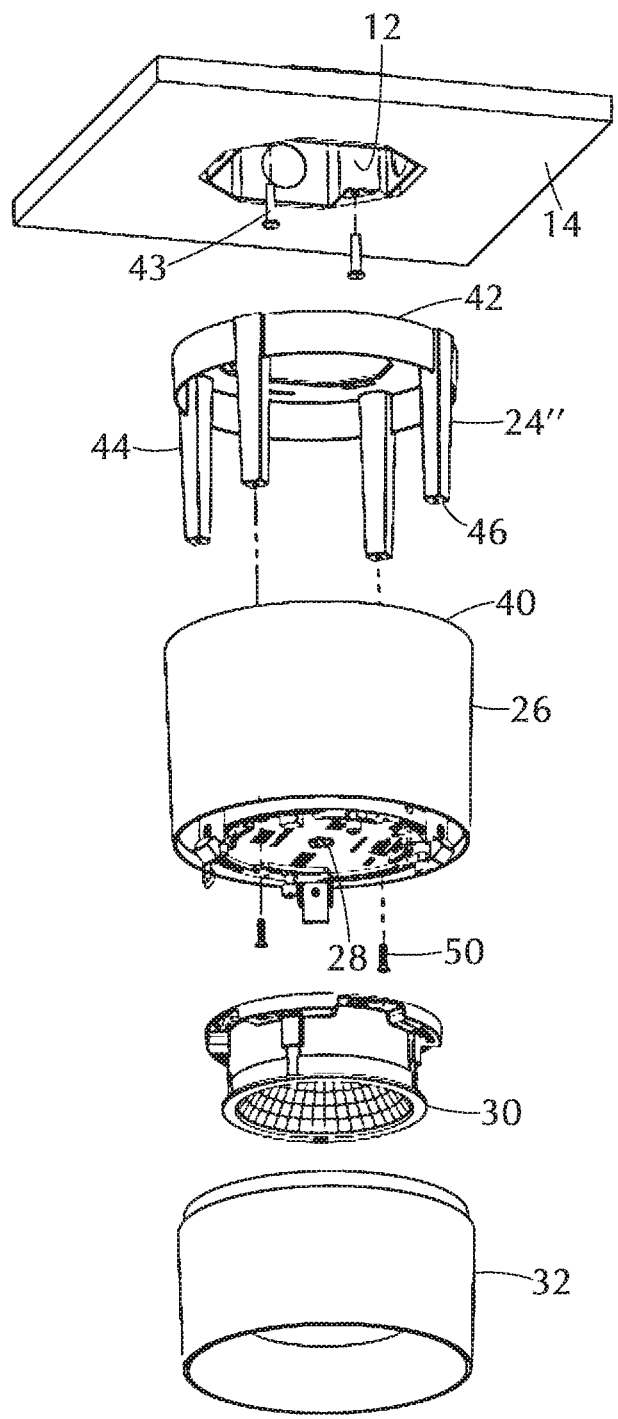
FIG. 24 is an assembly view of a the light fixture of FIG. 23, in a recess mount configuration.
Figure 25:
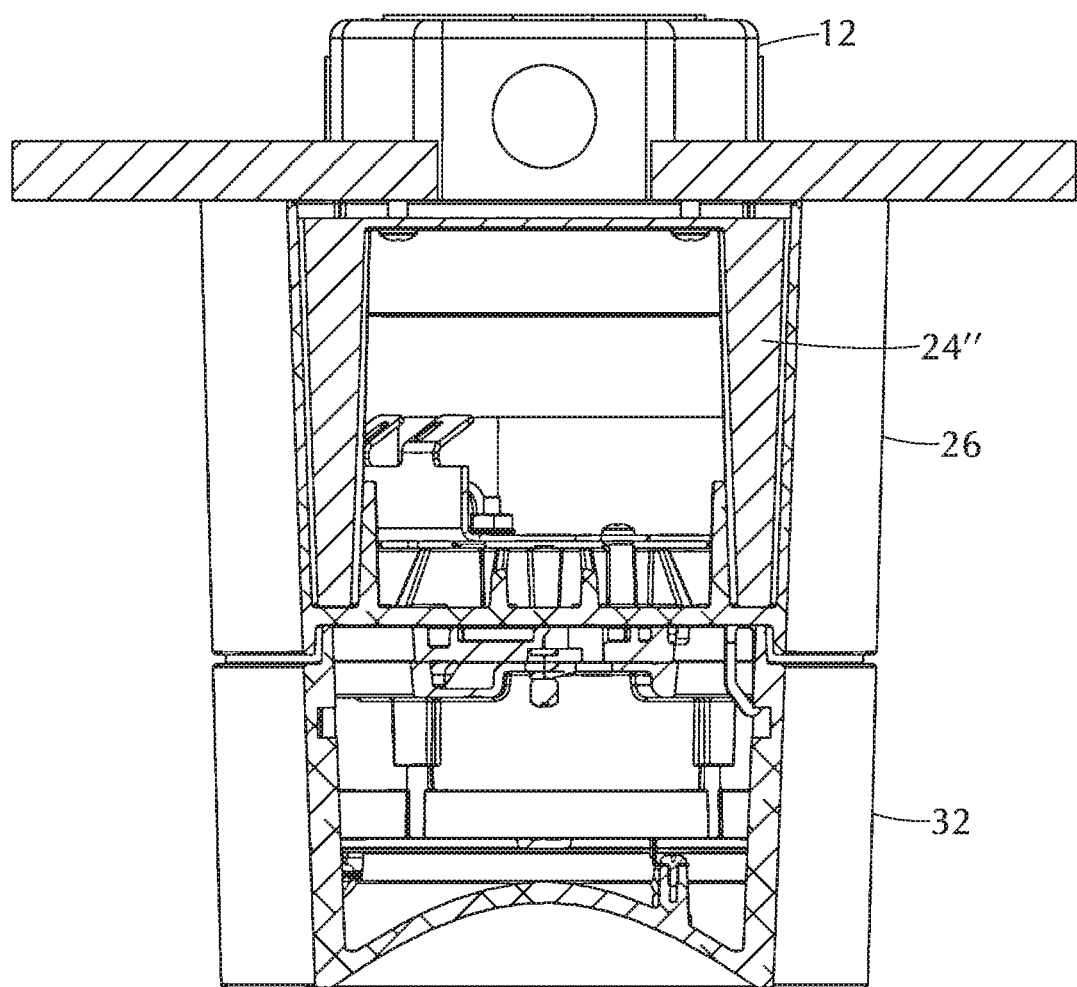
FIG. 25 is a side elevation view of the light fixture in a recess mount configuration.
Figure 26:
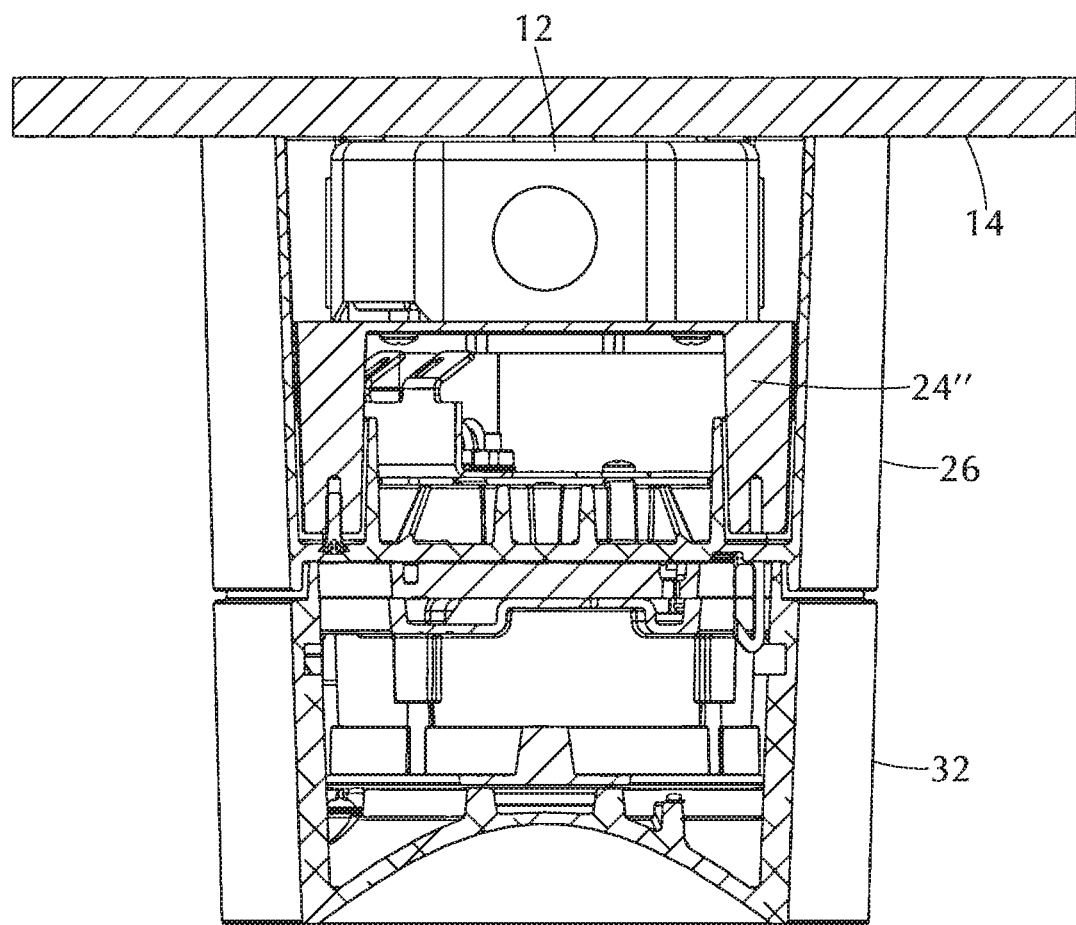
FIG. 26 is a side elevation view of the light fixture in a surface mount configuration.
Figure 27A:
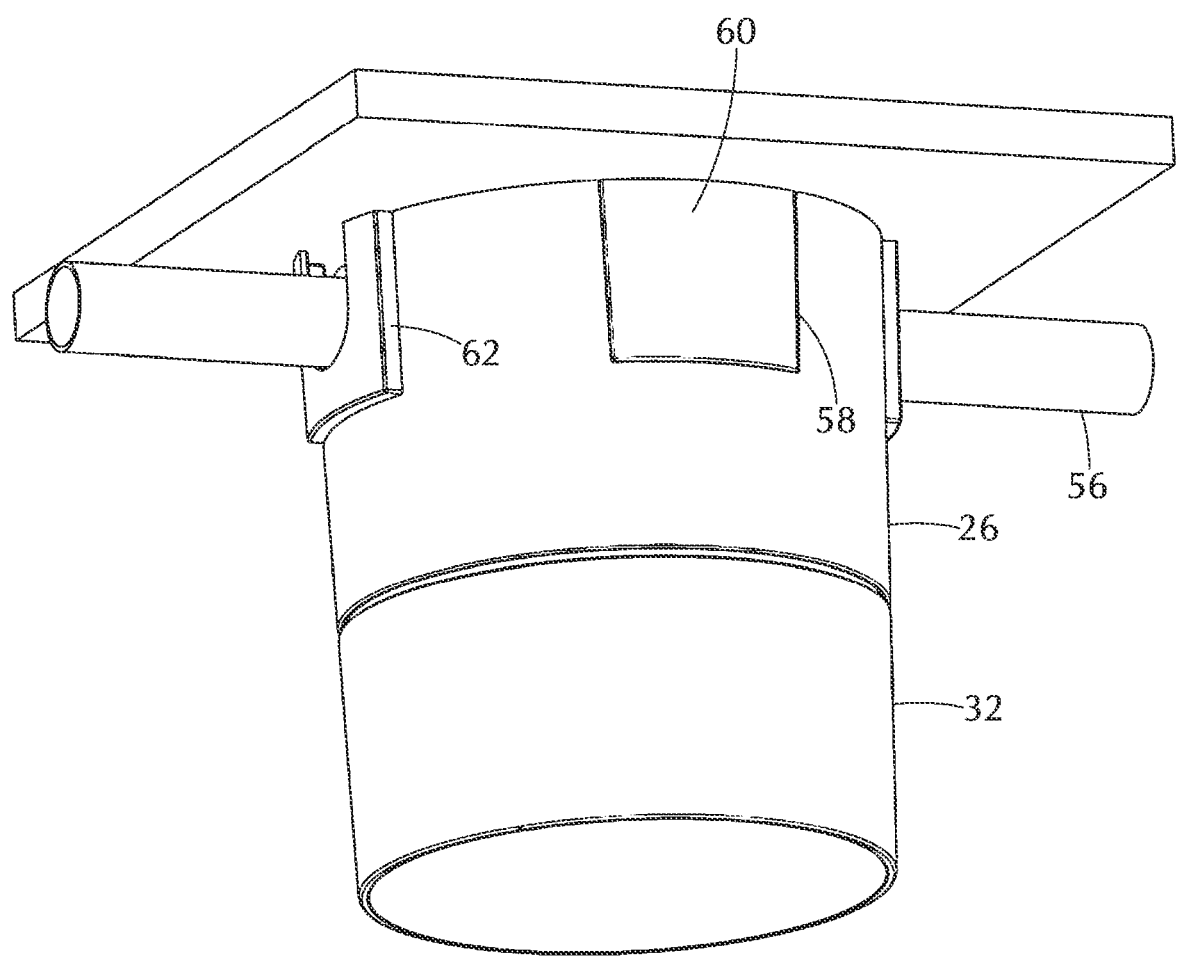
FIG. 27A is a is perspective view the light fixture fully assembled showing the upper housing with cutouts and cutout keys.
Figure 28:
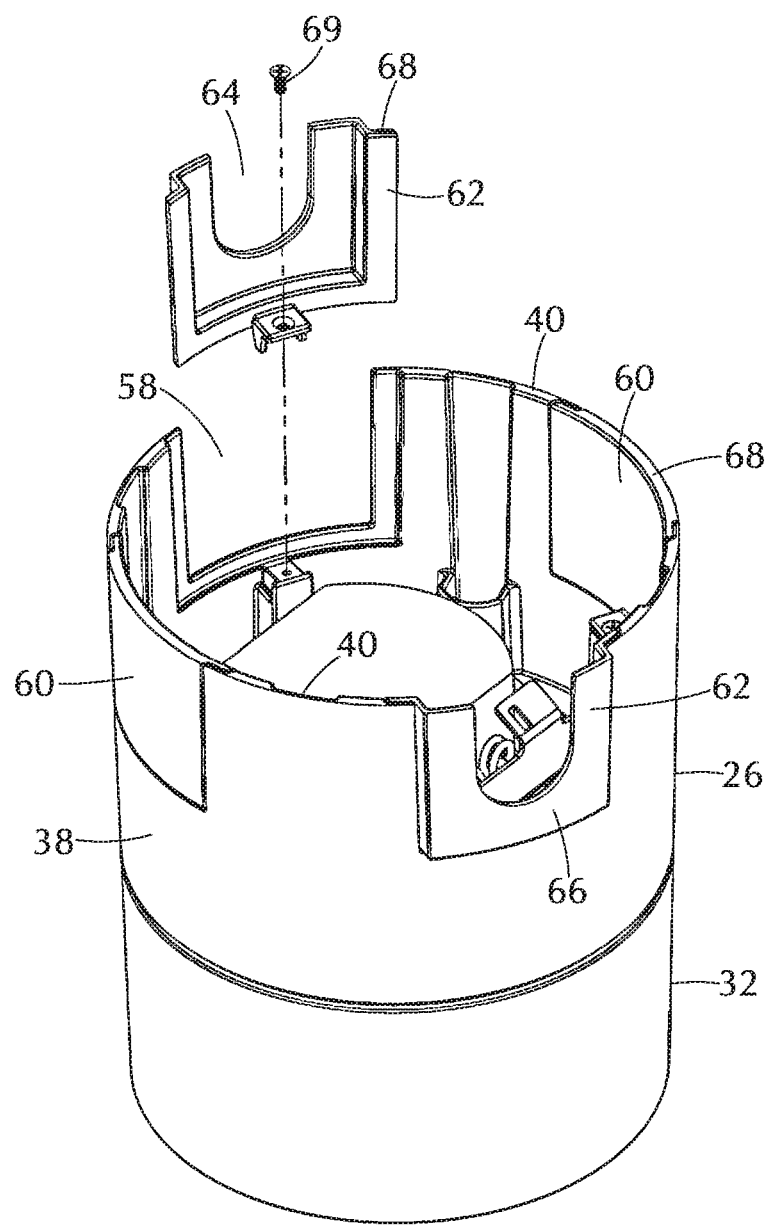
FIG. 28 is an assembly view of the upper and lower housings showing the cutouts and cutout keys.
Figure 29:
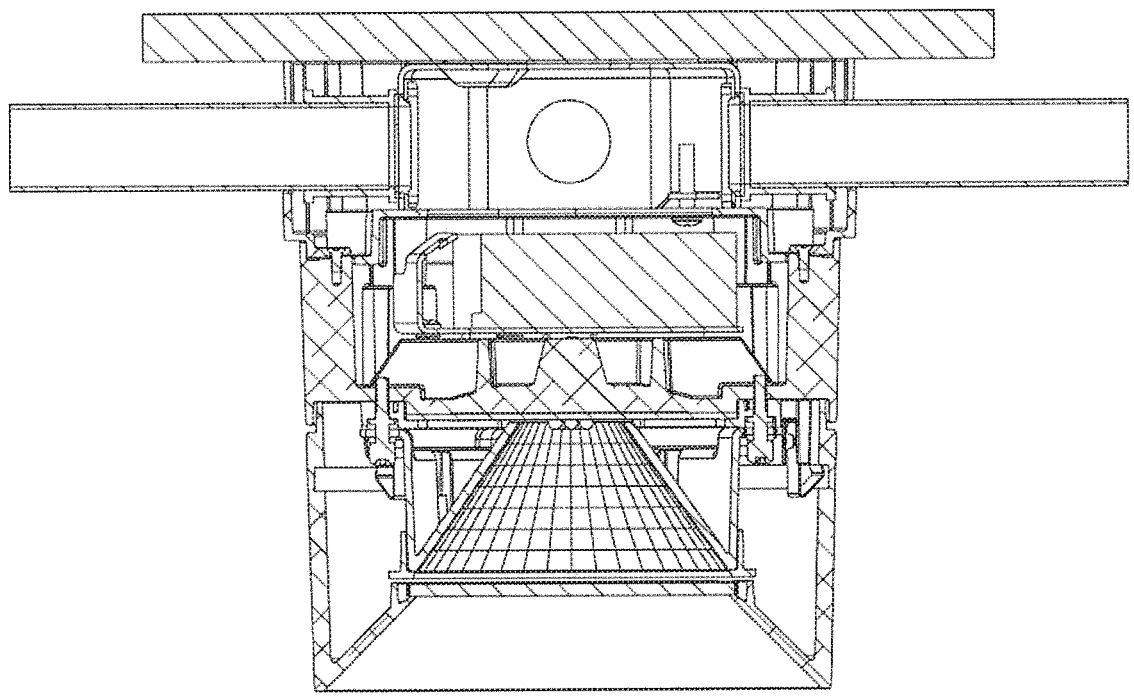
FIG. 29 is a side elevation view of a fully assembled light fixture showing the surface mount conduit.
Figure 30:
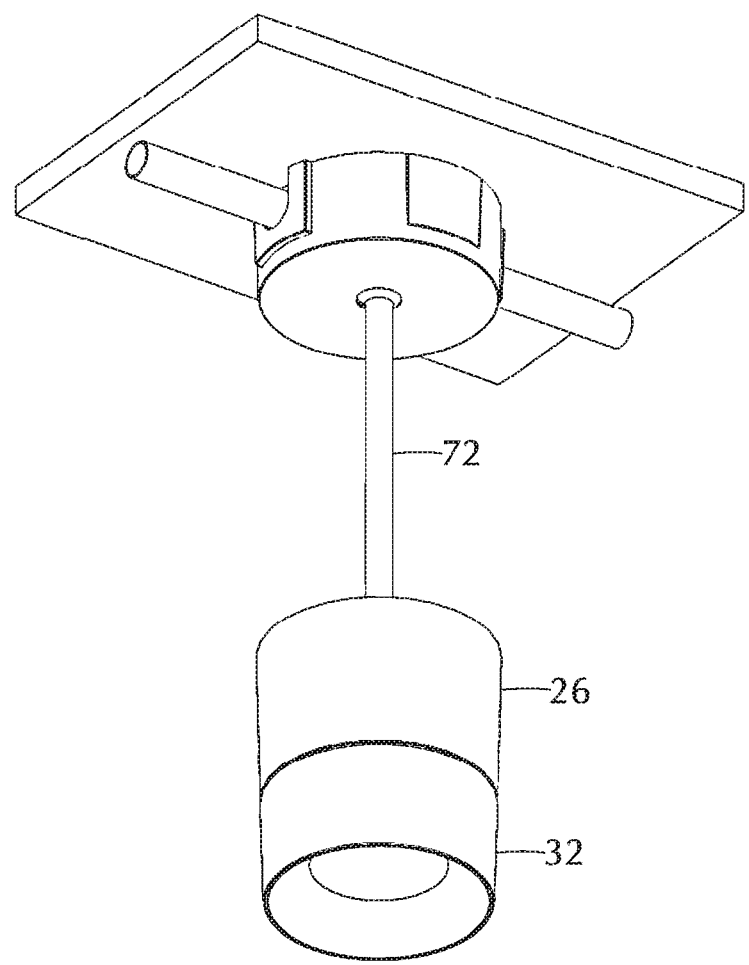
FIGS. 30-78 are views of various embodiments of pendant versions of the light fixture.
Figure 31:
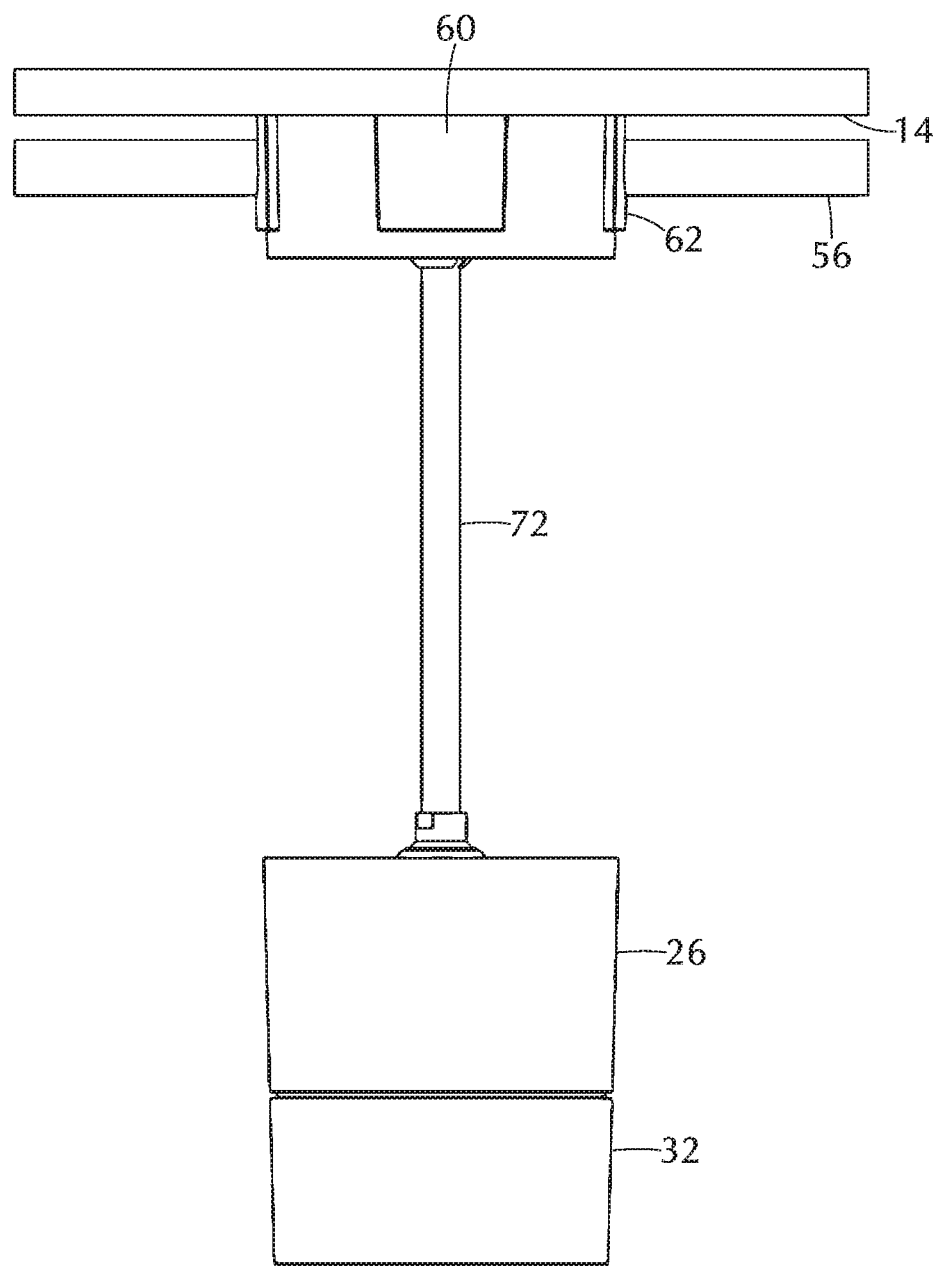
Figure 32:
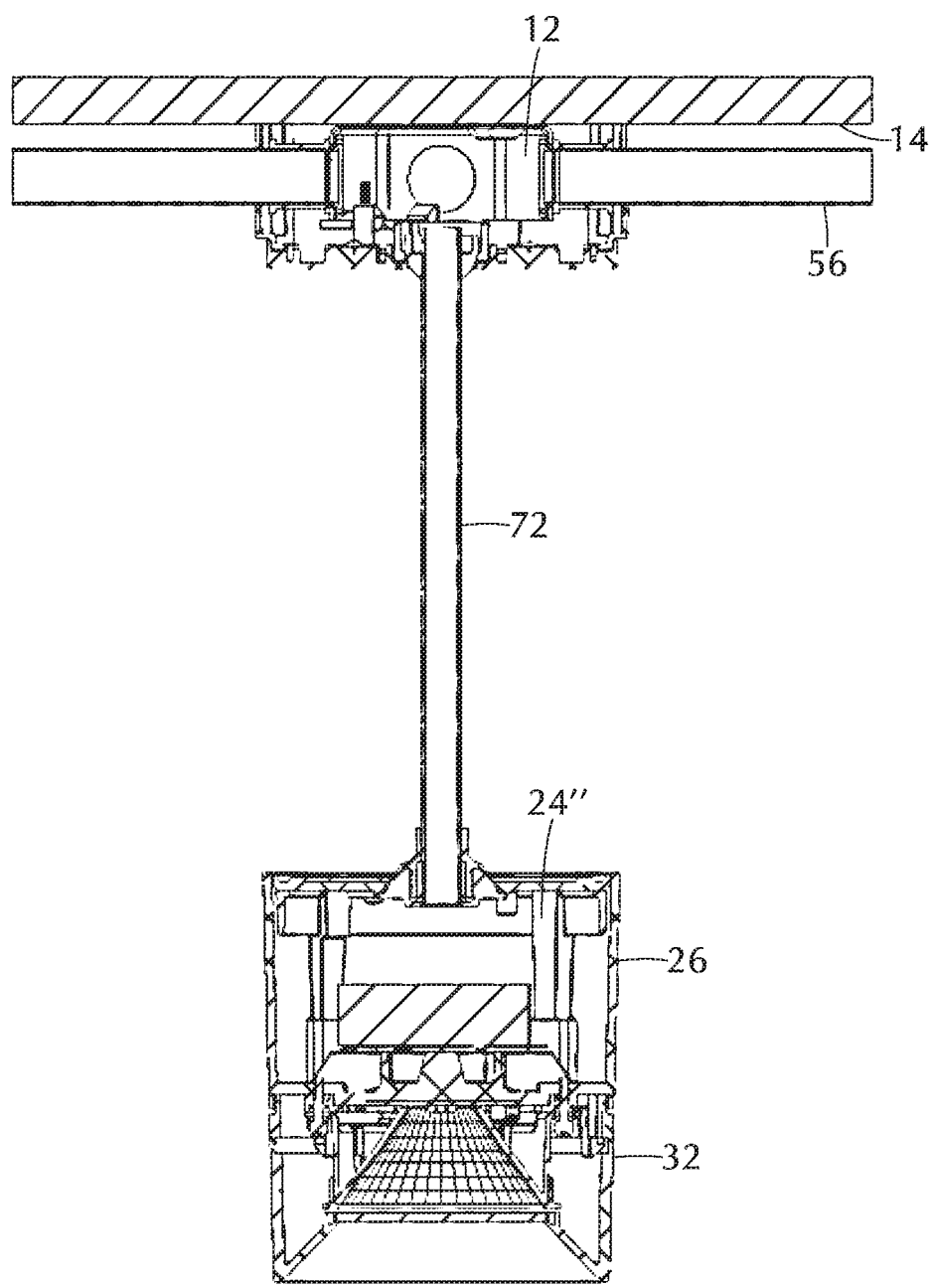
Figure 33:
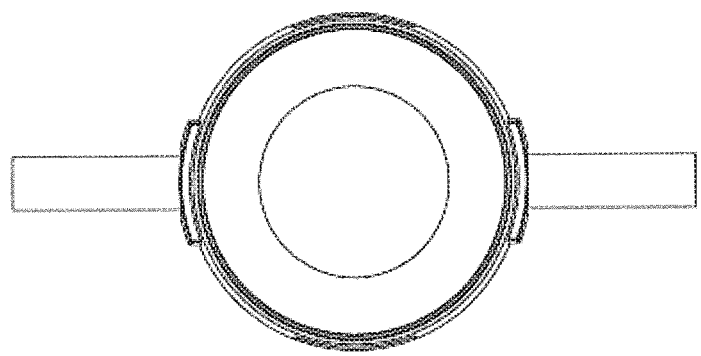
Figure 34:
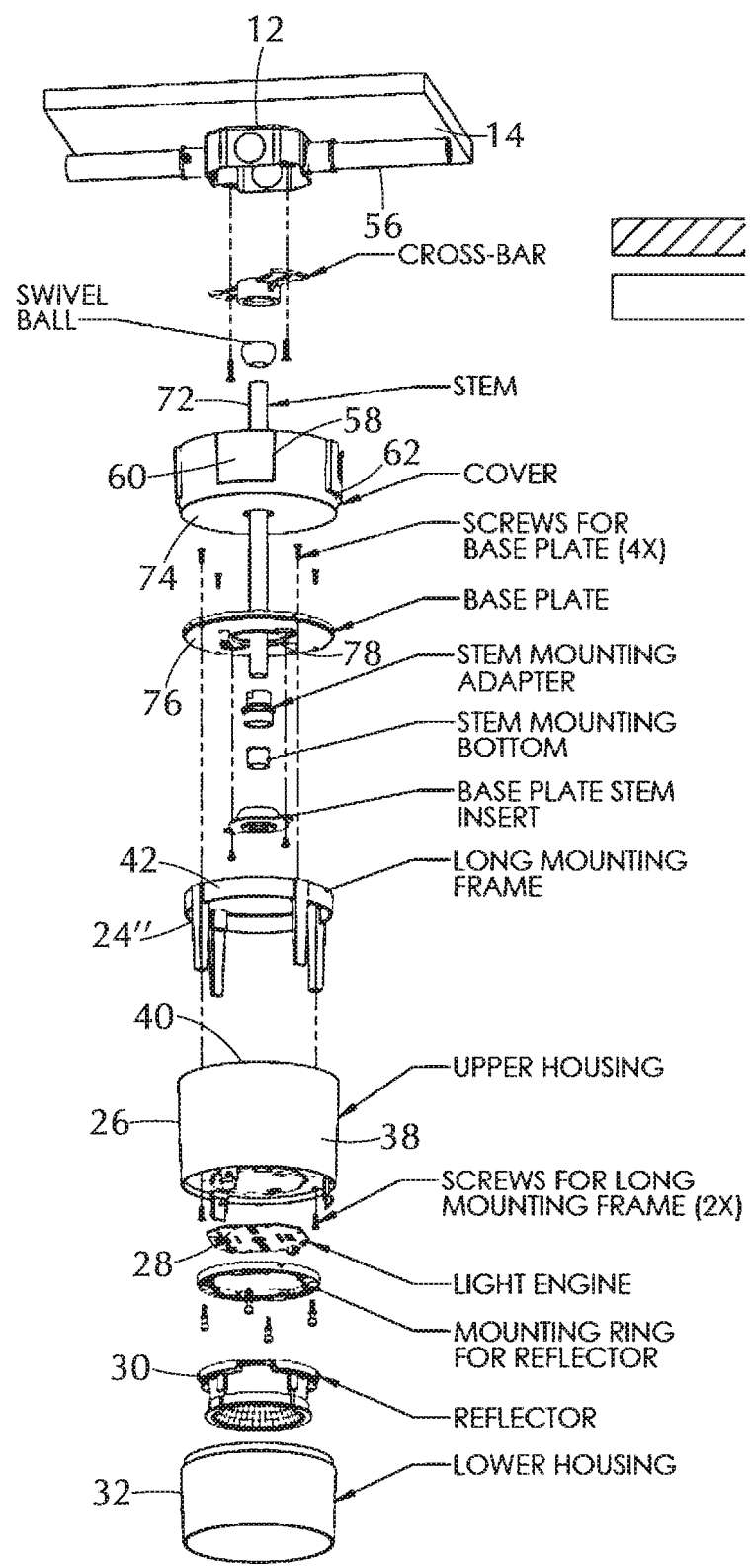
Figure 35:
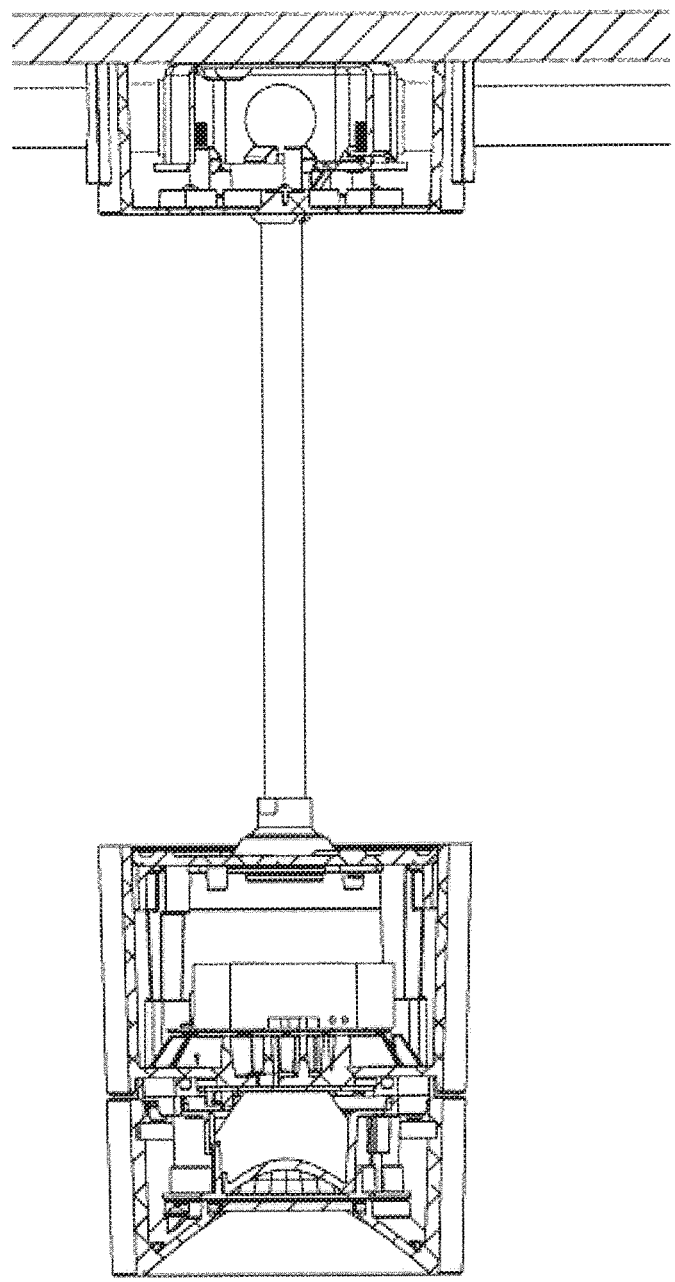
Figure 36:
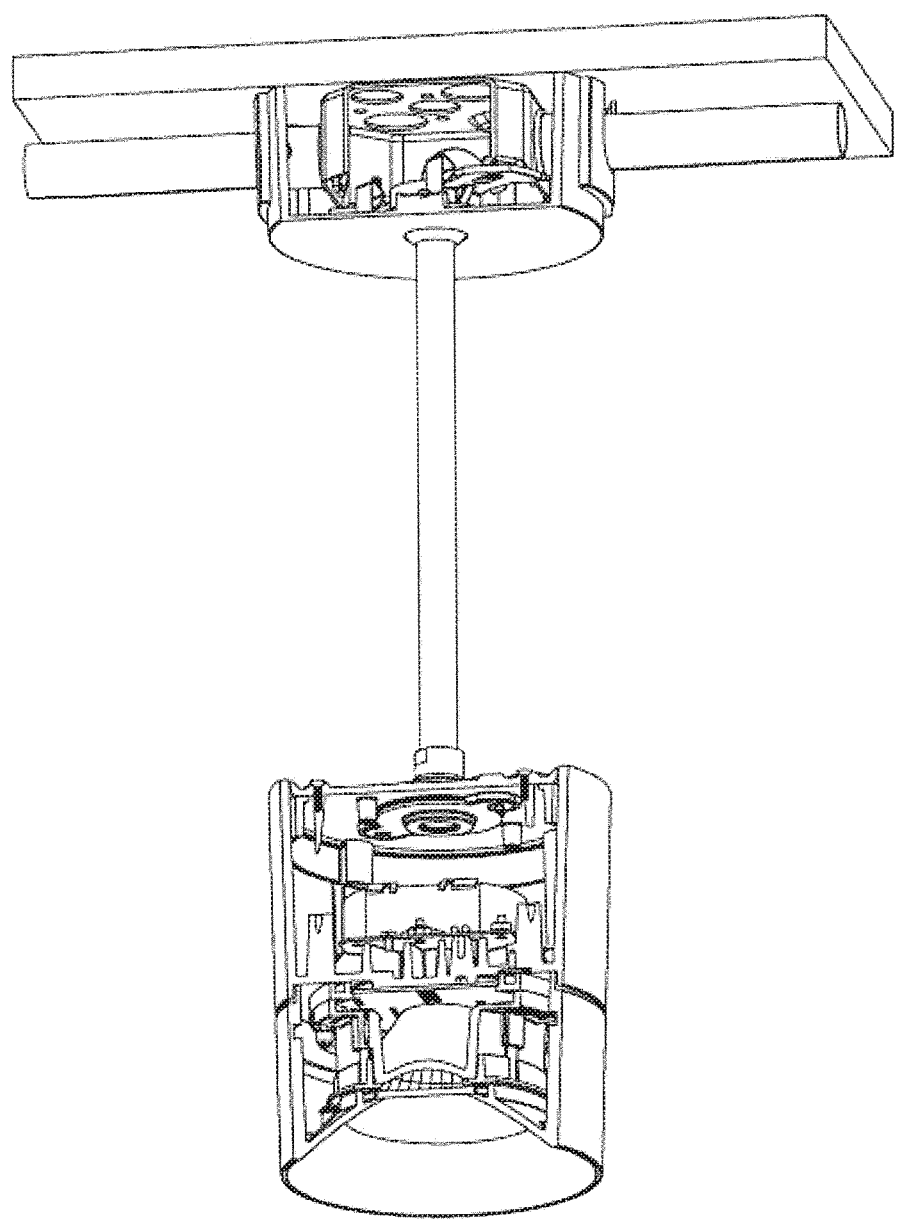
Figure 37:
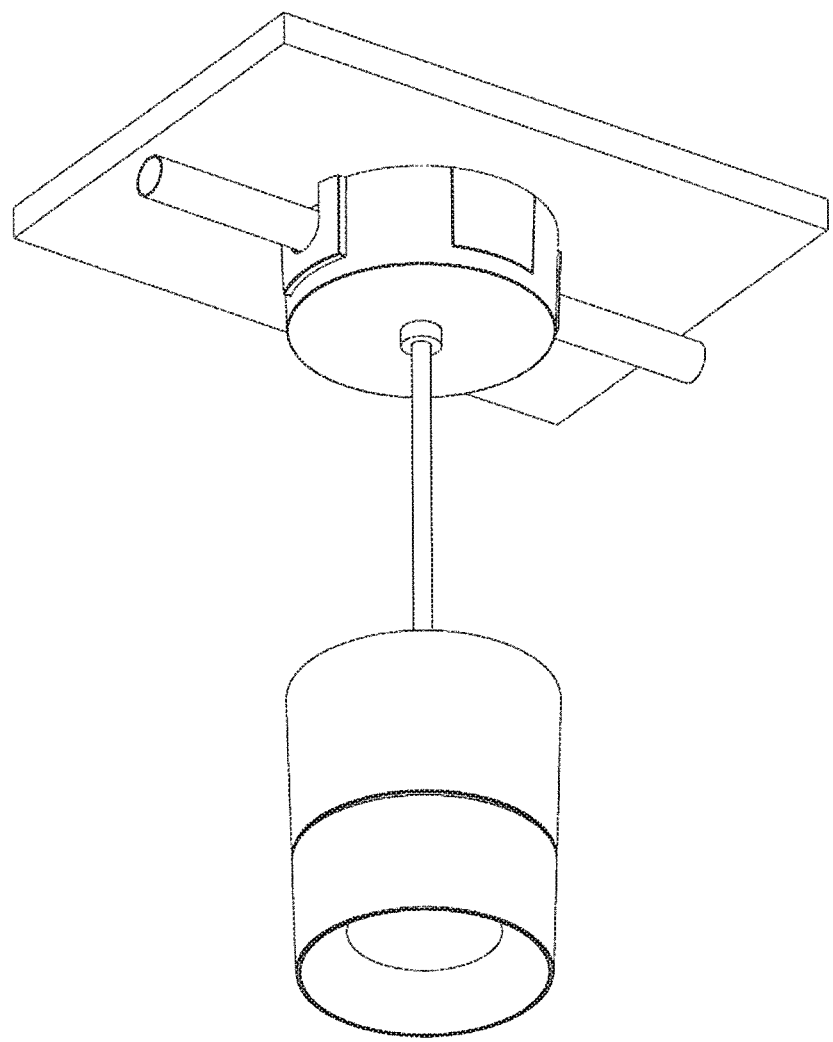
Figure 38:
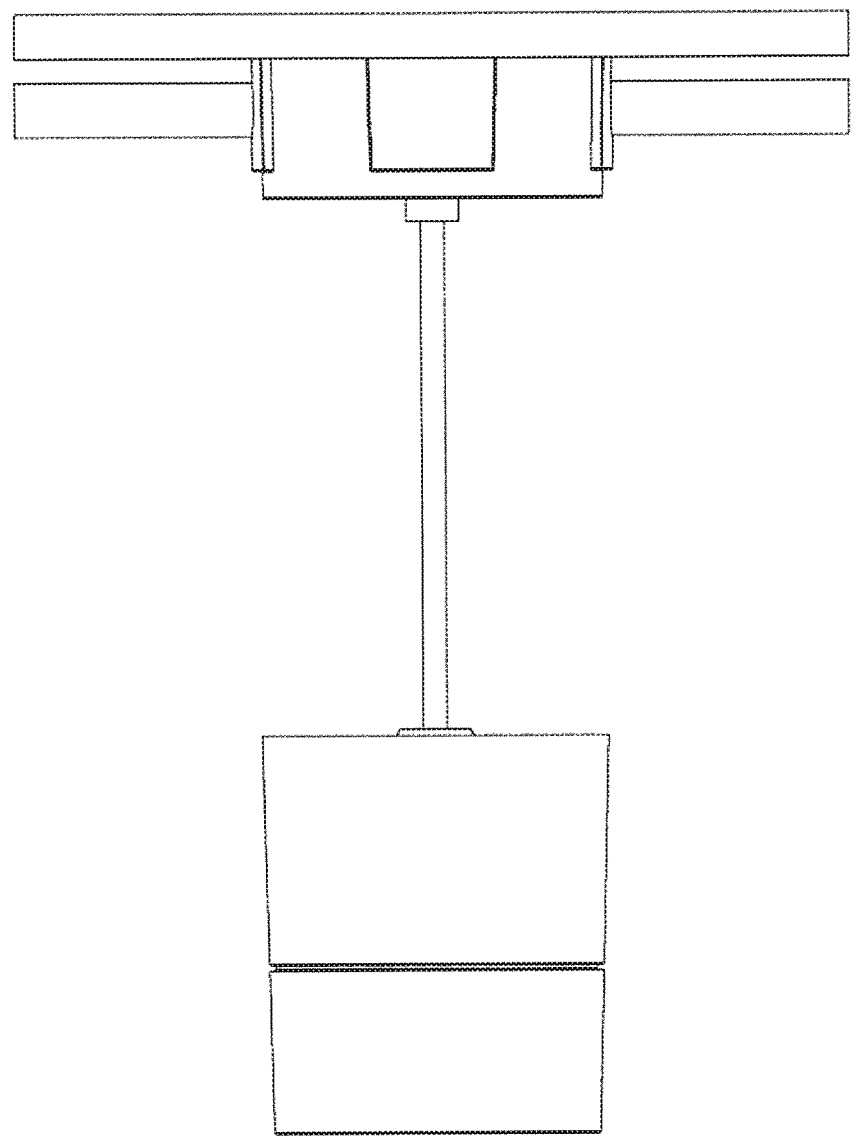
Figure 39:
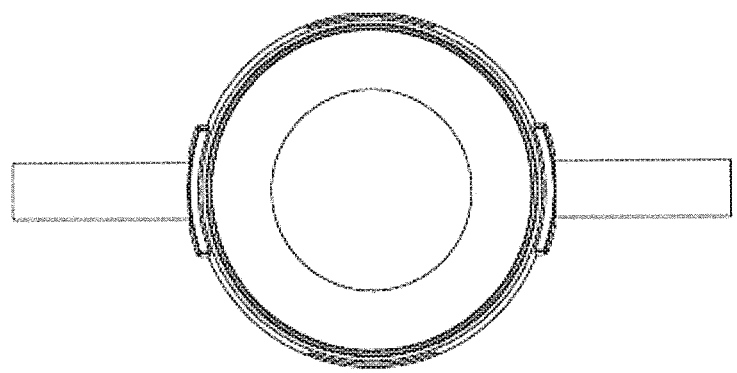
Figure 40:
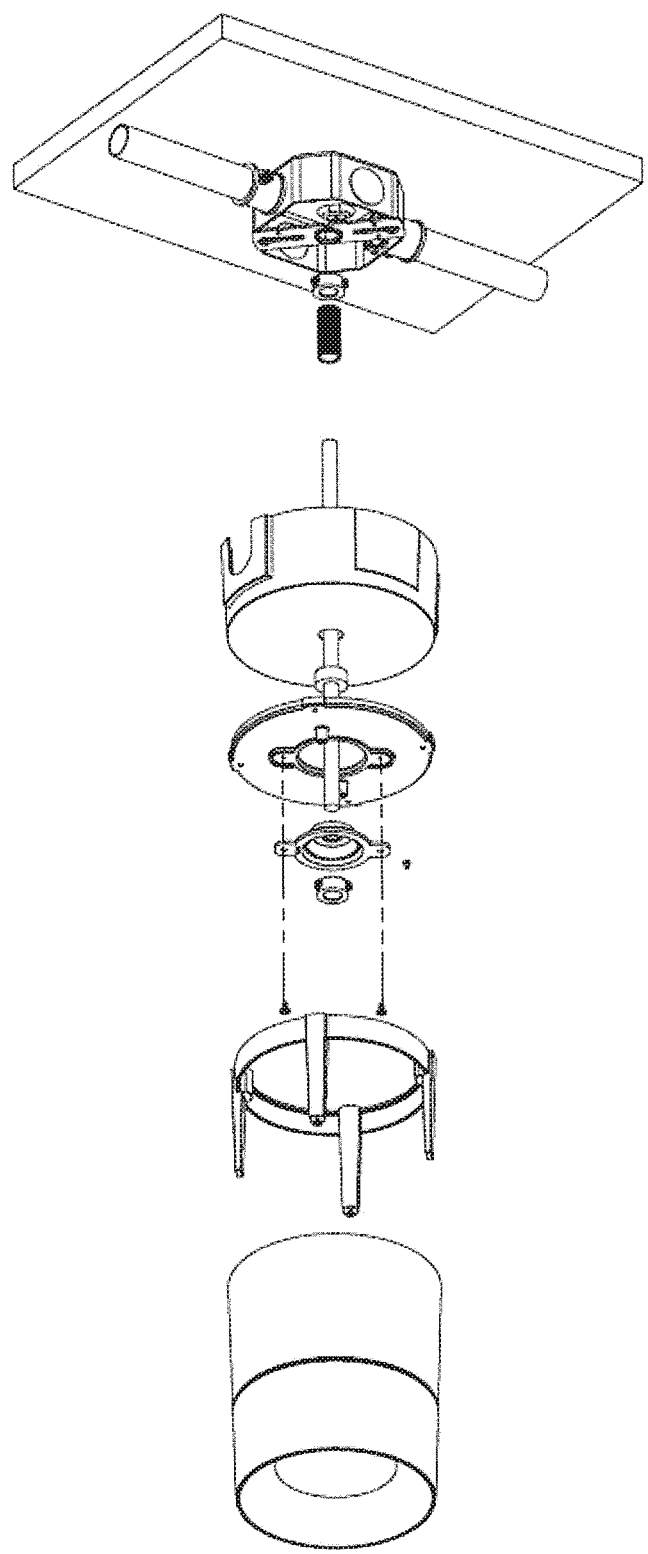
Figure 41:
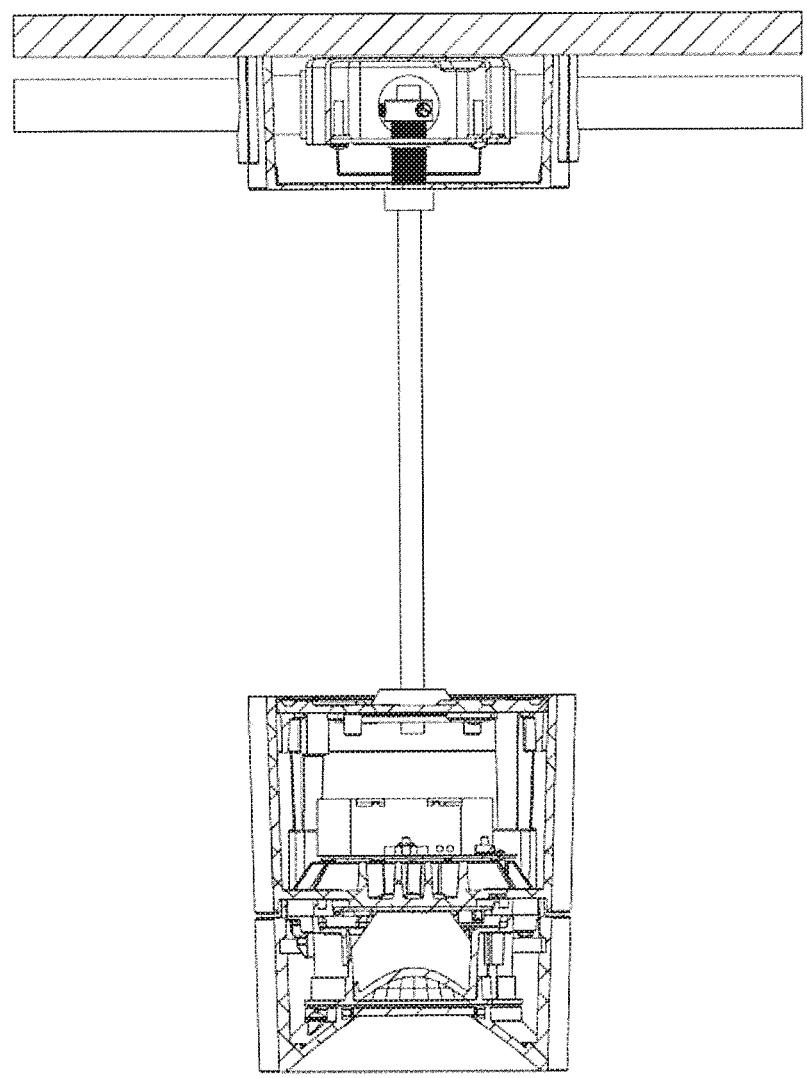
Figure 42:
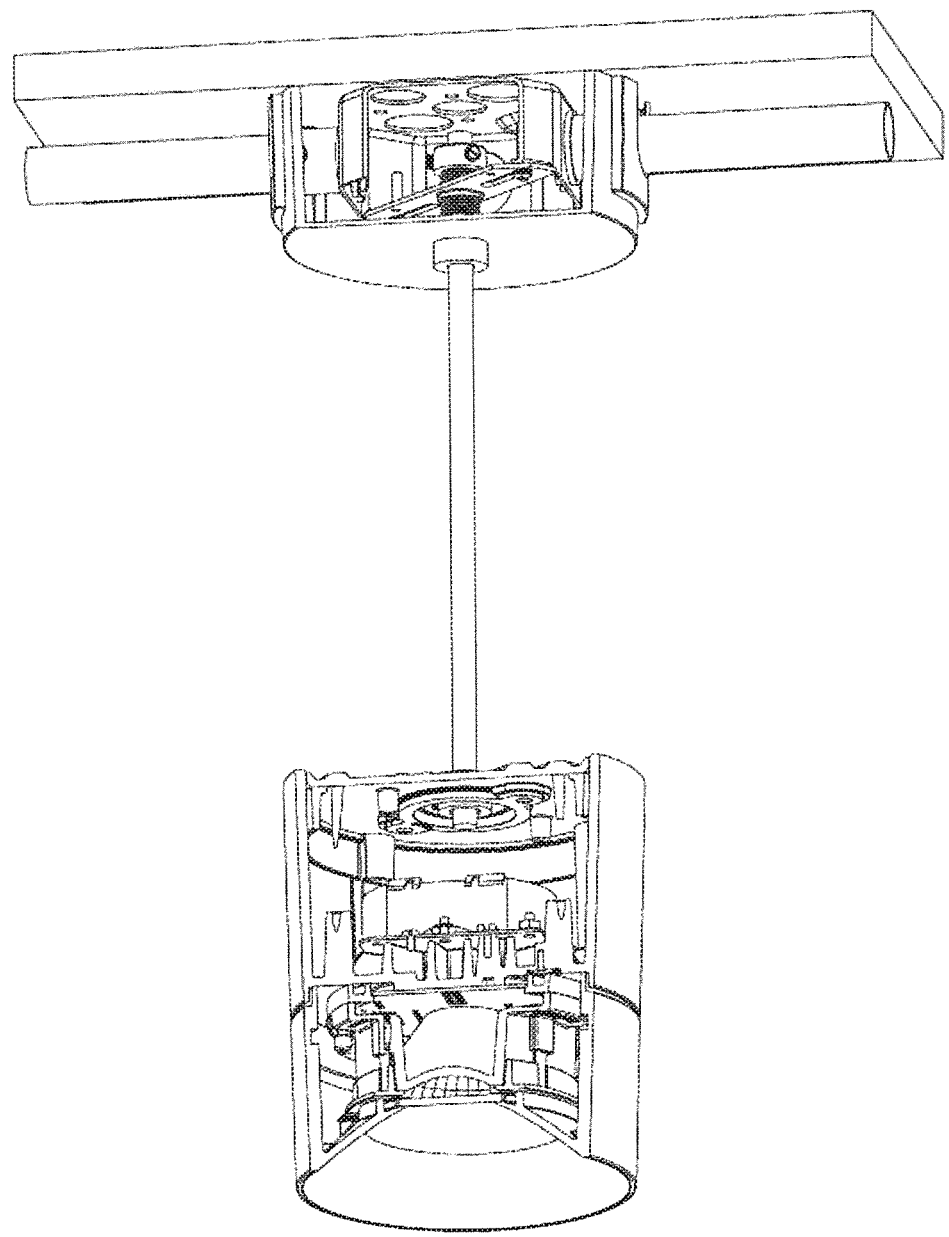
Figure 43:
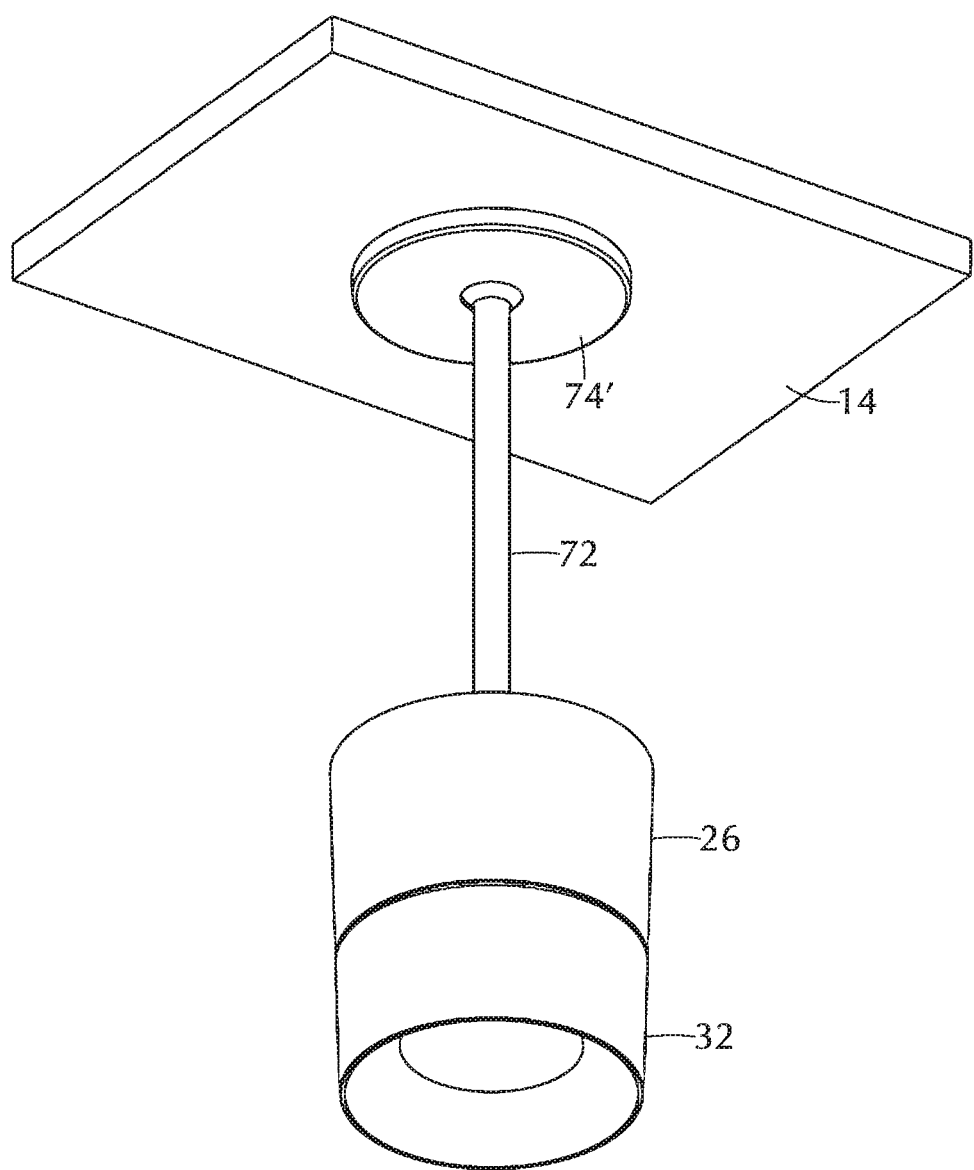
Figure 44:
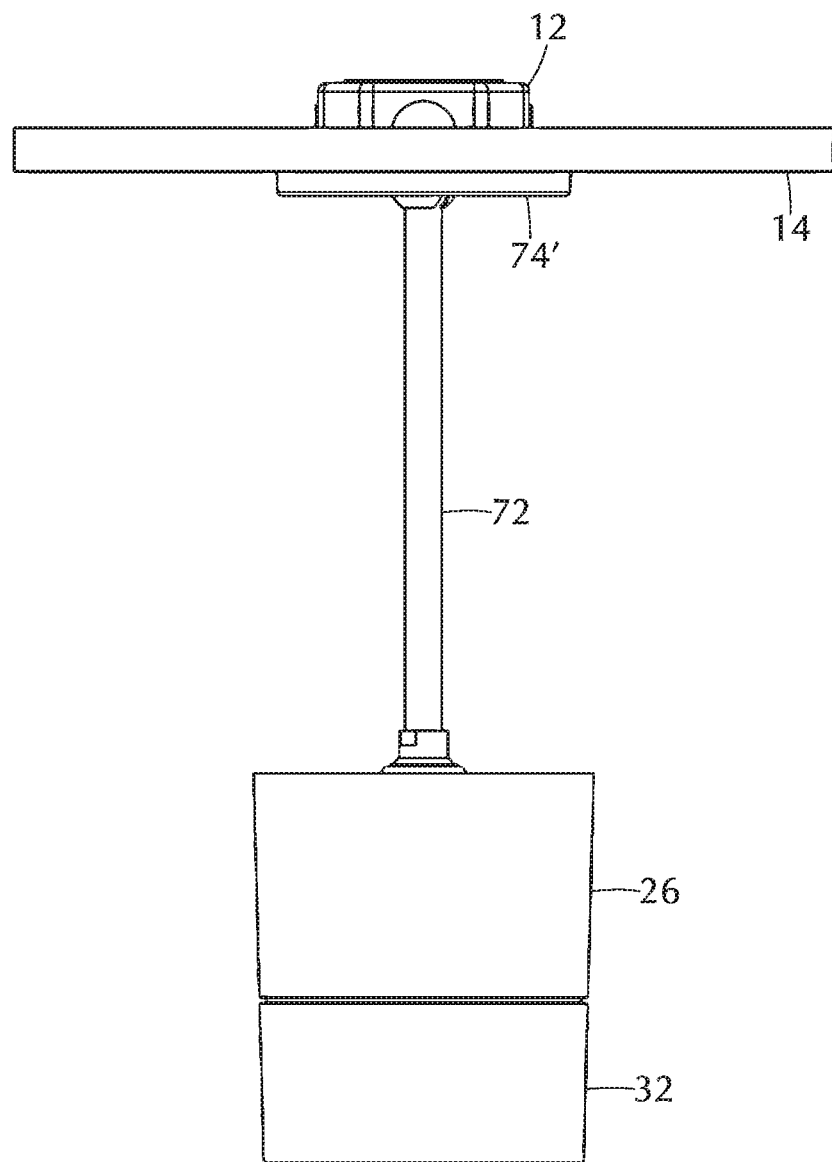
Figure 45:
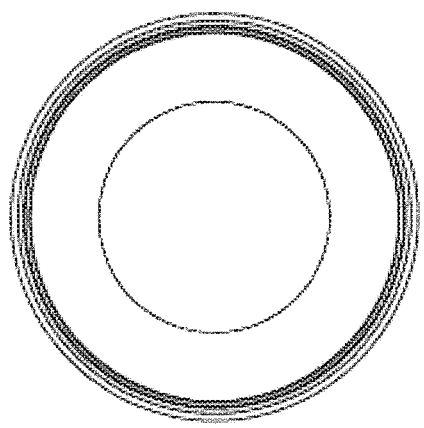
Figure 46:
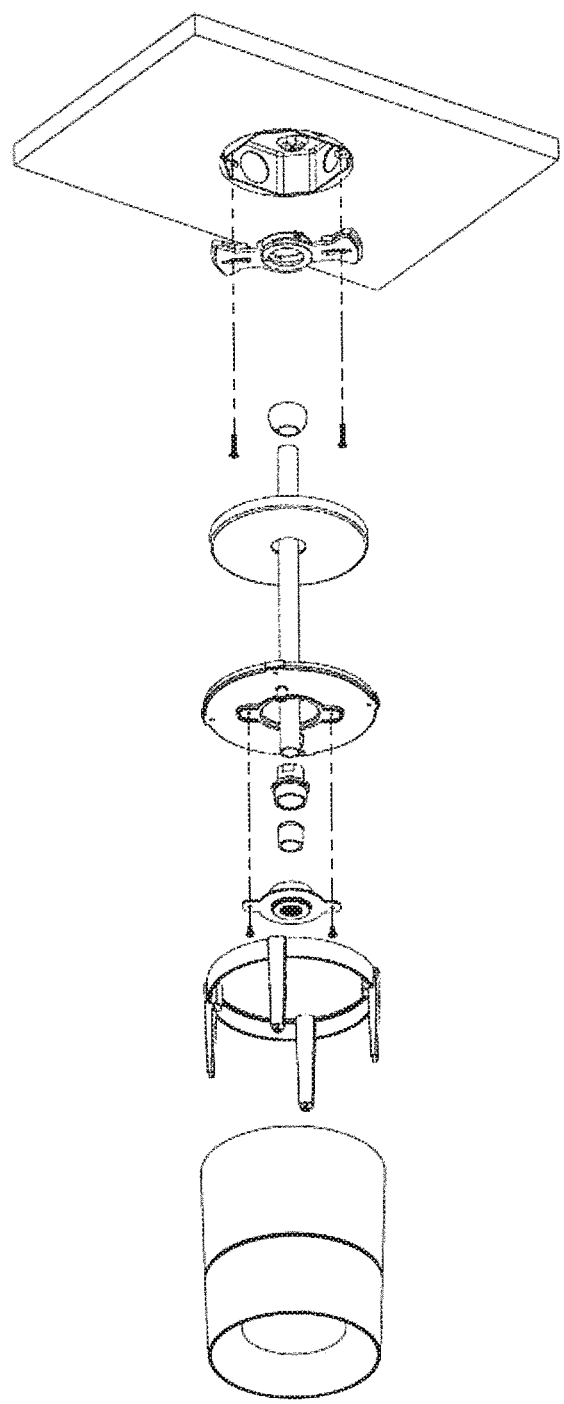
Figure 47:
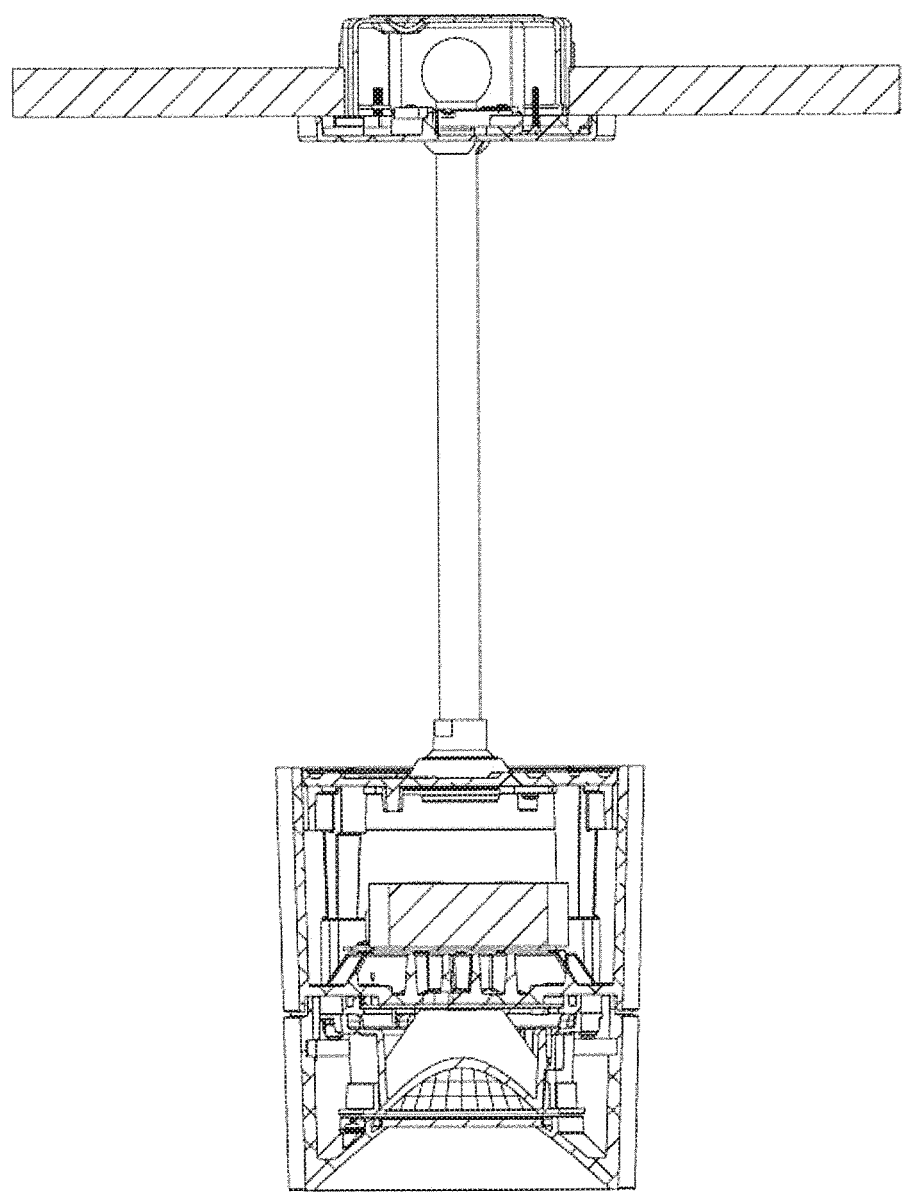
Figure 48:
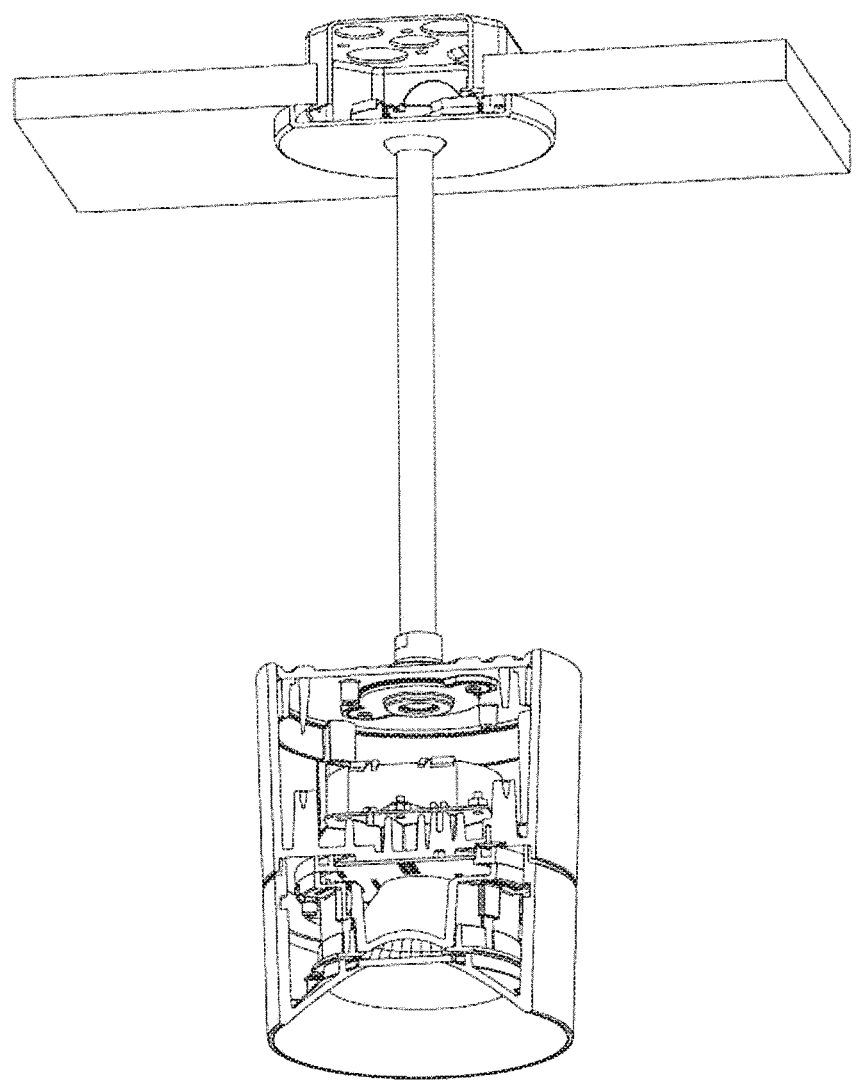
Figure 49:
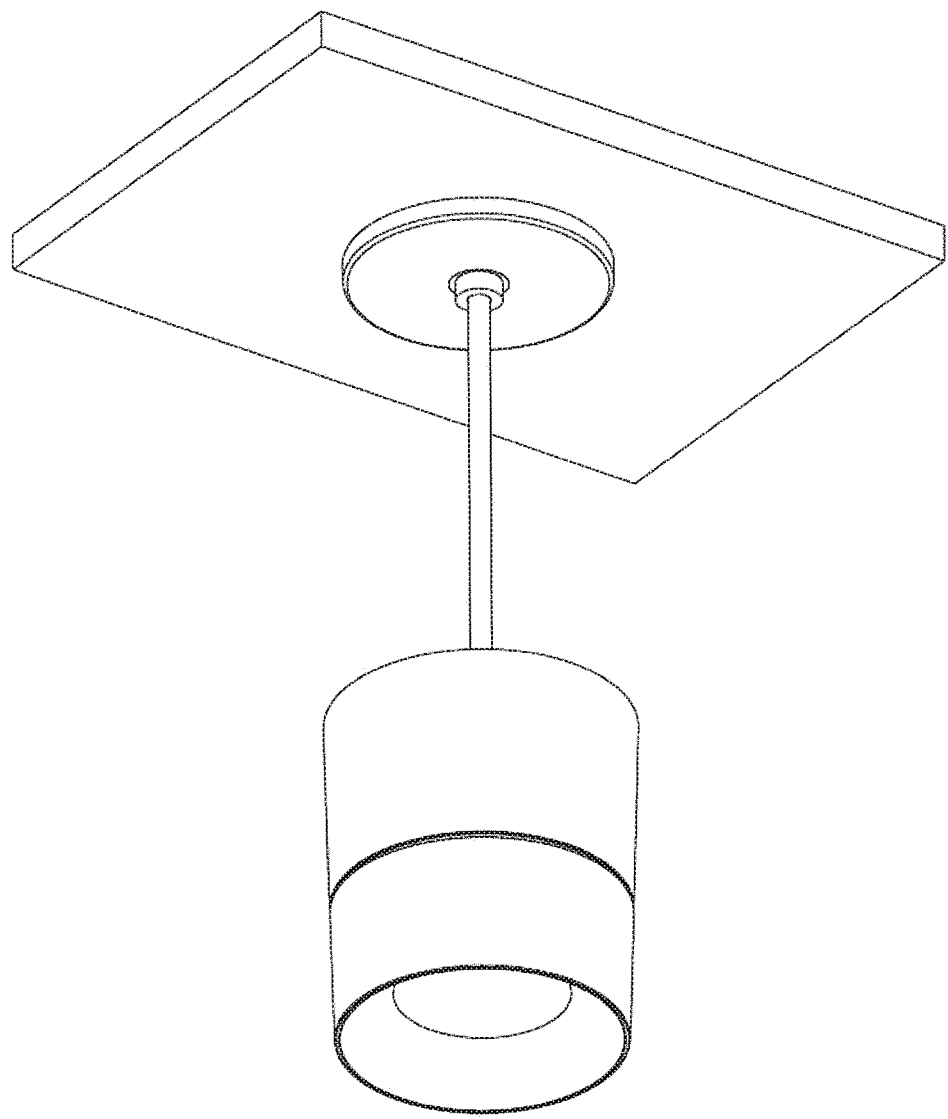
Figure 50:
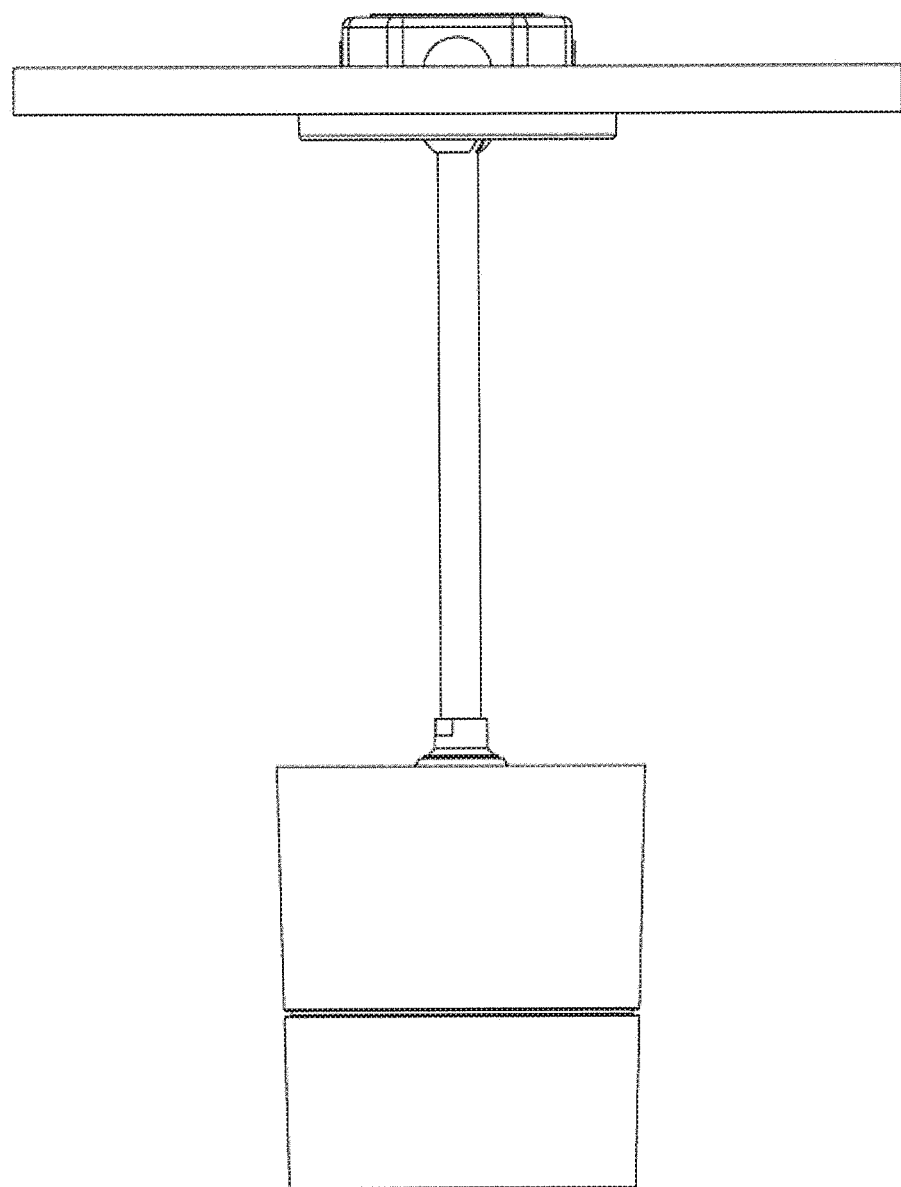
Figure 51:
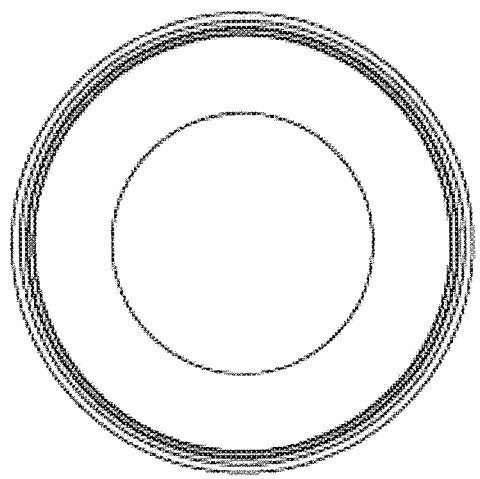
Figure 52:
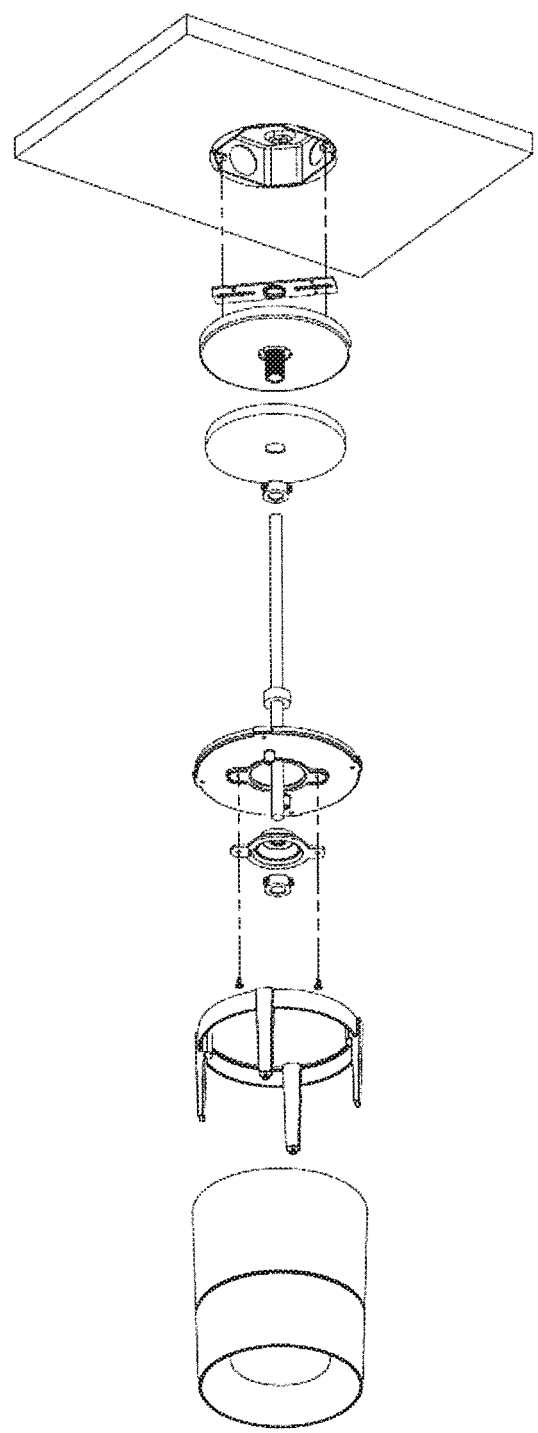
Figure 53:
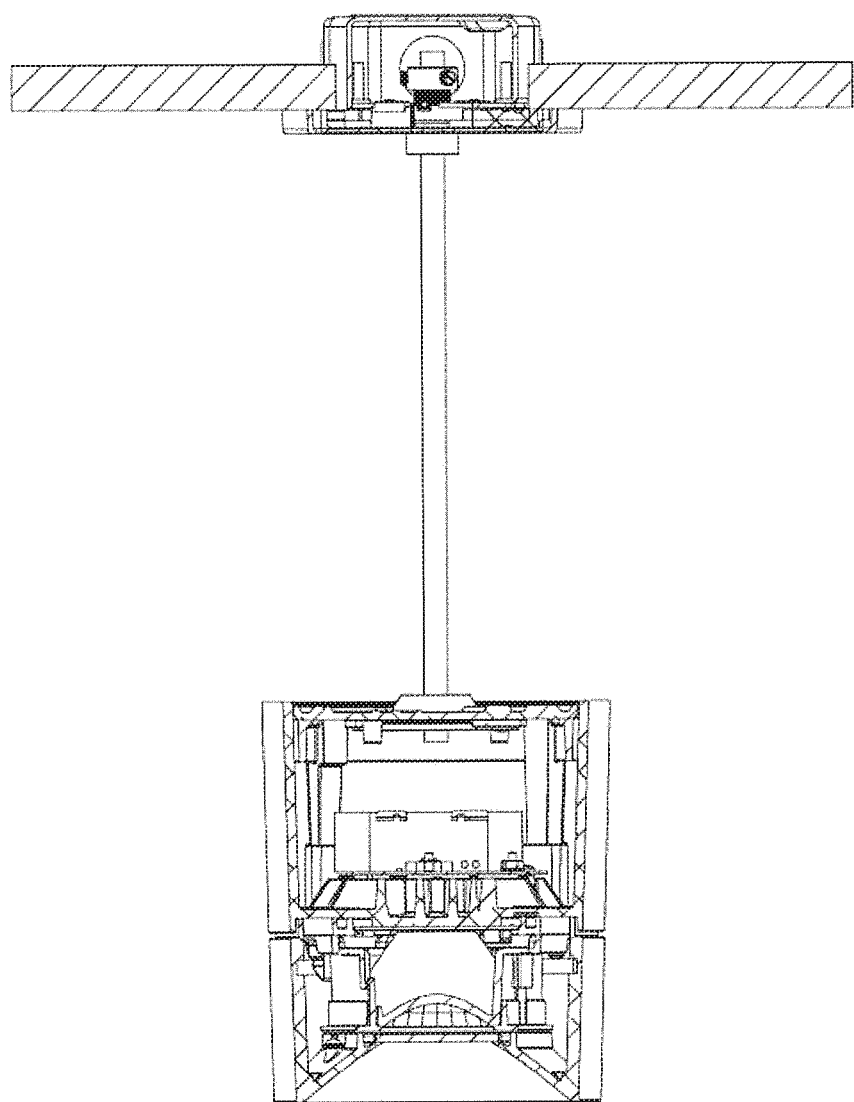
Figure 54:
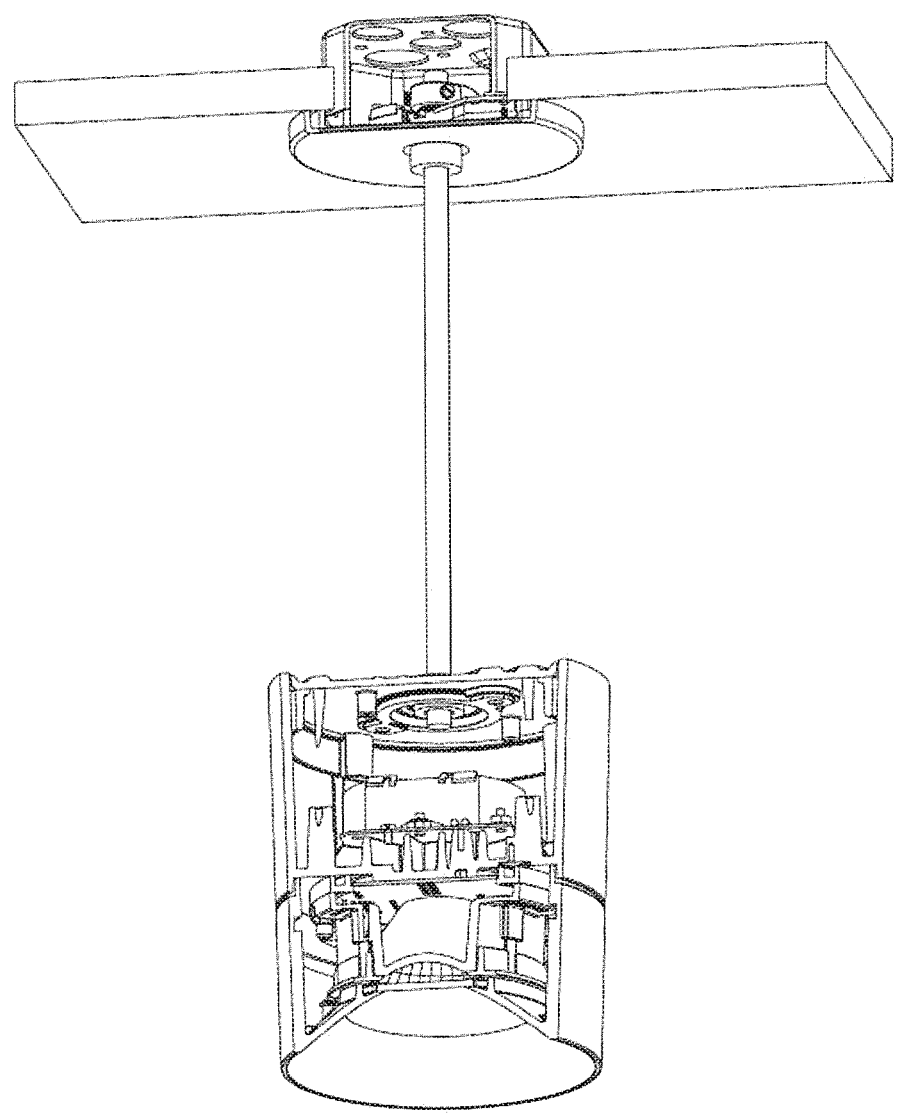
Figure 55:
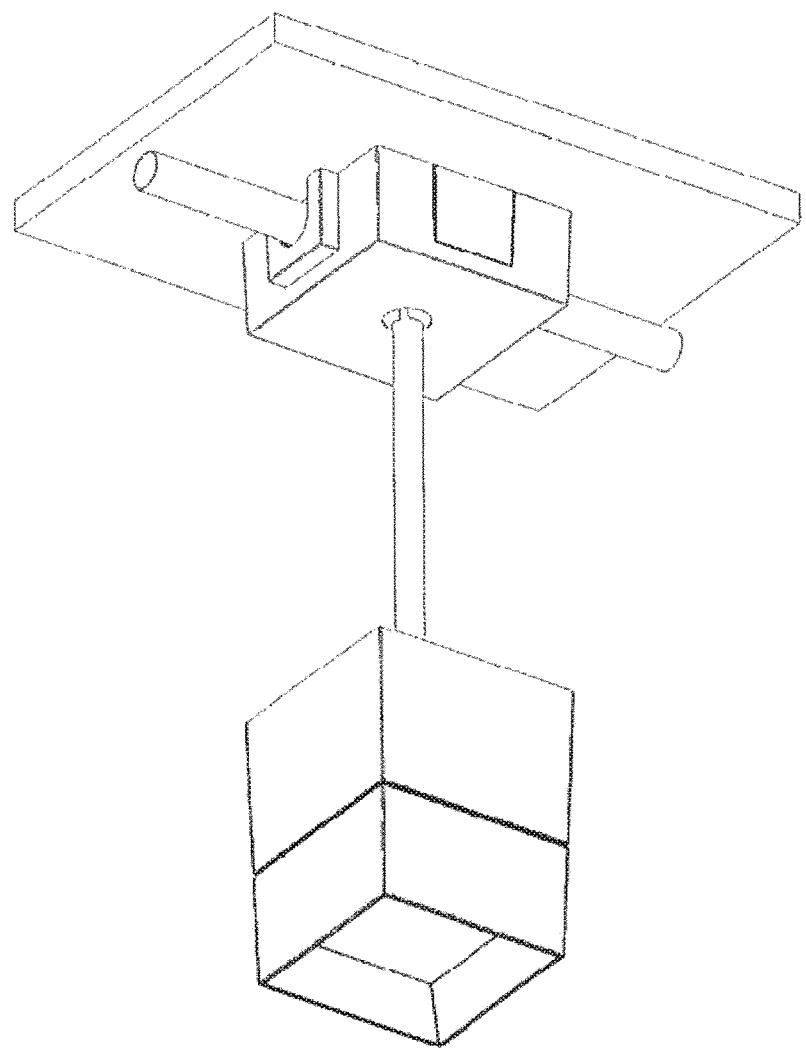
Figure 56:
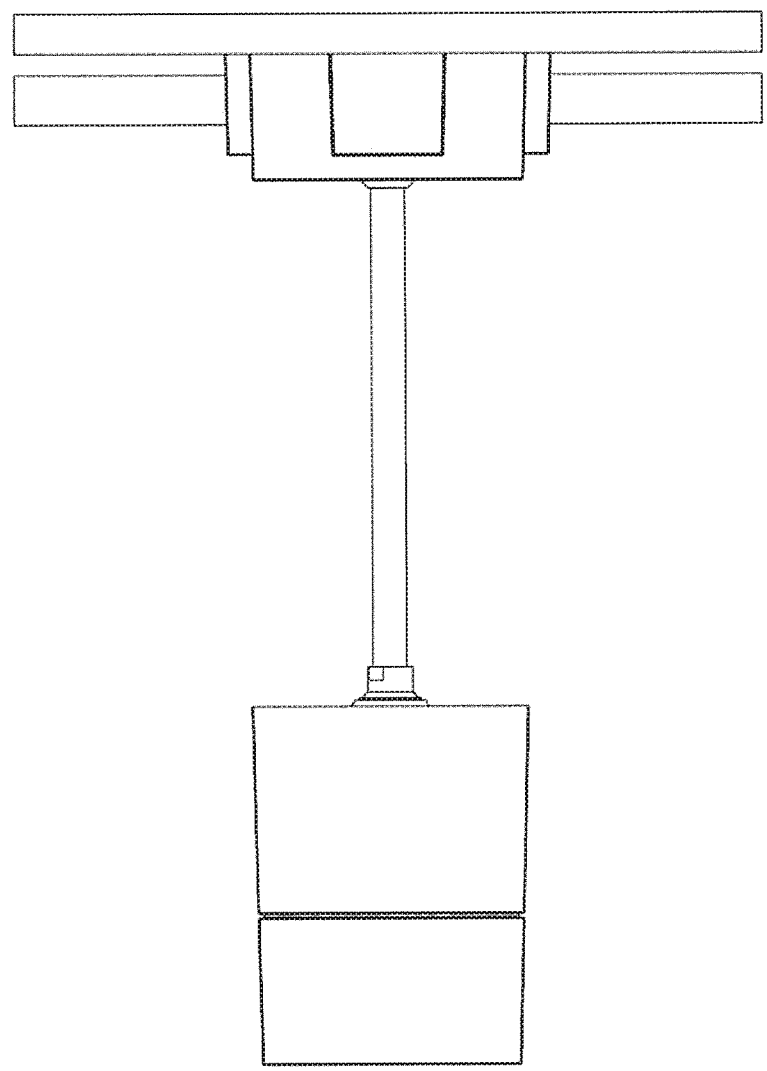
Figure 57:
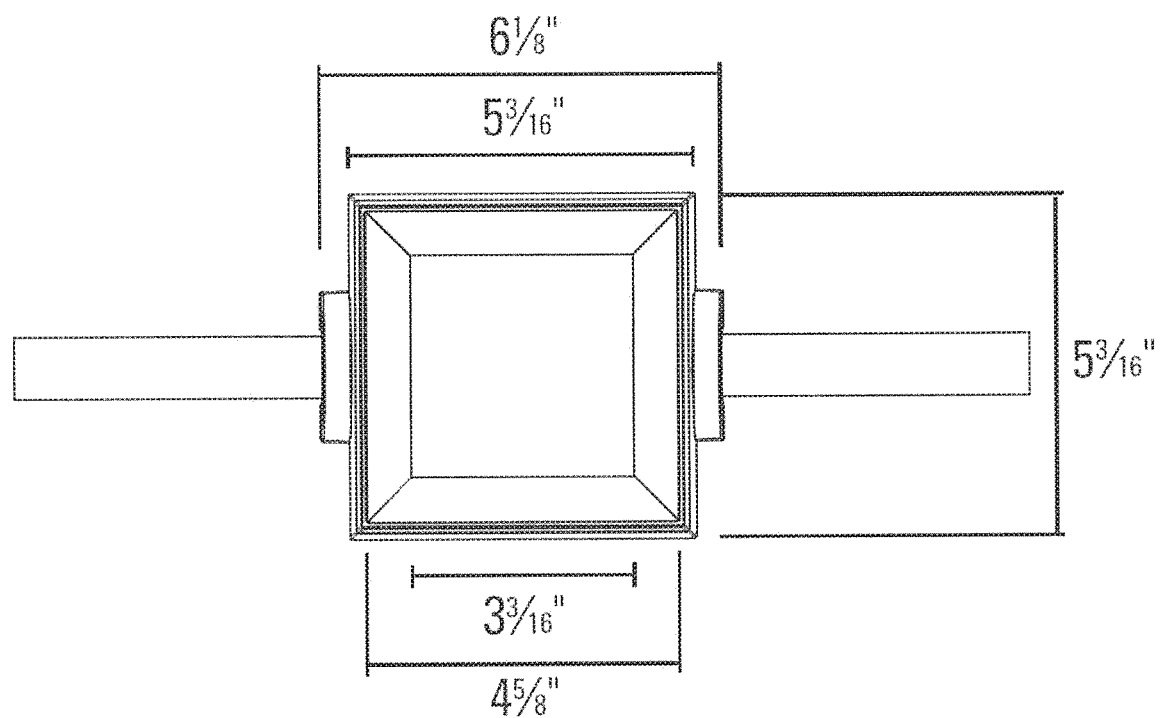
Figure 58:
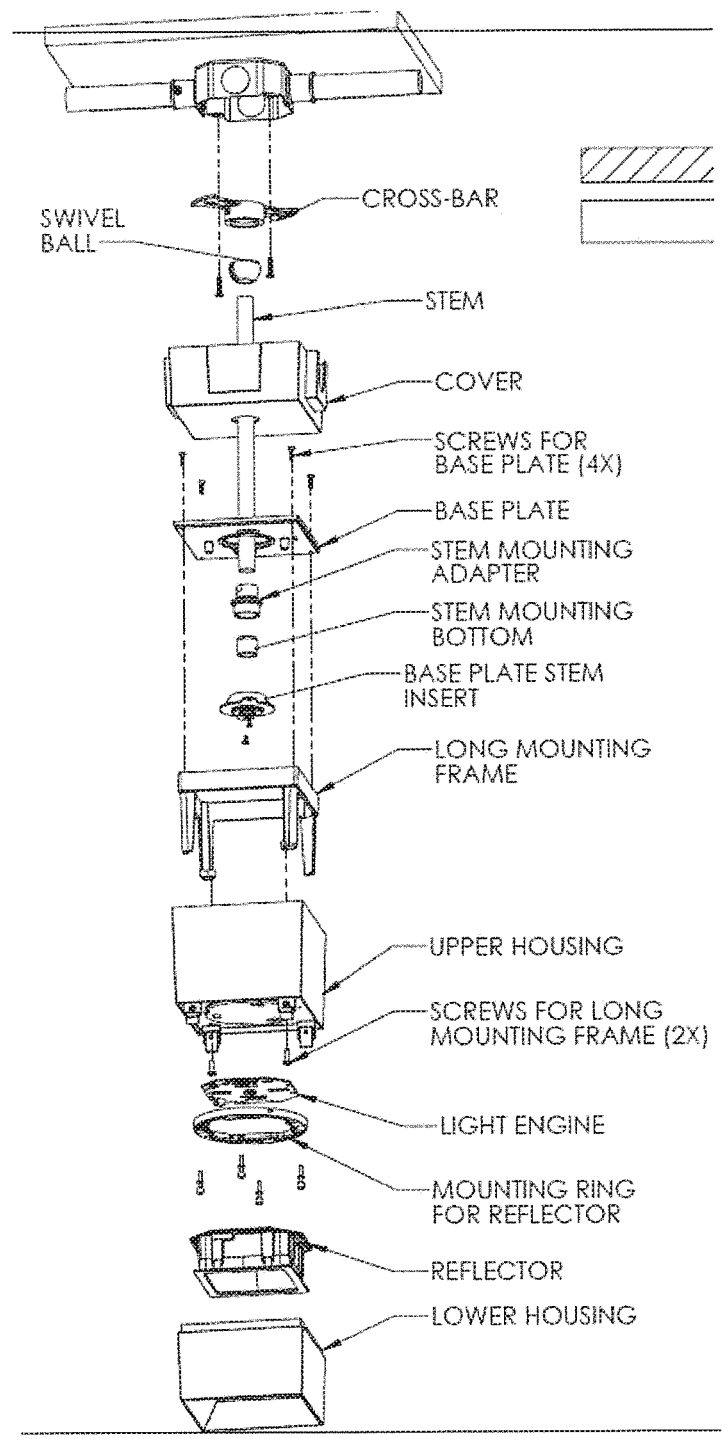
Figure 59:
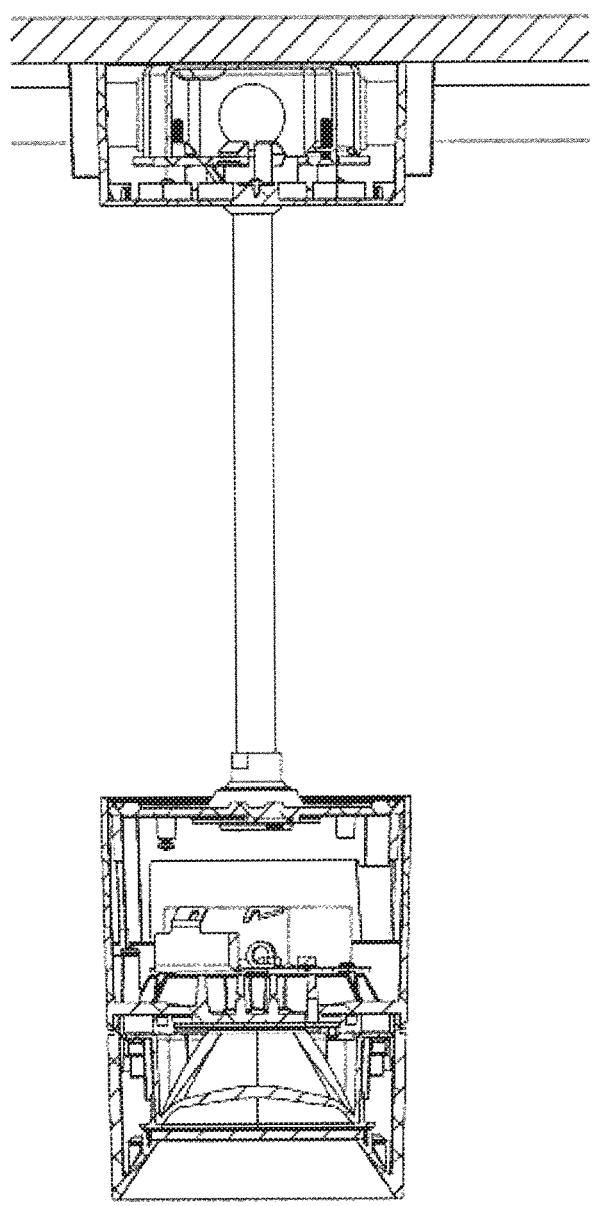
Figure 60:
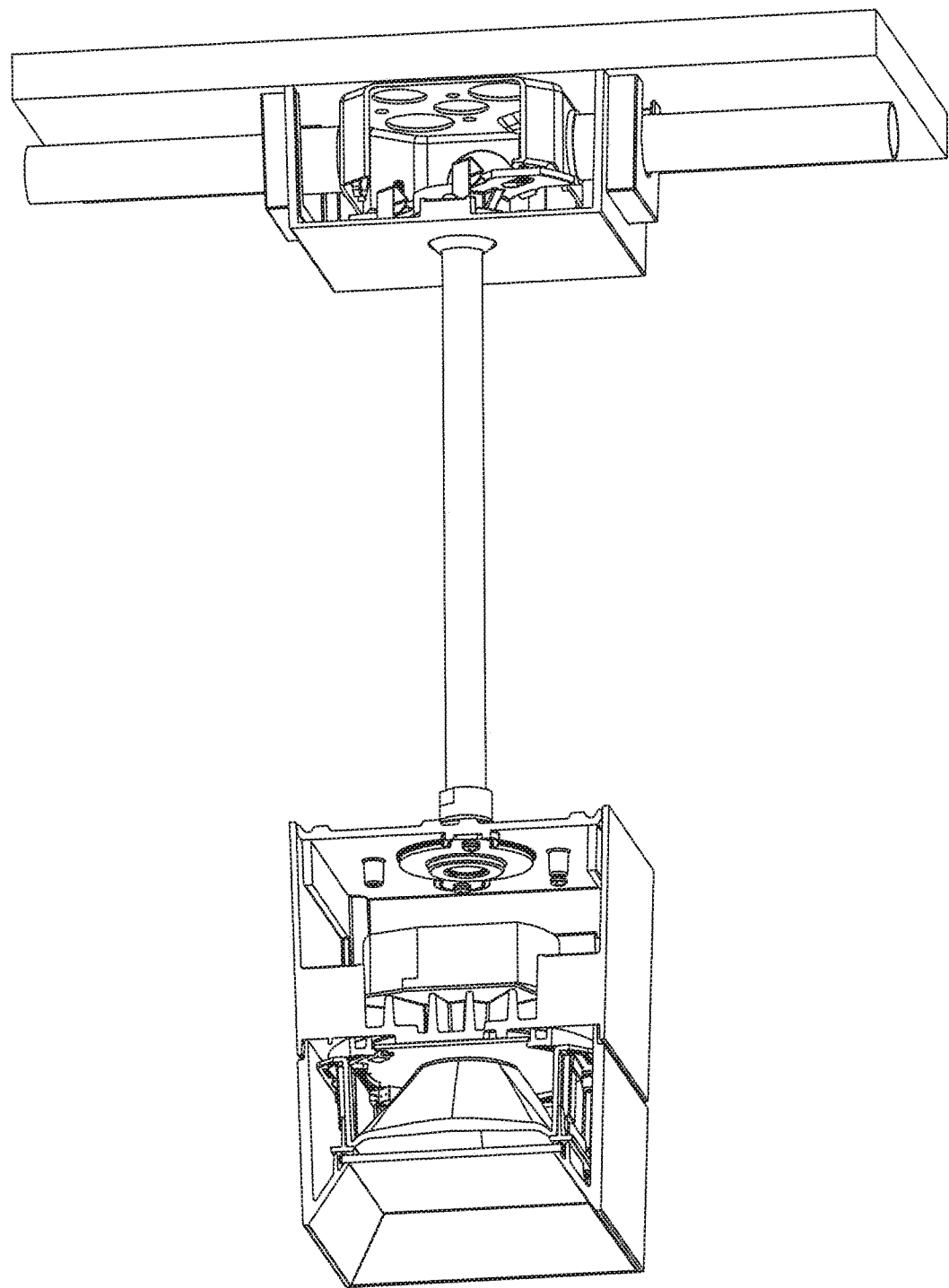
Figure 61:
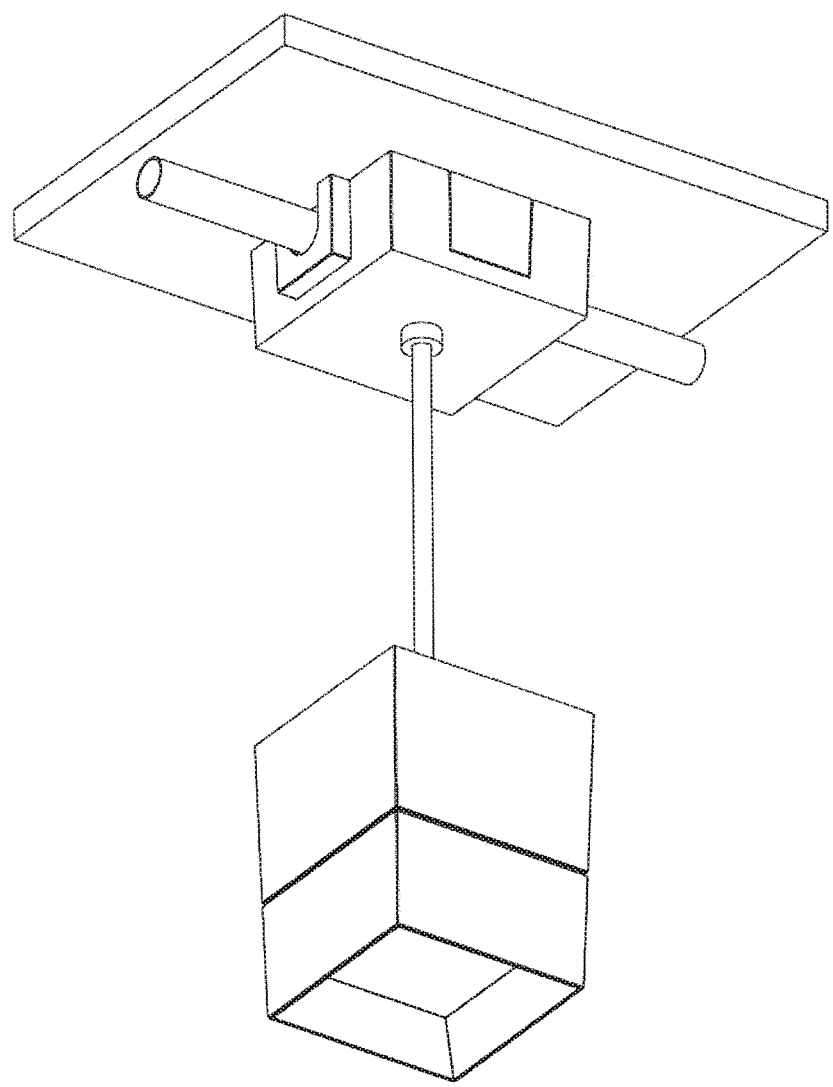
Figure 62:
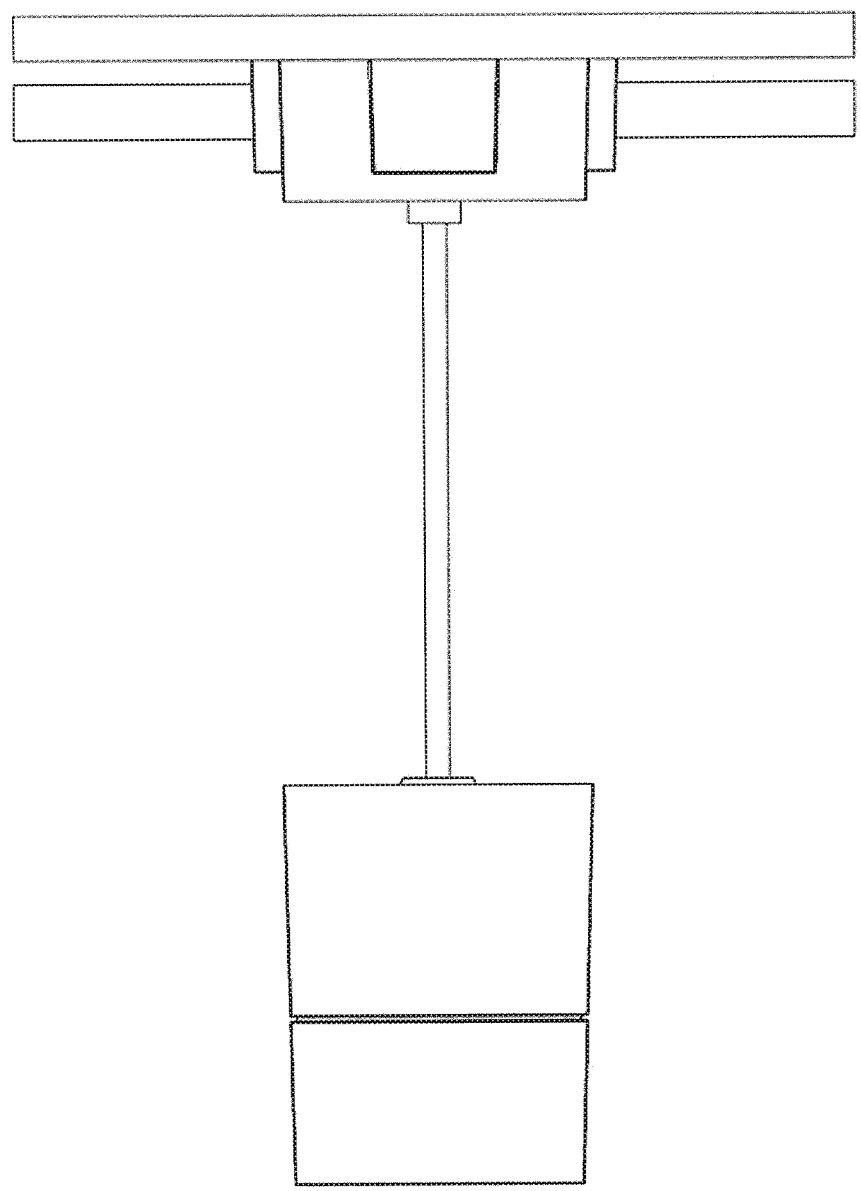
Figure 63:
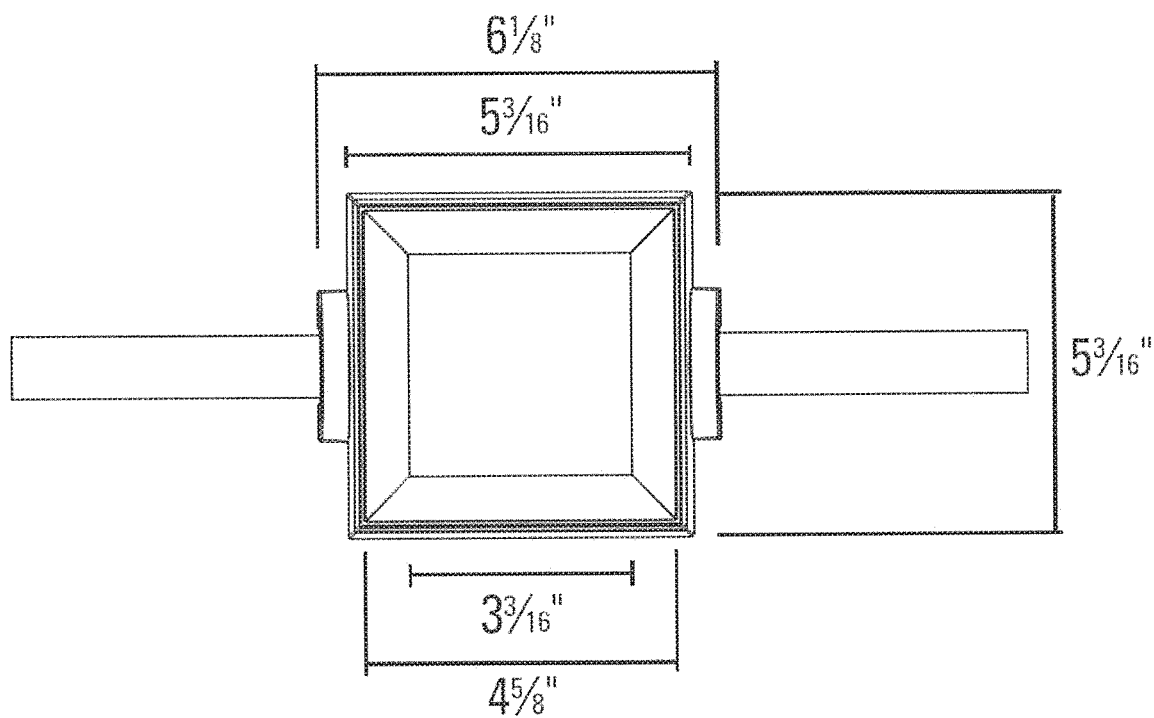
Figure 64:
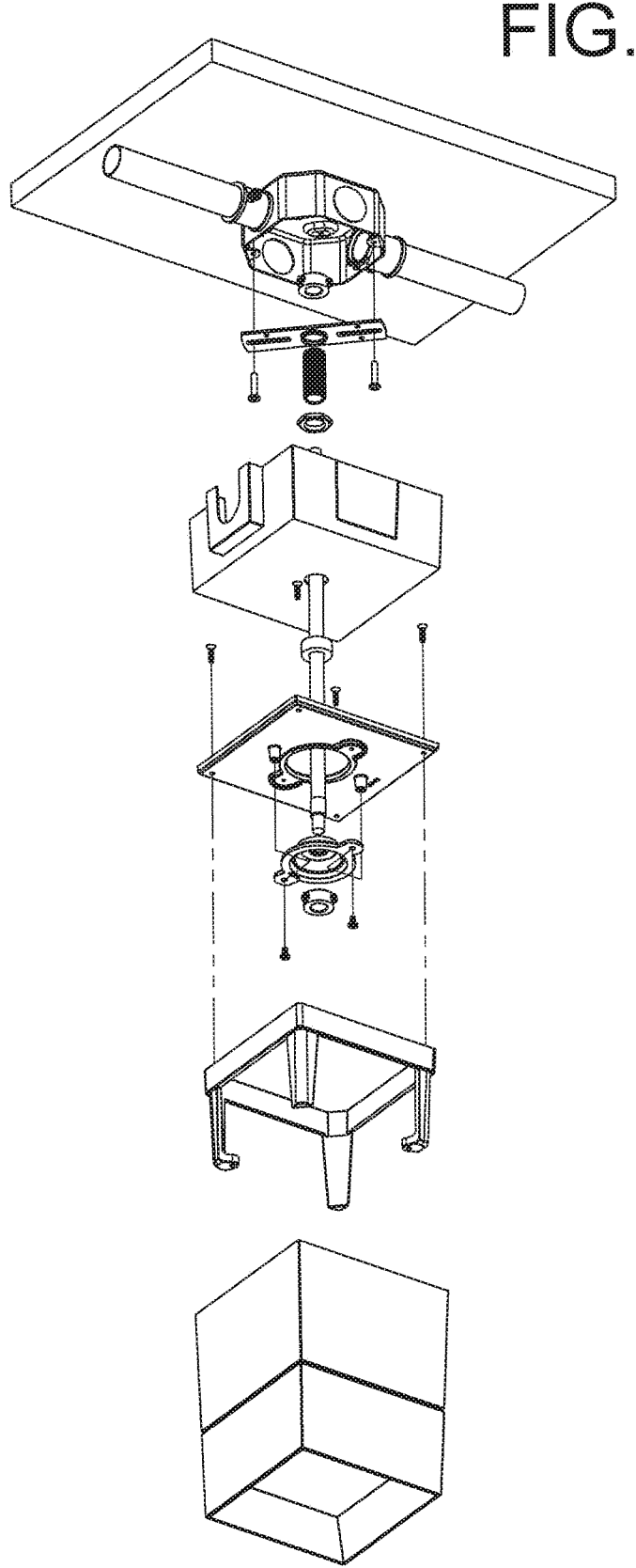
Figure 65:
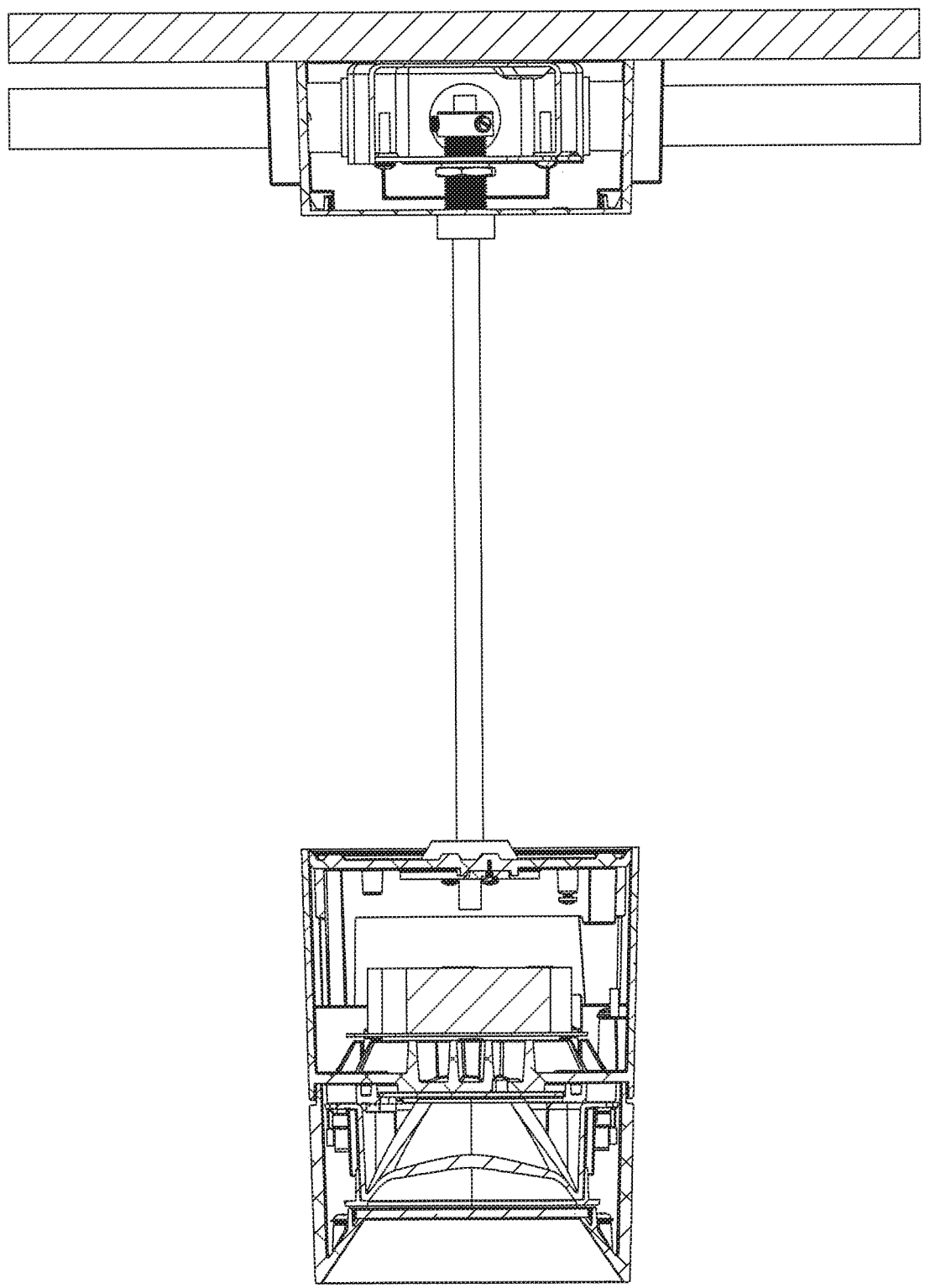
Figure 66:
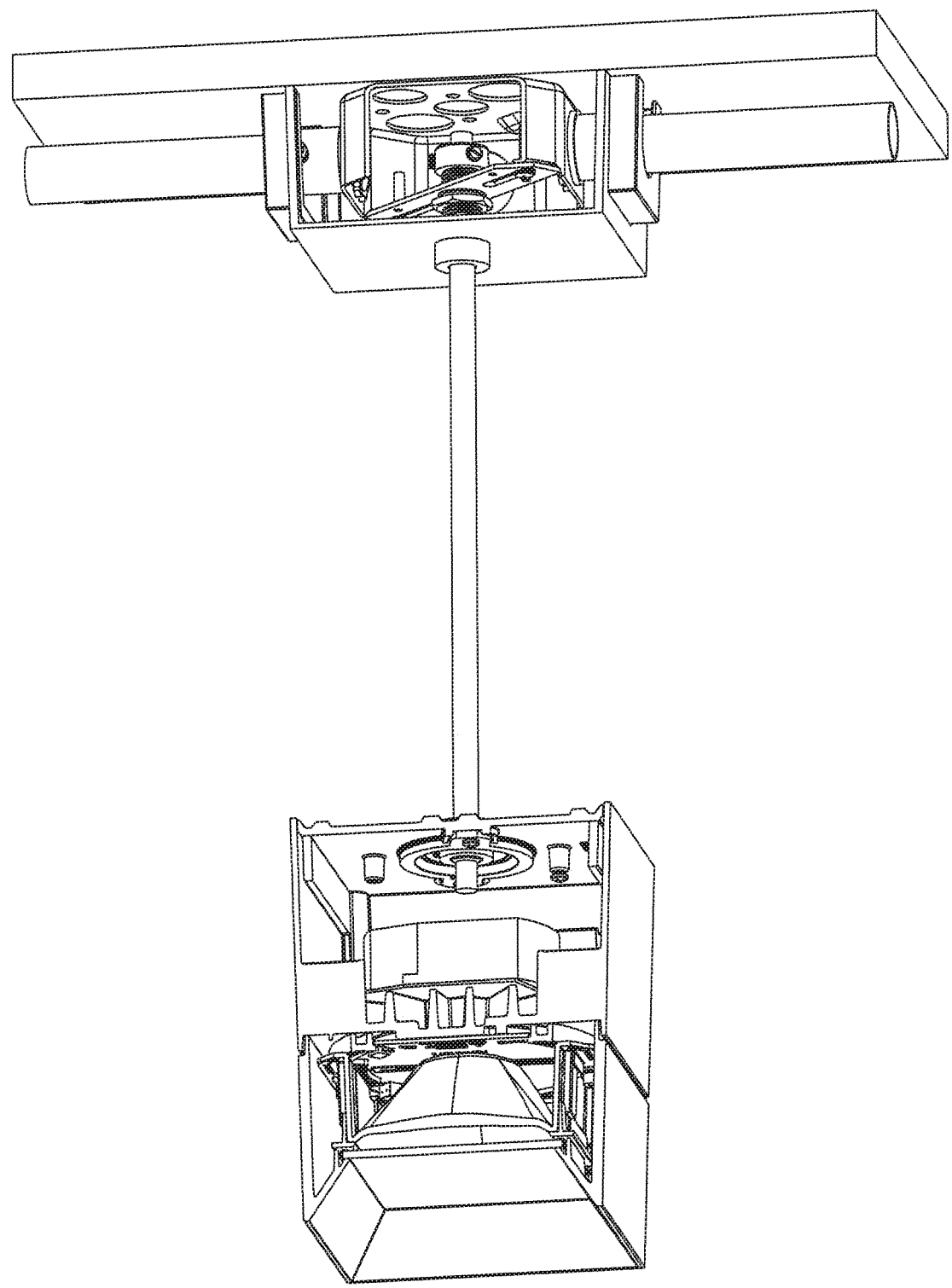
Figure 67:
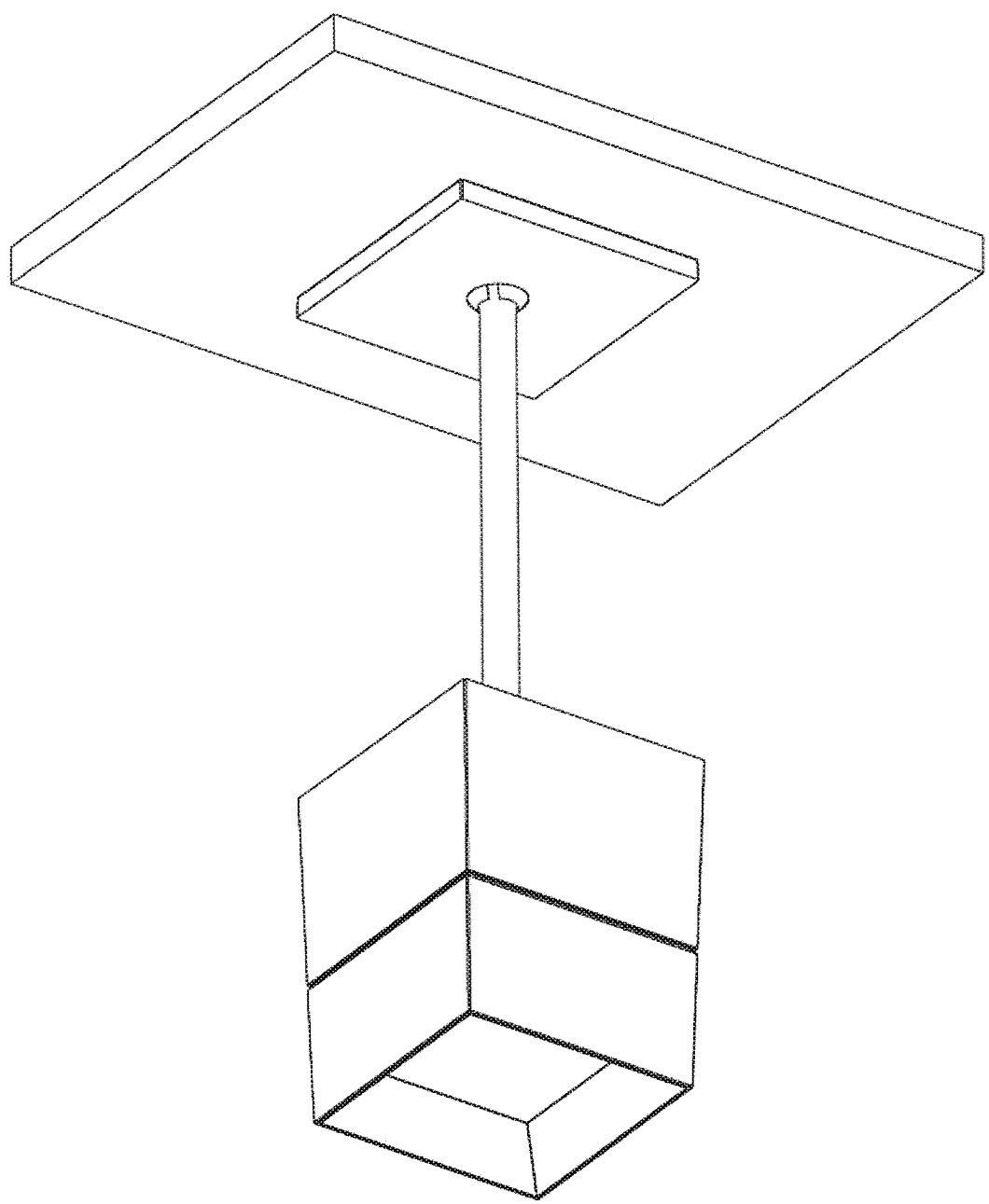
Figure 68:
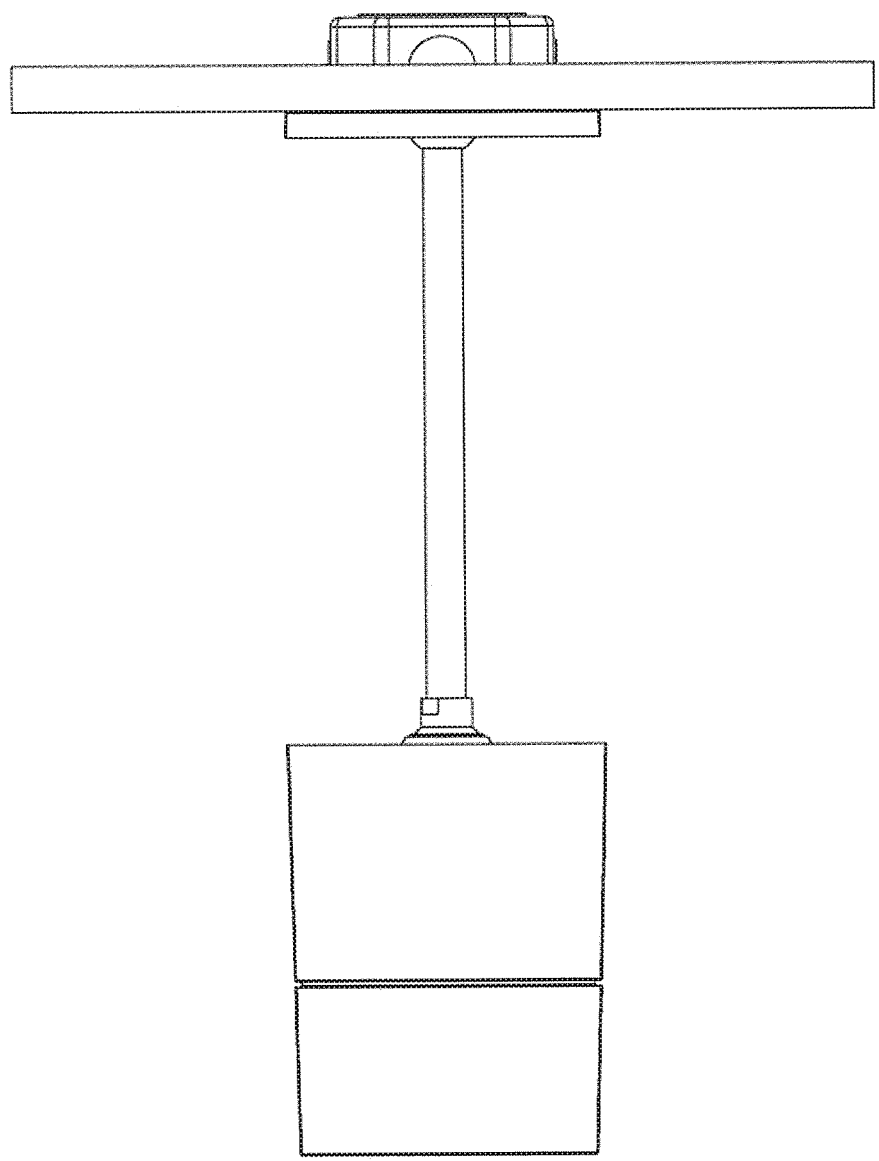
Figure 69:
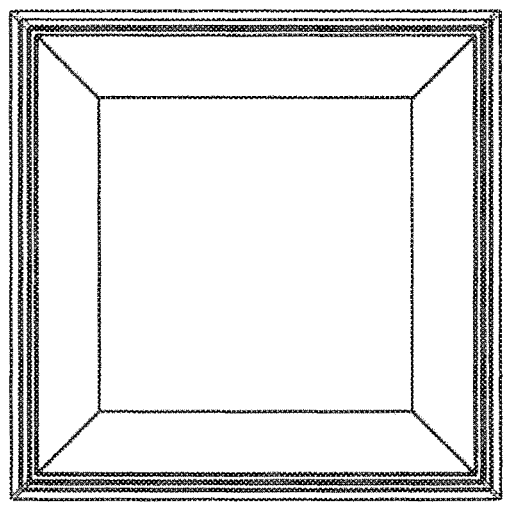
Figure 70:
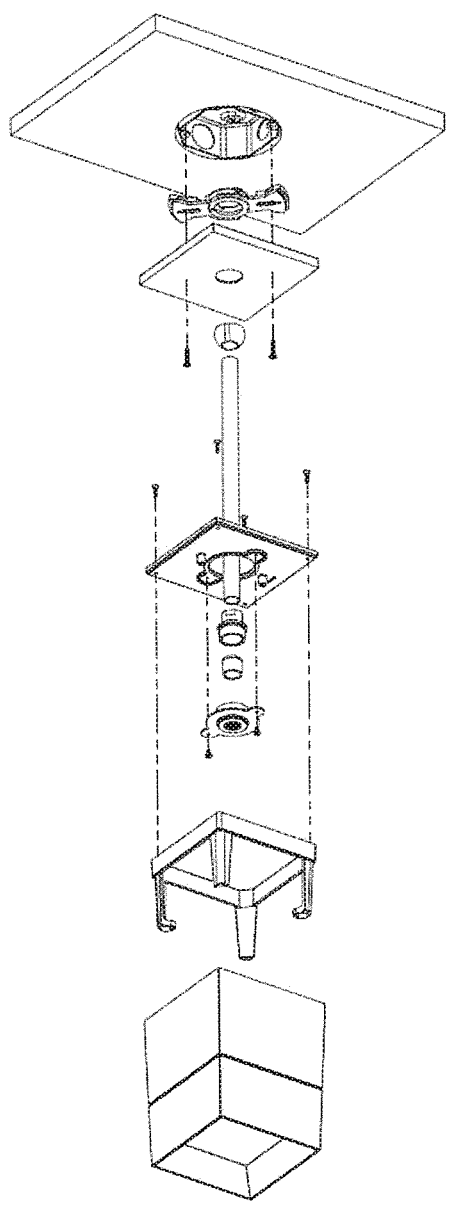
Figure 71:
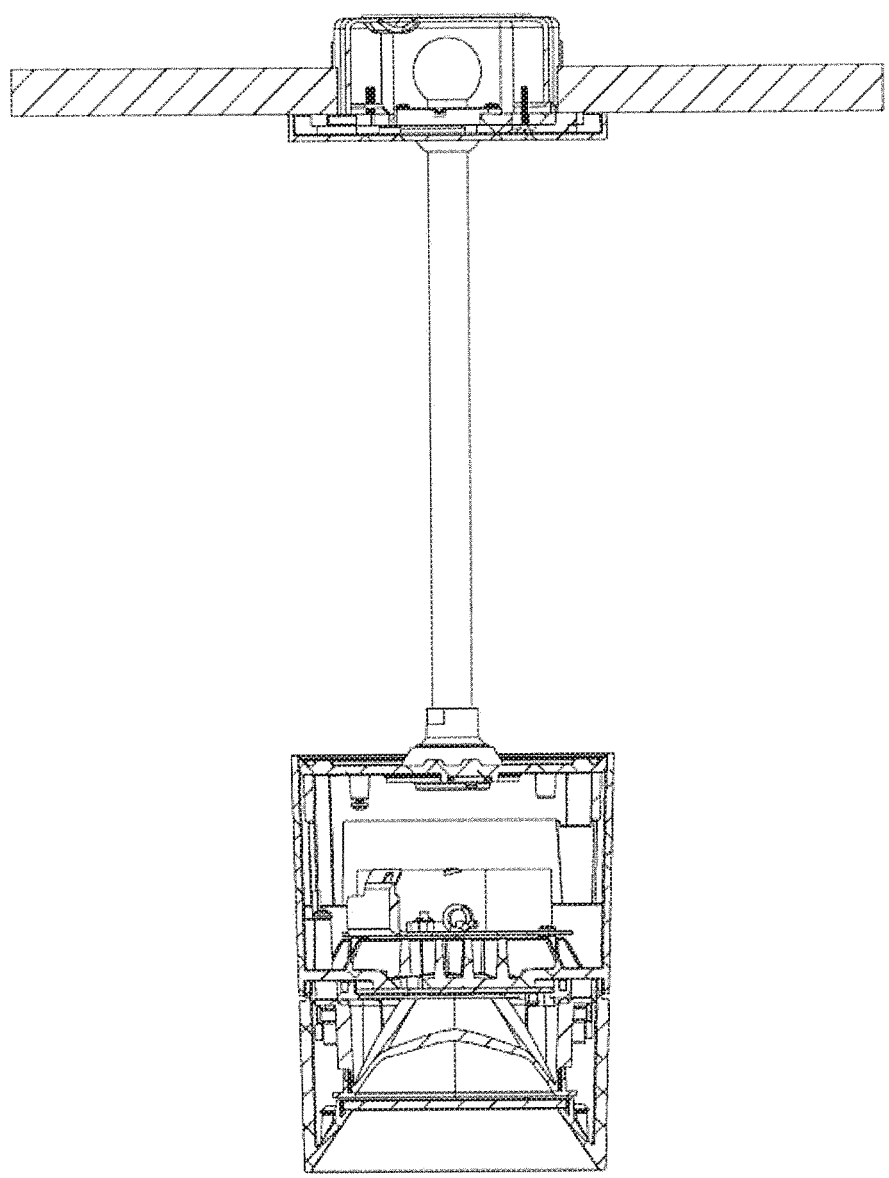
Figure 72:
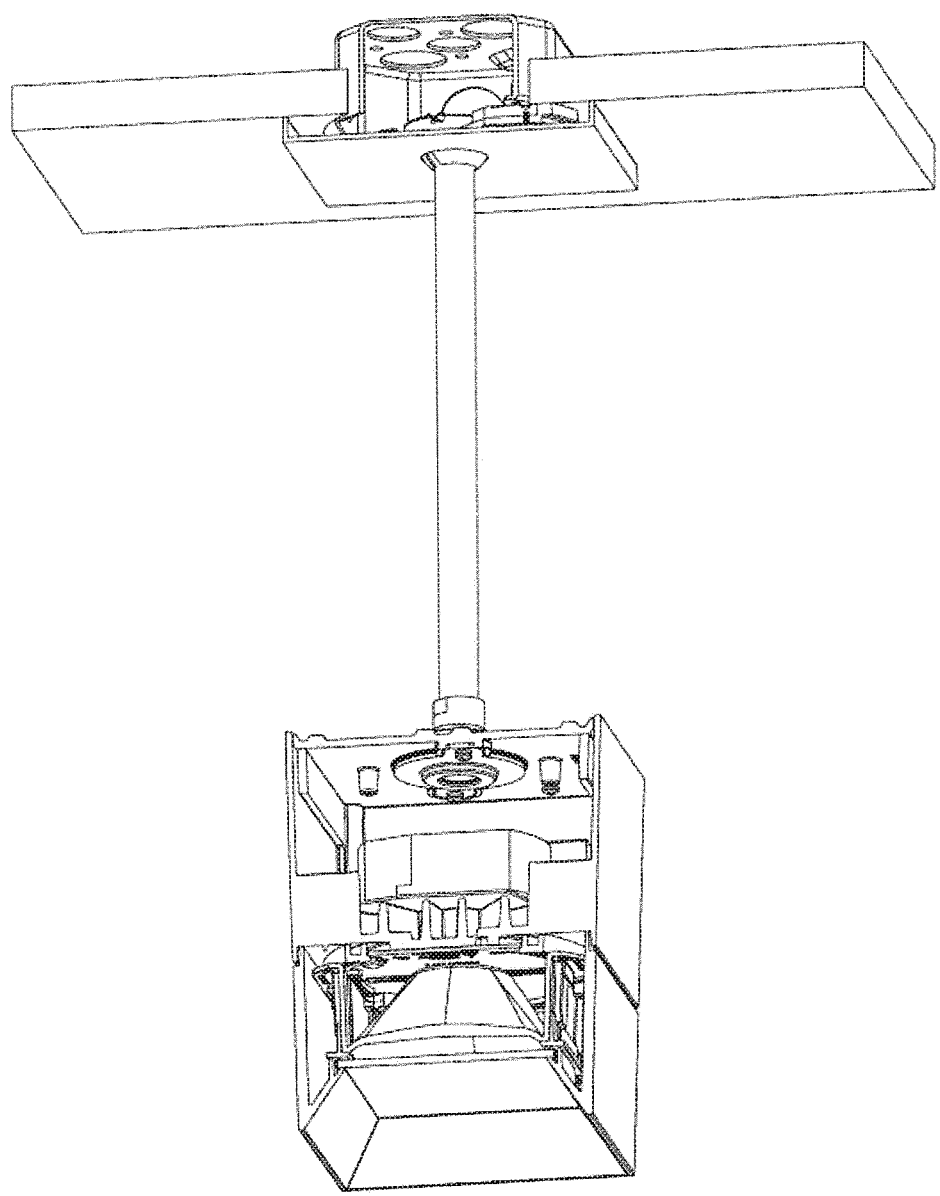
Figure 73:
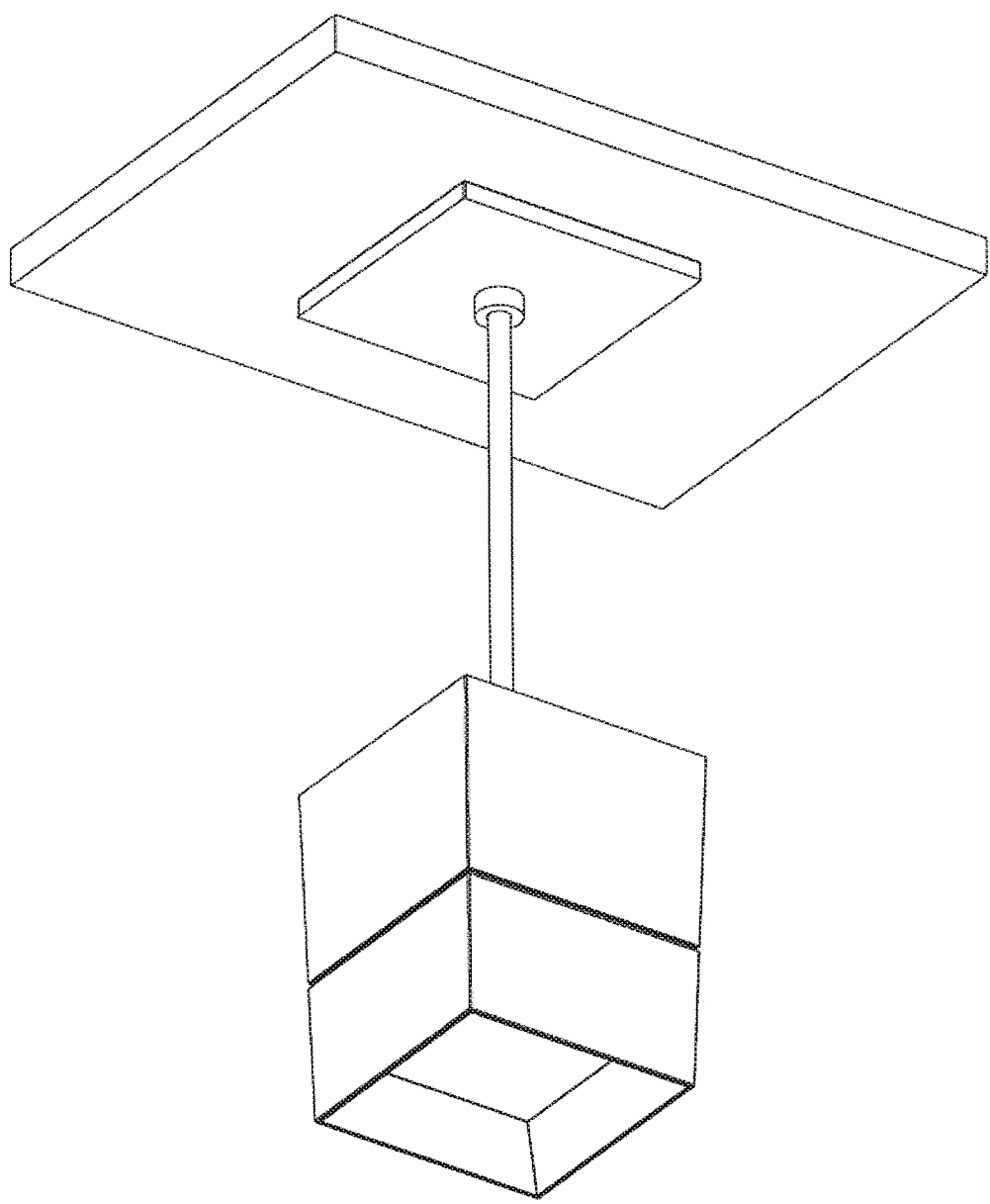
Figure 74:
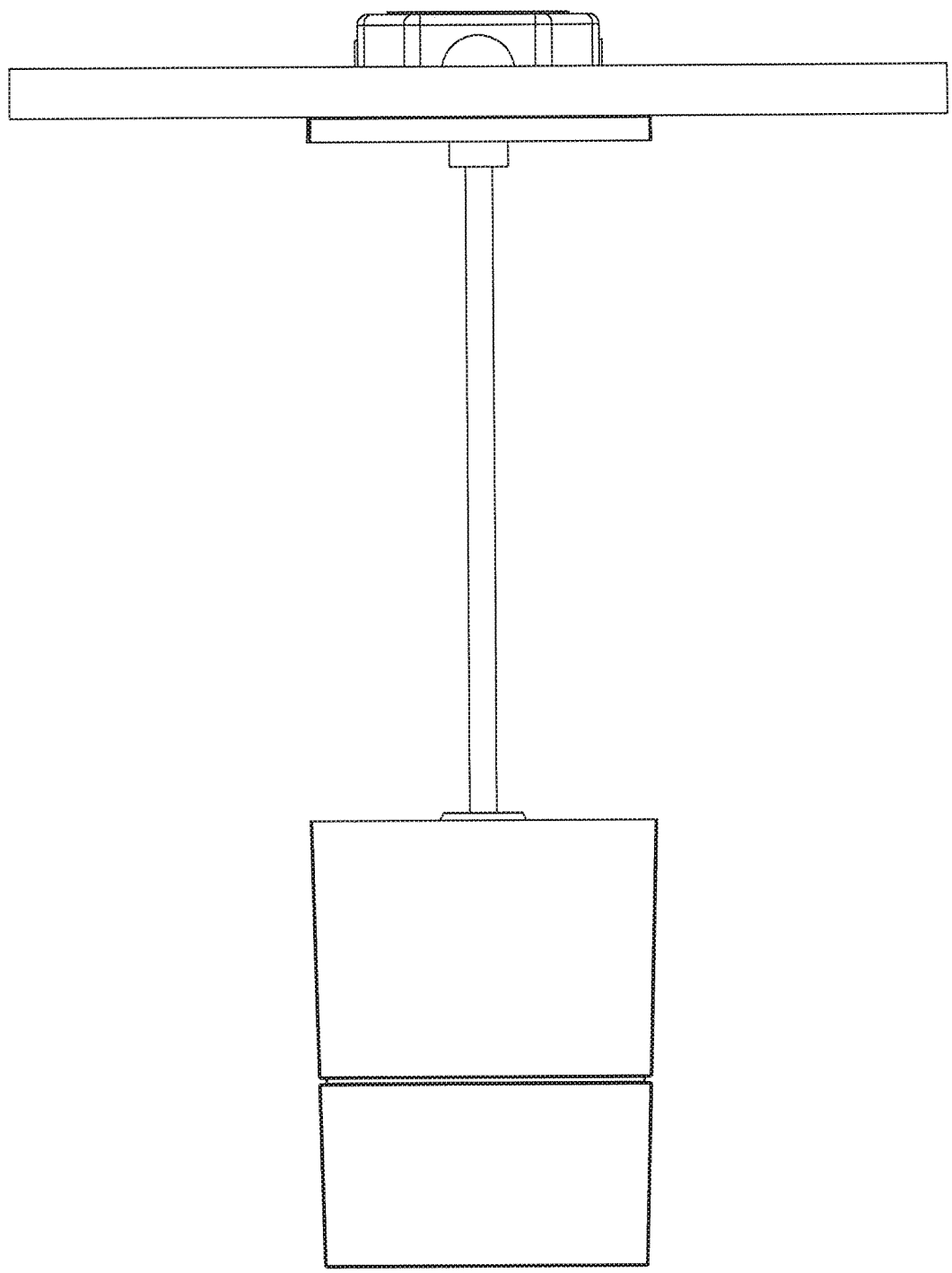
Figure 75:
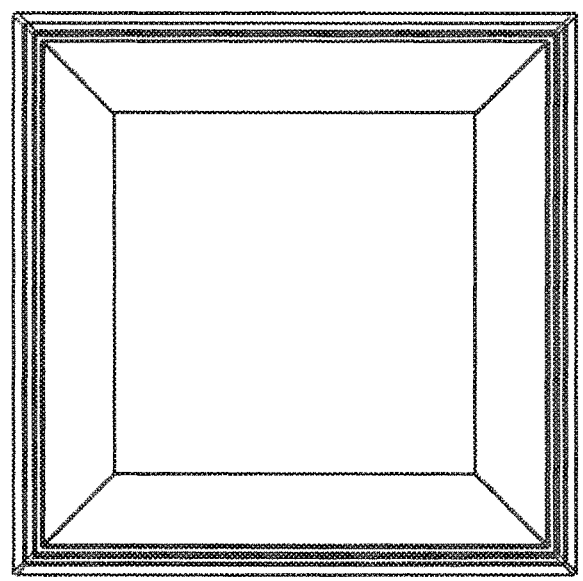
Figure 76:
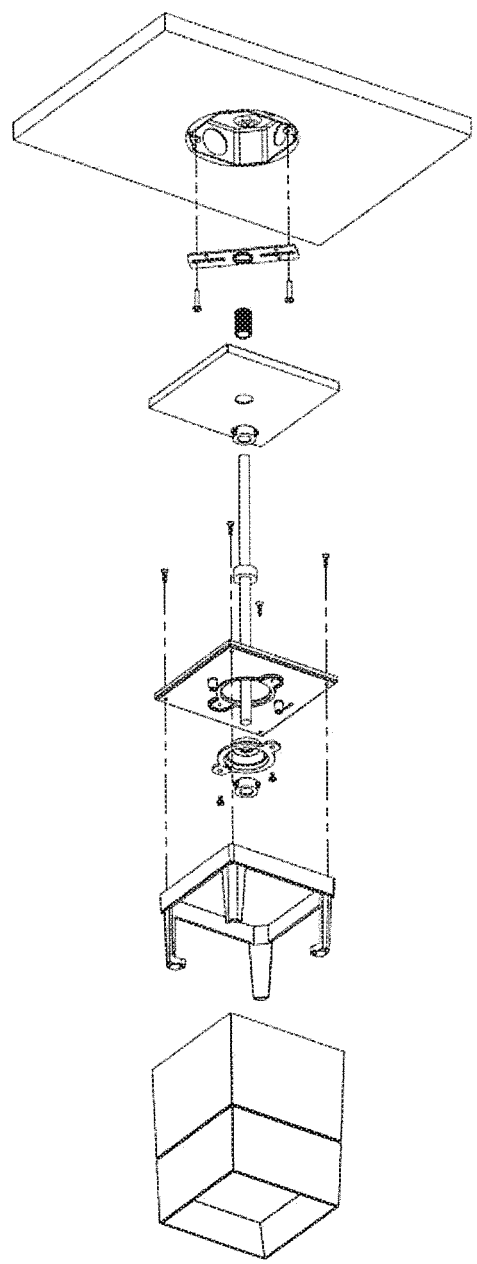
Figure 77:
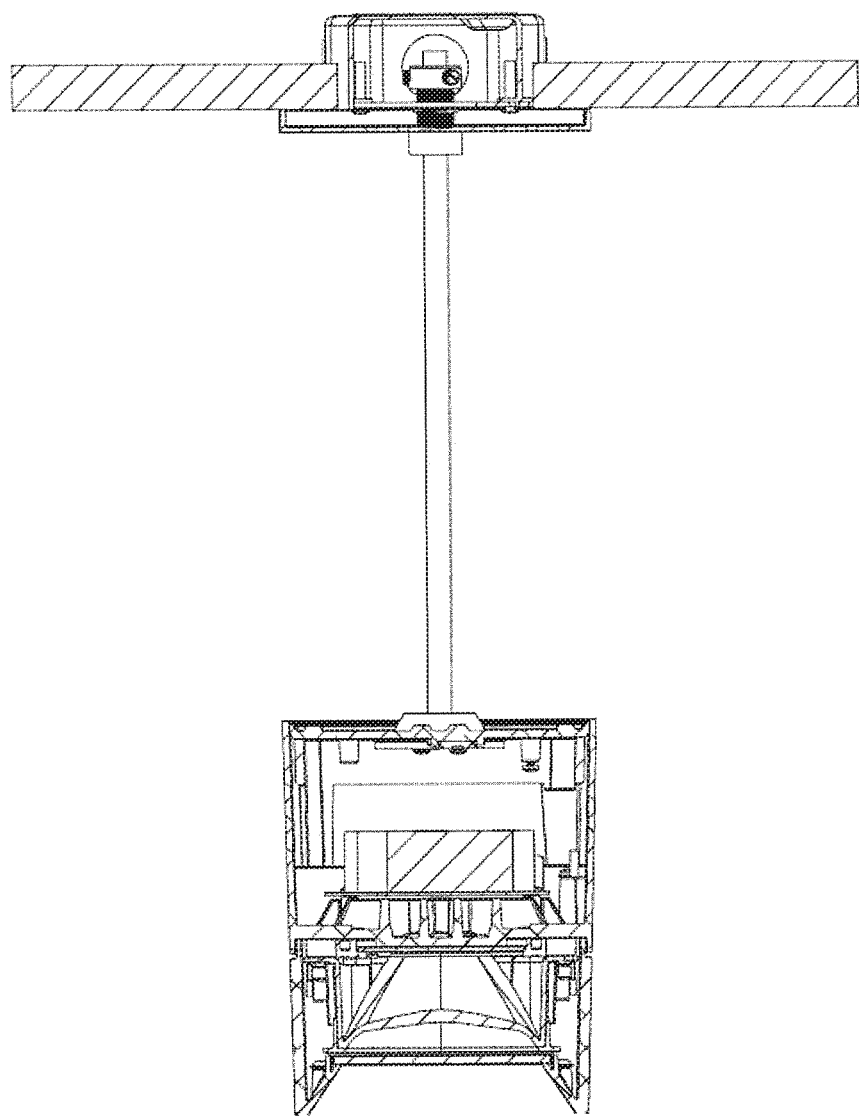
Figure 78:
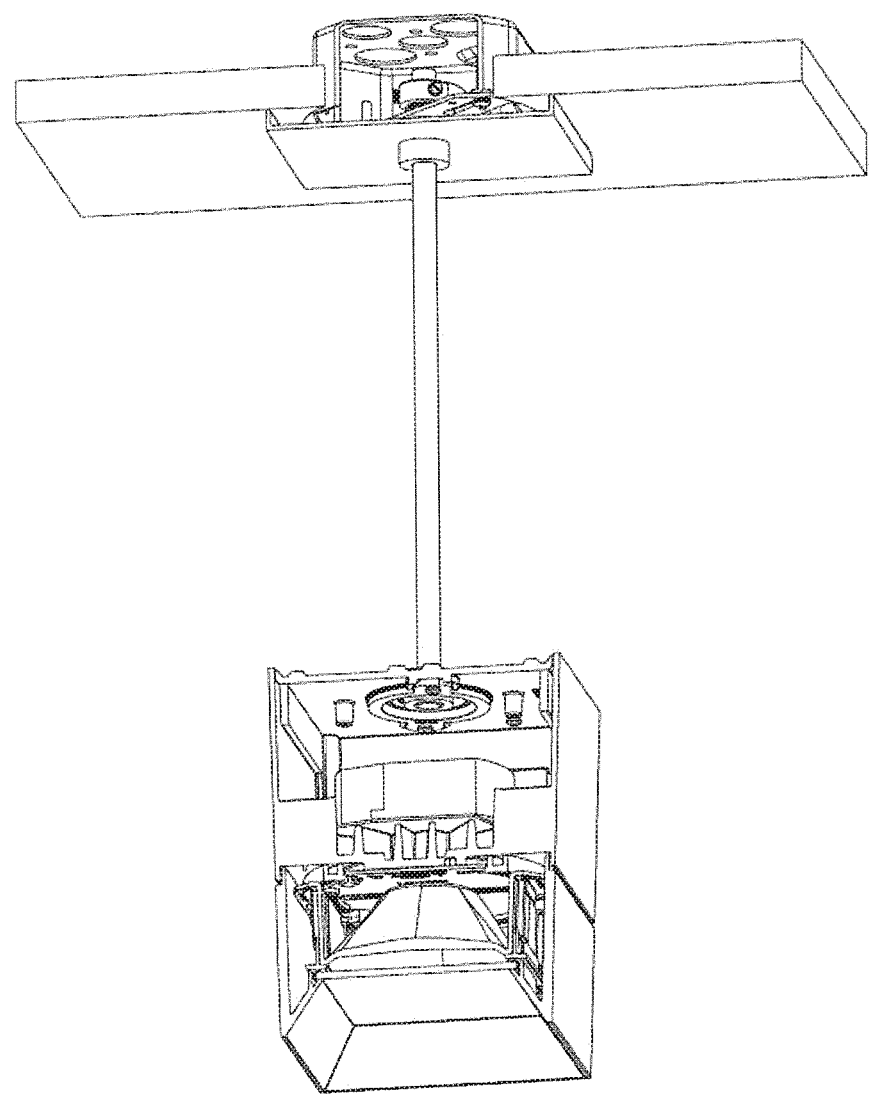

Referring to FIGS. 17-18, in the surface mounted conduit configuration, the upper housing 26 can include a plurality of cut outs 58 (e.g., 4 cut outs) in the circumferential side wall 38 and extending to the circumferential edge 40, to accommodate various configurations of conduits 56 extending into the junction box 12. Preferably, the housing 26 has at least 4 cut-outs which are aligned in an orthogonal pattern around the circumferential side wall 38 to correspond to the locations of conduit knock-outs 59 in the junction box (See FIGS. 1 & 2).

The cut outs 58 can be generally rectangular or square in shape with generally planar walls corresponding to the planar segments of the side wall 38 of the upper housing 26. A removable solid cover key 60 adapted to fill and close the cut-outs can be used to cover the cut out where no conduit is present. The solid cover key 60 can be removed where a conduit is present. Alternatively, a removable conduit key 62 having an opening 64 adapted to receive an electrical conduit 56 therethrough can be placed in the cutout where a conduit is present. The opening 64 in the conduit cutout key 62 can be an upwardly open U-shaped recess adapted to closely receive, for example, a round conduit. Each conduit key 62 can have an outer wall 66 spaced laterally outwardly from the circumferential side wall 38 of the housing 26 when installed, and the opening 64 in the conduit key is disposed in the outer wall. Each of the cover keys 60 and conduit keys 62 can have an edge 68 adapted to be substantially coplanar with the circumferential edge 40 of the housing 26 and the planar mounting surface 14 when installed, and the opening 64 in the conduit keys 62 can extend to the edge 68.

The light fixture can be provided with a plurality of cover keys 60 and conduit keys 62 and each cut-out 58 can be adapted to selectively receive any one of the conduit keys and cover keys, such that the housing 26 and light fixture can be configured to accommodate various patterns of surface mounted conduit 56 connected to the junction box 12. The keys 60, 62 can be secured in the cutouts 58 by a removable fastener 69 such as a screw. As depicted in FIGS. 17 and 18, the keys 60, 62 can be coupled to the housing by the fastener 69 which is connected to the housing. The fastener 69 can be directed through the cover key 60 (or conduit key 62) and into the upper housing 26, and when connected, the fastener 69 can be disposed within the interior of the enclosure of the upper housing. The cover keys 60 and conduit keys 62 can include a circumferential flange 61, 61' extending laterally from opposed side portions of the key 60, 62 and downwardly from a bottom portion of the key, which flange is received within the interior of the enclosure. The circumferential flange 61, 61' can be received within a complementary recess 63 formed in an interior surface of the circumferential side wall and disposed around the cut-out 58.

Referring to FIGS. 19-22, after configuration of the keys 60, 62 of the upper housing 26 to accommodate the conduit configuration, assembly of the light fixture in the surface mount conduit configuration is similar to the assembly of the surface mount and recess mount configurations discussed above; the mounting bracket 24' is mounted to the junction box 12, the upper housing 26 is affixed to the mounting bracket, the optical reflector 30 is mounted to the bottom wall 36 of the upper housing, and the lower housing 32 is mounted to the upper housing.

The light fixture can have a rectangular or rectilinear form wherein the horizontal cross section of the upper and lower housings (and the aperture) are substantially square or rectilinear. As depicted, the base 42 of the mounting bracket 24', 24" can have a corresponding square/rectilinear periphery complementary to the shape of the interior of the upper housing.

Referring to FIGS. 23A-29, the ceiling mounted light fixture can have a round or cylindrical form wherein the horizontal cross section of the upper and lower housings 26, 32 (and the aperture) are substantially circular. As depicted, the base 42 of the mounting bracket 24', 24" can have a corresponding circular periphery corresponding to the shape of the interior of the upper housing 26.

As depicted the upper housing 26 may be in the form of a cylinder having a substantially horizontal bottom wall 36 supporting the lighting element 28 (e.g., LEDs) which is connected to a substantially cylindrical tubular side wall 38, with the upper edge of the side wall forming a substantially circular circumferential upper edge 40. The entire circumferential edge 40, (or a majority thereof) lies on a common plane such that the upper housing 26 will be properly aligned when disposed against the mounting surface 14, such as the lower surface of the ceiling.

Further, the light fixture can include the cut-outs 58 and keys 60, 62 as described above; however the cover keys 60 and conduit keys 62 can have an arcuate shape corresponding to the curved shape of the side wall 38 of the upper housing 26. Other features of the light fixture are the same as or similar to the features described above.

Referring to FIGS. 30-78, in other embodiments, the light fixture can be in the form of a pendant, having a lighting element suspended from a base by an elongated support 72 such as a rigid or flexible, solid or hollow, stem or wire/cord, or another suitable elongated support. In such embodiments, an assembly of the upper and lower housings 26, 32 is suspended from a junction box 12 (or coupled thereto) by the elongated support 72. A canopy or cover 74, preferably having a shape corresponding to the shape of the housings (e.g., square or round) is placed over the junction box 12 to enclose and conceal the junction box and/or to cover the opening in the mounting surface 14. The cover 74 can connect to the mounting locations 22 of the junction box 12 and can have an interior adapted enclose a surface mount junction box. Further, the cover 74 can include cutouts 58, cover keys 60 and conduit keys 62 as described above with respect to rectilinear and round housings, to accommodate a surface mount junction box 12 and surface mount conduit 56. Alternatively, where the junction box is in a recess mount configuration, the cover 74' can have a low profile. The cover 74, 74' can have an opening in the center to receive the elongated support 72 therethrough.

A mounting bracket 24" is connected to the upper housing 26 in the manner described above, and a base plate 76 is connected to the base 42 of the mounting bracket 24" by fasteners, such as screws. Preferably, a long mounting bracket 24" is used in this configuration such that the base 42 of the mounting bracket 24" and the base plate 76 attached thereto are substantially aligned with or co-planar to the open end and circumferential edge 40 of the upper housing 26. The base plate 76 serves both as a means to cover and enclose the open end of the upper housing 26 and a means to support the assembly of the upper and lower housings. The base plate 76 includes an opening 78 in a center thereof to receive the elongated support 72. The elongated support 72 is connected to or otherwise mechanically coupled to the base plate 76 such that the assembly of the upper and lower housings is suspended by the elongated support 72, base plate 76 and mounting bracket 24".

In all embodiments, the light fixture can be provided in a kit including any of the upper housing, a long mounting bracket and a short mounting bracket, optionally with one or more of a light element, reflector, lower housing, cut out keys, conduit keys, base plate, elongated support, and cover, and other elements, such as disclosed herein. The various components, including the long or short mounting bracket, can be selected and used in the light fixture according to whether the light fixture is in the ceiling mount or pendant configuration and/or whether junction box is in the recess or surface mount configuration.

It should be understood that the specific form of the invention herein illustrated and described is intended to be representative only, as certain changes may be made therein without departing from the clear teachings of the disclosure. Accordingly, reference should be made to the following appended claims in determining the full scope of the invention.

What is claimed is:

1. A light fixture comprising:
   the light fixture being adapted to mount to a junction box mounted to a mounting surface, and the junction box being adapted to connect to a plurality of conduits mounted to the mounting surface;
   the light fixture including a cover having a side wall configured to surround the junction box, the side wall having an edge, and the cover having an open top defined by the edge;
   the edge of the cover being adapted to contact the mounting surface when the lighting fixture is mounted to the junction box, such that the side wall surrounds and conceals the junction box;
   the cover including a plurality of cut-outs in the side wall, and the cut-outs extending to the edge;
   the light fixture including at least one conduit key, the conduit key having a key edge and having an opening extending to the key edge, and the opening in the conduit key being adapted to receive a conduit therethrough;
   the conduit key having an outer wall spaced outwardly from the side wall of the cover when installed at one of the cut-outs, and the opening in the conduit key being disposed in the outer wall; and
   the conduit key being installable at any one of the plurality of cut-outs such that a conduit can pass through the opening of the conduit key and the cut-out;
   whereby the cover is configurable for various layouts of conduits connected to the junction box.

2. The light fixture as in claim 1, further comprising at least one cover key adapted to be installed at any one of the cut-outs and the cover key being adapted to substantially close the cut-out.

3. The light fixture as in claim 2, wherein the cover key comprises a key edge, and the key edges of the cover key and conduit key are adapted to be substantially coplanar with the edge of the side wall of the cover when said keys are installed at respective cut-outs.

4. The light fixture as in claim 2, wherein the cover key and the conduit key are adapted to be removably affixed to the cover.

5. The light fixture as in claim 4, further comprising:
   the cover key and the conduit key being configured to be mounted to the cover via a fastener disposed within an interior of the cover defined by the circumferential side wall.

6. The light fixture as in claim 1, wherein:
   the cover has at least 4 cut-outs which are arranged in an orthogonal pattern around the side wall of the housing.

7. The light fixture as in claim 1, further comprising:
   the conduit key having a flange which is adapted to be disposed within an interior of the cover defined by the side wall when the conduit key is installed at one of the cut-outs.

8. The light fixture as in claim 1, further comprising:
   the cover including an upper housing and a lower housing, and the upper housing having the side wall and the cut-outs therein; and
   the upper housing being adapted to be disposed between the lower housing and the mounting surface, when the light fixture is mounted to the junction box.

9. The light fixture as in claim 8, wherein the lower housing encloses a lighting element.

10. The light fixture as in claim 1, further comprising:
    an elongated support having a first end adapted to mount to at least one of the cover and the junction box;
    a housing having a lighting element; and
    the housing being adapted to connect to a second end of the elongated support.

11. The light fixture as in claim 10, wherein:
    the cover has a bottom wall with an opening; and
    the elongated support is adapted to extend through the opening in the bottom wall of the cover.

12. A light fixture comprising:
    the light fixture being adapted to mount to a surface-mounted junction box mounted to a mounting surface, and the junction box being adapted to connect to a plurality of conduits mounted to the mounting surface;
    the light fixture including a cover with a side wall with an edge;
    the edge of the cover being adapted to be in contact with the mounting surface when the light fixture is mounted to the junction box, such that the cover is flush to the mounting surface and the side wall surrounds the junction box;
    the cover including at least one cut-out in the side wall, and the cut-out forming an opening in the side wall extending to the edge of the cover;
    the light fixture including at least one conduit key, the conduit key having a key edge and having an opening extending to the key edge, and the opening in the conduit key being adapted to receive a conduit therethrough;
    the conduit key having an outer wall spaced outwardly from the side wall of the cover when installed at the cut-out, and the opening in the conduit key being disposed in the outer wall; and
    the conduit key being installable at the cut-out such that a conduit can pass through the opening in the conduit key and the cut-out;
    whereby the light fixture is mountable to the junction box mounted to the mounting surface, with the edge of the cover flush with the mounting surface, after a conduit is connected to the junction box.

13. The light fixture as in claim 12, further comprising:
    the cover has an upper housing and a lower housing, and the upper housing having the side wall and the cut-outs therein; and
    the upper housing being adapted to be disposed between the lower housing and the mounting surface, when the light fixture is mounted to the junction box.

14. The light fixture as in claim 13, wherein the lower housing encloses a lighting element.

15. The light fixture as in claim 12, further comprising:
an elongated support having a first end adapted to mount to one of the cover and the junction box;
a housing enclosing alighting element; and
the housing being adapted to connect to a second end of the elongated support.

16. The light fixture as in claim 15, wherein:
the cover has a bottom wall with an opening; and
the elongated support is adapted to extend through the opening in the bottom wall of the cover and to mount to the junction box.

17. A kit for alight fixture, comprising:
the light fixture being adapted to mount to a junction box mounted to a mounting surface, and the junction box being adapted to connect to a plurality of conduits mounted to the mounting surface;
the light fixture including a cover having a side wall with an edge, and having an open top defined by the edge;
the edge of the cover being adapted to contact the mounting surface when the lighting fixture is mounted to the junction box, such that the side wall surrounds and conceals the junction box;
the cover including a plurality of cut-outs in the side wall, and the cut-outs extending to the edge;
a plurality of conduit keys, each conduit key having an edge and having an opening extending to the edge of the conduit key, and the opening in the conduit key being adapted to receive a conduit therethrough, and each conduit key being installable at any one of the plurality of cut-outs such that a conduit can pass through the opening in the conduit key and the cut-out;
the conduit keys each having an outer wall spaced outwardly from the side wall of the cover when installed at one of the cut-outs, and the opening in the conduit key being disposed in the outer wall; and
a plurality of cover keys adapted to be installed at, and substantially close, any one of the cut-outs;
whereby the cover is configurable for various layouts of conduits connected to the junction box.

* * * * *